(12) United States Patent
Gobara

(10) Patent No.: US 12,443,910 B2
(45) Date of Patent: Oct. 14, 2025

(54) MONITORING TERMINAL, TERMINAL MANAGEMENT SYSTEM, TERMINAL MANAGEMENT METHOD, AND PROGRAM

(71) Applicant: SEIKO EPSON CORPORATION, Tokyo (JP)

(72) Inventor: Naoki Gobara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/630,862

(22) Filed: Apr. 9, 2024

(65) Prior Publication Data
US 2024/0338644 A1  Oct. 10, 2024

(30) Foreign Application Priority Data
Apr. 10, 2023  (JP) .................................. 2023-063368

(51) Int. Cl.
*G06Q 10/0833*  (2023.01)
(52) U.S. Cl.
CPC ................................ *G06Q 10/0833* (2013.01)
(58) Field of Classification Search
CPC .................................................. G06Q 10/0833
See application file for complete search history.

(56) References Cited

U.S. PATENT DOCUMENTS

| 6,559,794 B1 | 5/2003 | Nakajima et al. |
| 2004/0124977 A1* | 7/2004 | Biffar ........................ G08G 1/20 340/8.1 |
| 2006/0229895 A1* | 10/2006 | Kodger, Jr. .......... G06Q 10/083 705/333 |
| 2022/0051182 A1* | 2/2022 | Fox ........................ G08B 25/008 |
| 2022/0300896 A1* | 9/2022 | Volkerink ........ G06K 19/06037 |
| 2024/0292185 A1* | 8/2024 | Jantzi .................. G06Q 10/0833 |

FOREIGN PATENT DOCUMENTS

JP  2000-249565 A  9/2000

OTHER PUBLICATIONS

Ping Josephine Xu, Order fulfillment in online retailing : what goes where, 2005, p. 3 (Year: 2005).*

* cited by examiner

Primary Examiner — Ibrahim N El-Bathy
(74) Attorney, Agent, or Firm — Oliff PLC

(57) ABSTRACT

A monitoring terminal includes a control unit configured to acquire a current date and time indicating a date and time at present, a storage unit configured to store a first destination to which a first object is shipped and a shipping date and time indicating a date and time at which the first object is shipped to the first destination, and an acquisition unit configured to acquire first position information indicating a position of the first object at a first interval when the current date and time is a date and time before the shipping date and time, wherein the acquisition unit acquires the first position information at a second interval shorter than the first interval, when the current date and time is a date and time after the shipping date and time.

17 Claims, 13 Drawing Sheets

| MONITORING TERMINAL | REMAINING BATTERY LEVEL | MASTER/SLAVE | TERMINAL STATE |
|---|---|---|---|
| 10A | 20% | SLAVE | POWER SAVING STATE |
| 10B | 80% | MASTER | NORMAL OPERATION STATE |
| 10C | 50% | SLAVE | POWER SAVING STATE |

| MONITORING TERMINAL | AVERAGE SIGNAL STRENGTH OF SATELLITE SIGNALS | COMMUNICATION SIGNAL STRENGTH | MASTER/SLAVE |
|---|---|---|---|
| 10A | 38 | -75 dBm | SLAVE |
| 10B | 32 | -100 dBm | SLAVE |
| 10C | 45 | -110 dBm | MASTER |

| MONITORING TERMINAL | DESTINATION | REMAINING BATTERY LEVEL | MASTER/SLAVE | TERMINAL STATE |
|---|---|---|---|---|
| 10A | BASE B | 20% | SLAVE | POWER SAVING STATE |
| 10B | BASE B | 50% | SLAVE | POWER SAVING STATE |
| 10C | BASE C | 80% | MASTER | NORMAL OPERATION STATE |

FIG. 14

| MONITORING TERMINAL | DESTINATION | REMAINING BATTERY LEVEL | MASTER/SLAVE | TERMINAL STATE |
|---|---|---|---|---|
| 10A | BASE B | 20% | SLAVE | POWER SAVING STATE |
| 10B | BASE B | 80% | MASTER | NORMAL OPERATION STATE |
| 10C | BASE C | 50% | SLAVE | POWER SAVING STATE |

FIG. 15

| MONITORING TERMINAL | DESTINATION | ARRIVAL DATE AND TIME | REMAINING BATTERY LEVEL | MASTER/SLAVE | TERMINAL STATE |
|---|---|---|---|---|---|
| 10A | BASE B | 2022/10/11, 9:00 | 20% | SLAVE | POWER SAVING STATE |
| 10B | BASE B | 2022/10/11, 9:00 | 50% | SLAVE | POWER SAVING STATE |
| 10C | BASE C | 2022/10/11, 15:00 | 80% | MASTER | NORMAL OPERATION STATE |

FIG. 16

MONITORING TERMINAL, TERMINAL MANAGEMENT SYSTEM, TERMINAL MANAGEMENT METHOD, AND PROGRAM

The present application is based on, and claims priority from JP Application Serial Number 2023-063368, filed Apr. 10, 2023, the disclosure of which is hereby incorporated by reference herein in its entirety.

BACKGROUND

1. Technical Field

The present disclosure relates to a monitoring terminal, a terminal management system, a terminal management method, and a program.

2. Related Art

In general, a positioning device that measures its own position based on a satellite signal received from a Global Positioning System (GPS) satellite is known. JP-A-2000-249565 discloses a positioning device that shortens a positioning interval of its own position in accordance with a distance from its current position to a destination.

By attaching the positioning device of JP-A-2000-249565 to an object to be shipped such as a pallet or a package, it is possible to build a shipping system that can track a position of the object. In such a shipping system, it is required to acquire detailed position information of the object particularly around the arrival date and time at which the object arrives at its destination.

However, in the shipping system using the positioning device of JP-A-2000-249565, when the date and time at which the object actually arrives at the destination is greatly delayed from the arrival date and time due to a shipping delay, the positioning interval of its own position in the positioning device remains long around the arrival date and time. Accordingly, in the shipping system using the positioning device of JP-A-2000-249565, when a shipping delay occurs, it is difficult to acquire detailed position information of the object around the arrival date and time.

SUMMARY

A monitoring terminal according to an aspect of the present disclosure includes a control unit configured to acquire a current date and time indicating a date and time at present, a storage unit configured to store a first destination to which a first object is shipped and a shipping date and time indicating a date and time at which the first object is shipped to the first destination, and an acquisition unit configured to acquire first position information indicating a position of the first object at a first interval when the current date and time is a date and time before the shipping date and time, wherein the acquisition unit acquires the first position information at a second interval shorter than the first interval, when the current date and time is a date and time after the shipping date and time.

A terminal management system according to an aspect of the present disclosure includes a first monitoring terminal that is attached to a first object and acquires first position information indicating a position of the first object at predetermined intervals, and an information processing device including a communication unit configured to communicate with the first monitoring terminal, a storage unit configured to store a first destination to which the first object is shipped and a first shipping date and time indicating a date and time at which the first object is shipped to the first destination, and a control unit that acquires a current date and time indicating a date and time at present, instructs the first monitoring terminal to acquire the first position information at a first interval when the current date and time is a date and time before the first shipping date and time, and instructs the first monitoring terminal to acquire the first position information at a second interval shorter than the first interval when the current date and time is a date and time after the first shipping date and time.

A terminal management method according to one aspect of the present disclosure includes acquiring position information indicating a position of an object at predetermined intervals using a monitoring terminal attached to the object, acquiring a current date and time indicating a date and time at present using an information processing device, instructing the monitoring terminal, using the information processing device, to acquire the position information at a first interval when the current date and time is a date and time before a shipping date and time indicating a date and time at which the object is shipped to a destination, and instructing the monitoring terminal, using the information processing device, to acquire the position information at a second interval shorter than the first interval when the current date and time is a date and time after the shipping date and time.

A non-transitory computer-readable storage medium storing a program according to an aspect of the present disclosure causes a computer to execute instructing a monitoring terminal to acquire position information indicating a position of an object at a first interval when a current date and time indicating a date and time at present is a date and time before a shipping date and time indicating a date and time at which the object to which the monitoring terminal is attached is shipped to a destination, and instructing the monitoring terminal to acquire the position information at a second interval shorter than the first interval when the current date and time is a date and time after the shipping date and time.

BRIEF DESCRIPTION OF THE DRAWING

FIG. 14 is a first diagram showing a specific example in which each monitoring terminal becomes either the master terminal or the slave terminal depending on its remaining battery level in the situation of FIG. 13.

FIG. 15 is a second diagram showing the specific example in which each monitoring terminal becomes either the master terminal or the slave terminal in accordance with its remaining battery level in the situation of FIG. 13.

FIG. 16 is a third diagram showing the specific example in which each monitoring terminal becomes either the master terminal or the slave terminal in accordance with its remaining battery level in the situation of FIG. 13.

DESCRIPTION OF EMBODIMENTS

Embodiments of the present disclosure will be described below with reference to the drawings. Also, in each figure below, in order to make each member a recognizable size, scales of each member may be different from actual ones.

First Embodiment

First, a first embodiment of the present disclosure will be described. The first embodiment described below is an embodiment of a monitoring terminal.

Figure 1:
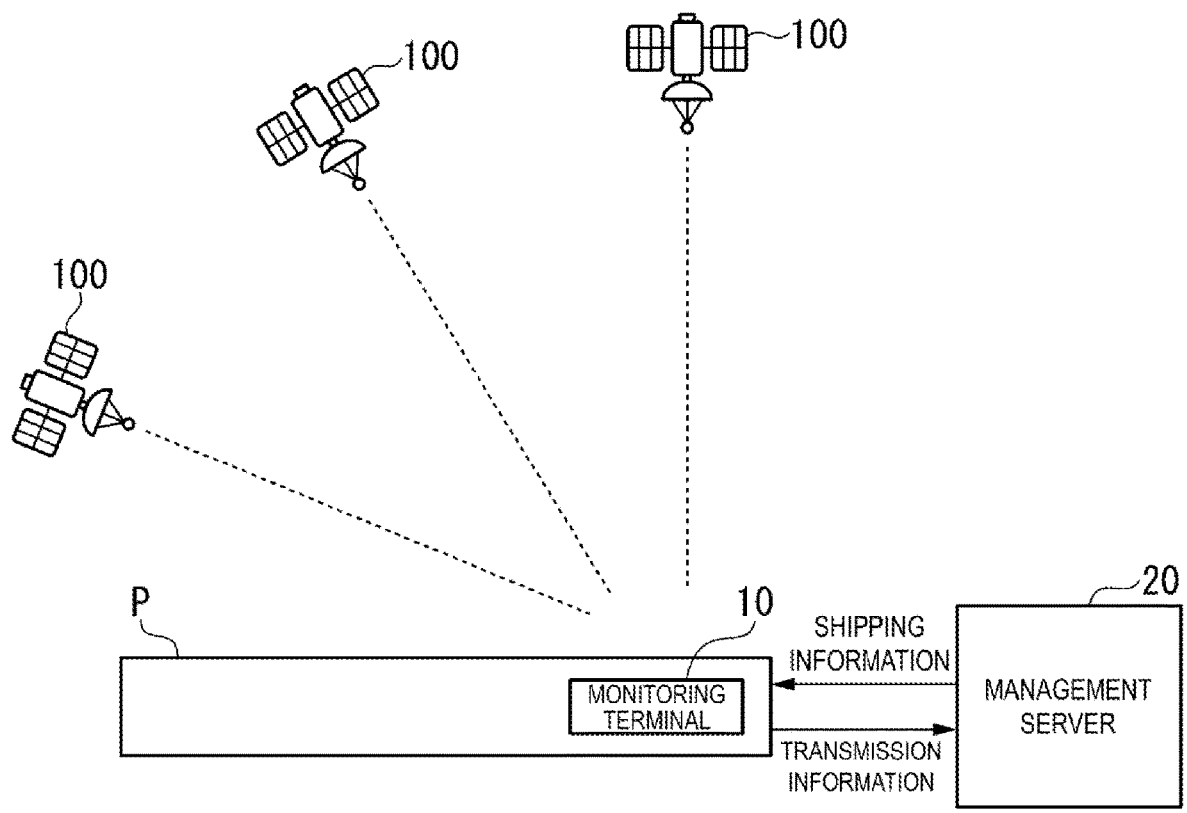
FIG. 1 is a diagram schematically showing a state in which a monitoring terminal is attached to a pallet.

FIG. 1 is a diagram schematically showing a state in which a monitoring terminal 10 according to the embodiment is attached to a pallet P. As shown in FIG. 1, the monitoring terminal 10 is attached to the pallet P used for storing and transporting cargo or the like. The pallet P is an example of a first object. The first object is not limited to the pallet P and may be an object to be shipped such as cargo.

The monitoring terminal 10 receives shipping information transmitted from a management server 20. The management server 20 is a computer that manages the monitoring terminal 10. The management server 20 is an example of an information processing device that communicates with the monitoring terminal 10. The shipping information includes at least a first destination to which the pallet P is shipped, a first shipping date and time indicating a date and time at which the pallet P is shipped to the first destination, and a first arrival date and time indicating a date and time at which the pallet P arrives at the first destination.

The information relating to the first destination included in the shipping information includes, for example, at least one of a destination ID, which is identification information of the first destination, and position information indicating a position of the first destination. For example, the position information of the first destination includes a longitude and a latitude of the first destination.

The monitoring terminal 10 acquires positioning information including first position information indicating a position of the pallet P, to which the monitoring terminal 10 is attached, at predetermined intervals based on satellite signals received from a plurality of artificial satellites 100. In the following description, the interval at which the positioning information is acquired may sometimes be referred to as a positioning interval. For example, the first position information includes a longitude and a latitude of a place at which the monitoring terminal 10, that is, the pallet P, is located. The monitoring terminal 10 controls the positioning interval based on the shipping information received from the management server 20.

Although not shown in FIG. 1, the monitoring terminal 10 communicates with another monitoring terminal 10 attached to another pallet P. The other monitoring terminal 10 acquires second position information indicating a position of the other pallet P. The other pallet P is an example of a second object.

The other monitoring terminal 10 also receives shipping information transmitted from the management server 20. The shipping information received by the other monitoring terminal 10 may be different from the shipping information received by the monitoring terminal 10. For example, the shipping information received by the other monitoring terminal 10 includes at least a second destination to which the other pallet P is shipped, a second shipping date and time indicating a date and time at which the other pallet P is shipped to the second destination, and a third arrival date and time indicating a date and time at which the other pallet P arrives at the second destination.

For example, the artificial satellite 100 is a Global Positioning System (GPS) satellite. The artificial satellite 100 is not limited to a GPS satellite, and may be, for example, an artificial satellite of another satellite system such as the Russian Global Orbiting Navigation Satellite System (GRONASS), the Chinese BeiDou Navigation Satellite System (BeiDou), the European satellite system Galileo, or the like.

Each time the positioning information is acquired, the monitoring terminal 10 transmits transmission information including the first position information and identification information of the monitoring terminal 10 to the management server 20. That is, the monitoring terminal 10 transmits the transmission information to the management server 20 at the same interval as the positioning interval. In the following description, the interval at which the transmission information is transmitted may be referred to as a communication interval. For example, the identification information of the monitoring terminal 10 is a terminal ID individually assigned to the monitoring terminal 10.

A pallet ID, which is identification information of the pallet P, is also individually assigned to the pallet P. When the monitoring terminal 10 is attached to the pallet P, the terminal ID of the monitoring terminal 10 is associated with the pallet ID of the pallet P. The management server 20 holds a management table indicating the correspondence relationship between the terminal ID and the pallet ID. When the management server 20 receives the transmission information from the monitoring terminal 10, the management server 20 searches the management table for the pallet ID associated with the terminal ID included in the transmission information and associates the retrieved pallet ID with the first position information included in the transmission information.

Figure 2:
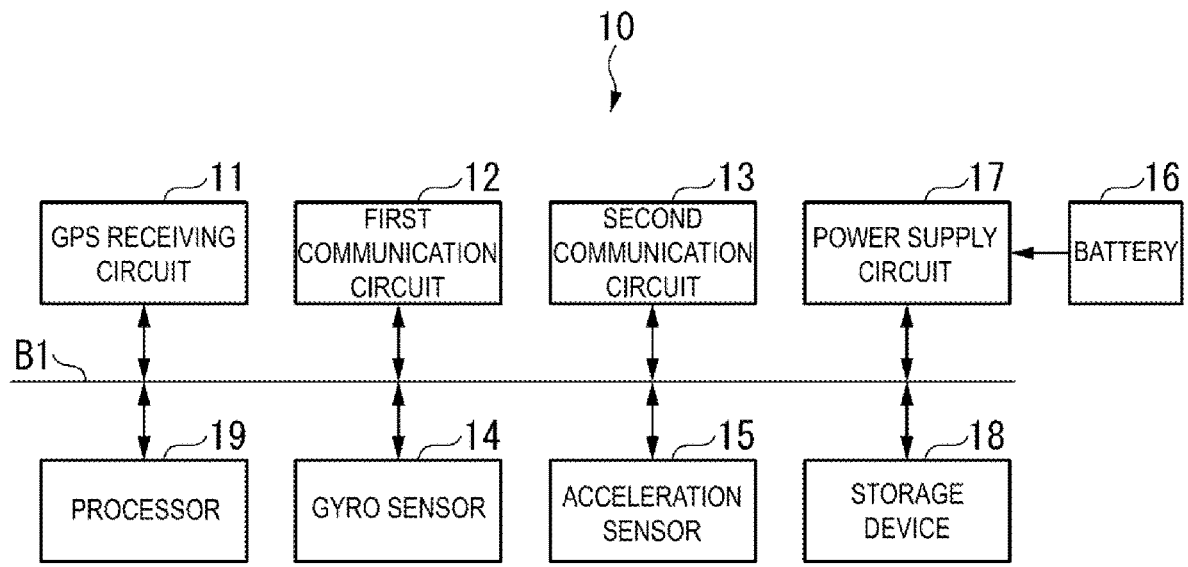
FIG. 2 is a block diagram showing an example of a schematic configuration of the monitoring terminal.

FIG. 2 is a block diagram showing an example of a configuration of the monitoring terminal 10. As shown in FIG. 2, the monitoring terminal 10 includes a GPS receiving circuit 11, a first communication circuit 12, a second communication circuit 13, a gyro sensor 14, an acceleration sensor 15, a battery 16, a power supply circuit 17, a storage device 18, and a processor 19. The processor 19 is communicably coupled to the GPS receiving circuit 11, the first communication circuit 12, the second communication circuit 13, the gyro sensor 14, the acceleration sensor 15, the power supply circuit 17, and the storage device 18 via a bus B1.

The GPS receiving circuit 11 is a circuit having a function as a GPS receiver. The GPS receiving circuit 11 acquires the positioning information including the first position information at a predetermined positioning interval based on the satellite signals received from the plurality of artificial satellites 100. For example, the positioning information includes, in addition to the first position information, strength information indicating a signal strength of a satellite signal, time information indicating a time, and date information indicating a date. The GPS receiving circuit 11 is an example of an acquisition unit.

The first position information included in the positioning information is information indicating a position of the GPS receiving circuit 11, more specifically, a position of an antenna provided in the GPS receiving circuit 11. Since the monitoring terminal 10 includes the GPS receiving circuit 11, the position indicated by the first position information can be regarded as a position of the monitoring terminal 10. Also, since the monitoring terminal 10 is attached to the pallet P, the position indicated by the first position information can be regarded as the position of the pallet P.

Signal strengths of the satellite signals are obtained corresponding to each of the plurality of artificial satellites 100 captured by the GPS receiving circuit 11. For example, the strength information includes a value of a signal to noise ratio (SNR) or a value of a carrier to noise ratio (CNR) as a signal strength of a satellite signal. For example, the time information indicates a time of a coordinated universal time (UTC). The date information indicates the Gregorian calendar year and month and day. For example, when the date information includes a character string "151122", the date information indicates a date of Nov. 15, 2022.

The GPS receiving circuit 11 acquires the positioning information at a positioning interval set by the processor 19 and outputs the acquired positioning information to the processor 19. Since such a function of the GPS receiving circuit 11 as the GPS receiver is a known function, the description of a specific method of acquiring the positioning information based on the satellite signals will be omitted.

The first communication circuit 12 communicates with the management server 20. More specifically, the first communication circuit 12 is a wireless communication module that communicates with the management server 20 via a network. For example, the first communication circuit 12 performs communication in accordance with a wireless communication standard such as SigFox, CatM1, NBIot, or WiFi. The wireless communication standard used by the first communication circuit 12 is not particularly limited. The first communication circuit 12 transmits a signal including information input from the processor 19 to the management server 20 and outputs information included in a signal received from the management server 20 to the processor 19. The first communication circuit 12 is an example of a first communication unit.

The second communication circuit 13 communicates with another monitoring terminal 10. More specifically, the second communication circuit 13 is a wireless communication module that directly communicates with the other monitoring terminal 10 without going through a network. For example, the second communication circuit 13 performs communication in accordance with a short-range wireless communication standard such as BLE. The wireless communication standard used by the second communication circuit 13 is not particularly limited. The second communication circuit 13 transmits a signal including information input from the processor 19 to the other monitoring terminal 10 and outputs information included in a signal received from the other monitoring terminal 10 to the processor 19. The second communication circuit 13 is an example of a second communication unit.

The gyro sensor 14 detects an angular velocity of the monitoring terminal 10, that is, an angular velocity of the pallet P. The gyro sensor 14 outputs angular velocity data indicating the detected angular velocity to the processor 19. The acceleration sensor 15 detects an acceleration of the monitoring terminal 10, that is, an acceleration of the pallet P1. The acceleration sensor 15 outputs acceleration data indicating the detected acceleration to the processor 19. The gyro sensor 14 and the acceleration sensor 15 are examples of a detection unit that detects movement of the pallet P.

The battery 16 is used as a power source of the monitoring terminal 10. The battery 16 outputs a DC voltage having a predetermined voltage value to the power supply circuit 17. The power supply circuit 17 converts the DC voltage output from the battery 16 into a power supply voltage supplied to each electronic component incorporated in the monitoring terminal 10. That is, the GPS receiving circuit 11, the first communication circuit 12, the second communication circuit 13, the gyro sensor 14, the acceleration sensor 15, the storage device 18, and the processor 19 operate with the power supply voltage output from the power supply circuit 17. The power supply circuit 17 detects a remaining level of the battery 16. In the following description, the remaining level of the battery 16 may be referred to as a remaining battery level. The power supply circuit 17 outputs remaining battery level data indicating the detected remaining battery level to the processor 19.

The storage device 18 includes a nonvolatile memory that stores programs, various types of setting data, and the like required for causing the processor 19 to execute various processes, and a volatile memory used as a temporary storage destination of data when the processor 19 executes various processes. For example, the storage device 18 includes a flash memory or the like as the nonvolatile memory, and includes a random access memory (RAM) or the like as the volatile memory. For example, the storage device 18 stores the shipping information transmitted from the management server 20. Also, the storage device 18 stores the terminal ID of the monitoring terminal 10 in advance. The storage device 18 is an example of a storage unit.

The processor 19 controls the overall operation of the monitoring terminal 10 in accordance with the programs stored in the storage device 18 in advance. For example, the processor 19 is configured by one or a plurality of central processing units (CPUs). Some or all functions of the processor 19 may be configured by circuits such as a digital signal processor (DSP), an application-specific integrated circuit (ASIC), a programmable logic device (PLD), or a field programmable gate array (FPGA). The processor 19 performs various processes in parallel or sequentially. The processor 19 is an example of a control unit.

The processor 19 stores the shipping information received from the management server 20 via the first communication circuit 12 in the storage device 18. The processor 19 controls the positioning interval at which the GPS receiving circuit 11 acquires the positioning information based on the shipping information stored in the storage device 18. Each time the positioning information is acquired, the processor 19 transmits the transmission information including the first position information and the terminal ID to the management server 20 via the first communication circuit 12. That is, the processor 19 transmits the transmission information to the management server 20 at the same communication interval as the positioning interval.

In addition, the processor 19 acquires a current date and time indicating a date and time at present. As the current date and time, the date and time indicated by the time information and the date information included in the positioning information may be used, or the date and time obtained from a clock device mounted on the processor 19 may be used as the current date and time.

Although details will be described later, the processor 19 monitors the current date and time obtained from the clock device and sets the positioning interval to a first interval until the shipping date and time included in the shipping information arrives. Further, after the shipping date and time, the processor 19 sets the positioning interval to be shorter than the first interval in accordance with a remaining time until an arrival date and time.

Operations of the monitoring terminal 10 configured as described above will be specifically described below while presenting some examples.

1. First Operation Example of Monitoring Terminal 10

Figure 3:
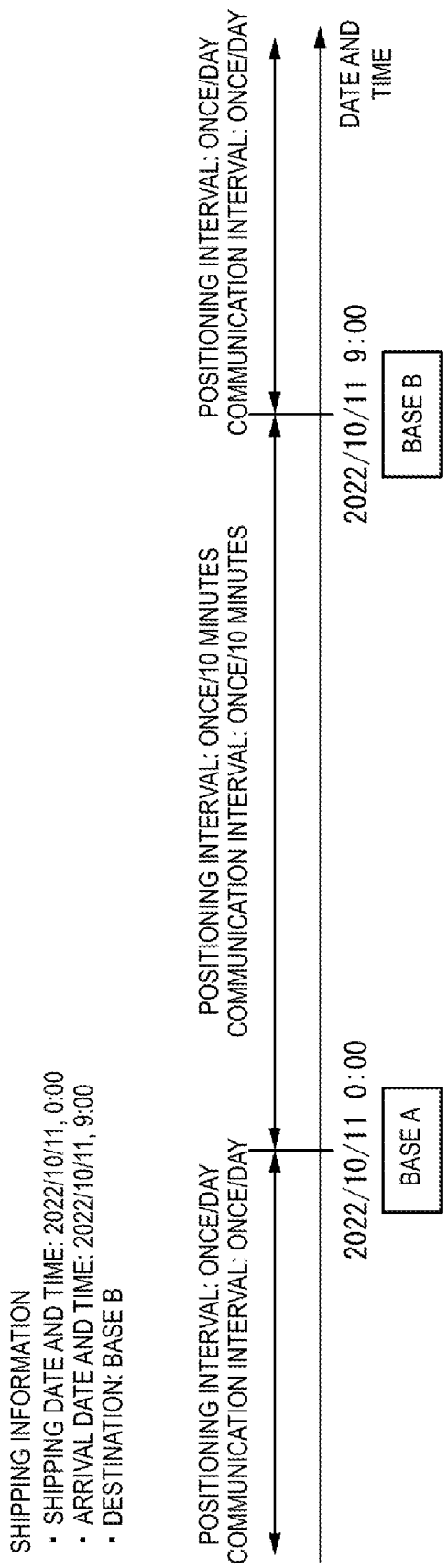
FIG. 3 is an explanatory diagram relating to a first operation example of the monitoring terminal.

First, a first operation example of the monitoring terminal 10 will be described with reference to FIG. 3. FIG. 3 is an explanatory diagram relating to the first operation example of the monitoring terminal 10. The horizontal axis shown in FIG. 3 indicates a date and time. In the first operation example, a case in which the first destination of the pallet P included in the shipping information is a base B, the first shipping date and time included in the shipping information is 0:00 on Oct. 11, 2022, and the first arrival date and time included in the shipping information is 9:00 on Oct. 11, 2022, is exemplified. The pallet P is located at a base A until the date and time reaches the first shipping date and time of 0:00 on Oct. 11, 2022. Also, in FIGS. 3 to 7, the first destination is abbreviated as the destination, the first shipping date and time is abbreviated as the shipping date and time, and the first arrival date and time is abbreviated as the arrival date and time.

The processor 19 of the monitoring terminal 10 attached to the pallet P monitors the current date and time obtained from the clock device and sets the positioning interval to the first interval until the current date and time reaches the first shipping date and time of 0:00 on Oct. 11, 2022. As an example, the first interval is one day, that is, 24 hours. In the embodiment, the first interval is set to one day, but it is not limited thereto, and may be an interval longer than an interval in a period between the first shipping date and time and the first arrival date and time, which will be described later. Thus, since the positioning interval before the first shipping date and time at which the pallet P does not move can be curbed, it is possible to curb electric power consumed by the monitoring terminal 10.

When the positioning interval is set to the first interval, that is, one day, the GPS receiving circuit 11 acquires the positioning information in a cycle of once a day. That is, when the current date and time is a date and time before the first shipping date and time, the GPS receiving circuit 11 acquires the first position information indicating the position of the pallet P at the first interval. Each time the positioning information is acquired, the processor 19 transmits the transmission information including the first position information and the terminal ID to the management server 20 via the first communication circuit 12. That is, the processor 19 transmits the transmission information to the management server 20 in a cycle of once a day. In this way, when the positioning interval is set to one day, the communication interval is also one day.

As described above, until the current date and time reaches the first shipping date and time of 0:00 on Oct. 11, 2022, the monitoring terminal 10 acquires the positioning information in a cycle of once a day and transmits the transmission information to the management server 20 in a cycle of once a day.

The processor 19 sets the positioning interval to a second interval shorter than the first interval when a remaining time until the first arrival date and time is greater than 0 after the current date and time reaches the first shipping date and time of 0:00 on Oct. 11, 2022. As an example, the second interval is 10 minutes.

When the positioning interval is set to the second interval, that is, 10 minutes, the GPS receiving circuit 11 acquires the positioning information in a cycle of once every 10 minutes. That is, the GPS receiving circuit 11 acquires the first position information at the second interval shorter than the first interval when the current date and time is a date and time after the first shipping date and time. Each time the positioning information is acquired, the processor 19 transmits the transmission information to the management server 20 via the first communication circuit 12. That is, the processor 19 transmits the transmission information to the management server 20 in a cycle of once every 10 minutes. In this way, when the positioning interval is set to 10 minutes, the communication interval is also 10 minutes.

As described above, the monitoring terminal 10 acquires the positioning information in a cycle of once every 10 minutes and transmits the transmission information to the management server 20 in a cycle of once every 10 minutes until the current date and time reaches the first arrival date and time of 9:00 on Oct. 11, 2022, after the current date and time has reached the first shipping date and time of 0:00 on Oct. 11, 2022.

After the current date and time has reached the first arrival date and time of 9:00 on Oct. 11, 2022, the processor 19 returns the positioning interval to the first interval. Thus, after the first arrival date and time has arrived, the monitoring terminal 10 acquires the positioning information again in a cycle of once a day and transmits the transmission information to the management server 20 in a cycle of once a day.

As described above, in the first operation example, the monitoring terminal 10 acquires the first position information at the first interval when the current date and time is a date and time before the first shipping date and time, and acquires the first position information at the second interval shorter than the first interval when the current date and time is a date and time after the first shipping date and time. Accordingly, even when the date and time at which the pallet P actually arrives at the base B, which is the first destination, is greatly delayed from the first arrival date and time due to a shipping delay, detailed position information of the pallet P can be acquired around the first arrival date and time.

2. Second Operation Example of Monitoring Terminal 10

Figure 4:
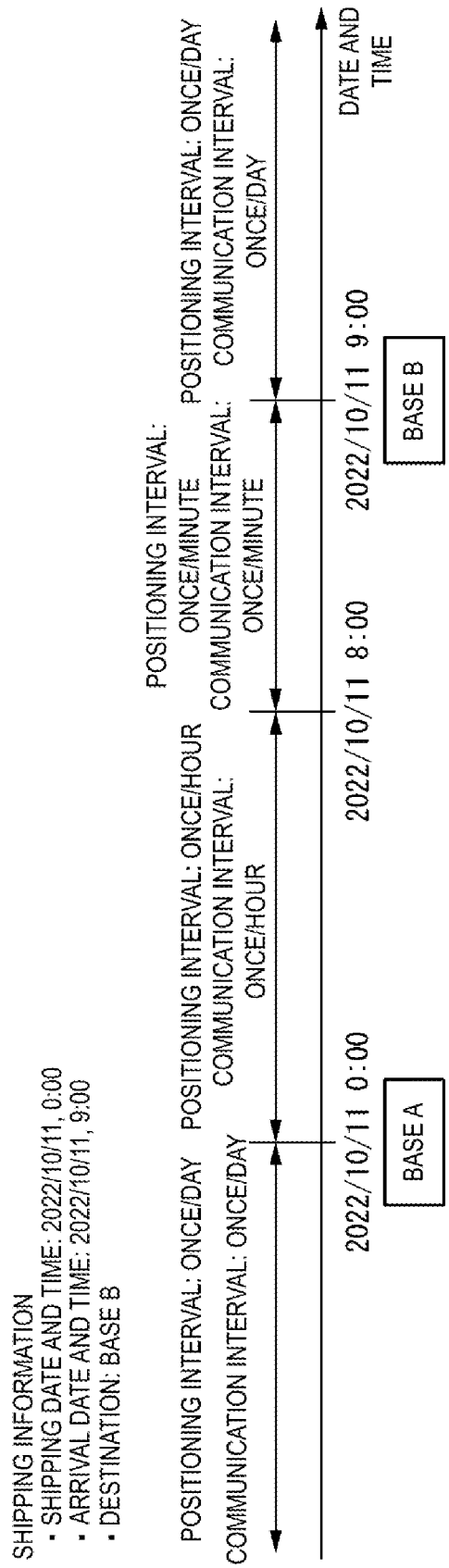
FIG. 4 is an explanatory diagram relating to a second operation example of the monitoring terminal.

Next, a second operation example of the monitoring terminal 10 will be described with reference to FIG. 4. FIG. 4 is an explanatory diagram relating to the second operation example of the monitoring terminal 10. The horizontal axis shown in FIG. 4 indicates a date and time. In the second operation example, the first destination, the first shipping date and time, and the first arrival date and time of the pallet P included in the shipping information are the same as those in the first operation example.

In the second operation example, the operation until the current date and time reaches the first shipping date and time of 0:00 on Oct. 11, 2022 is the same as that in the first operation example. That is, the processor 19 sets the positioning interval to the first interval until the current date and time reaches the first shipping date and time of 0:00 on Oct. 11, 2022. Thus, the monitoring terminal 10 acquires the positioning information in a cycle of once a day and transmits the transmission information to the management server 20 in a cycle of once a day until the first shipping date and time of 0:00 on Oct. 11, 2022 arrives.

The processor 19 sets the positioning interval to the second interval shorter than the first interval when the remaining time until the first arrival date and time is longer than a first time after the current date and time reaches the first shipping date and time of 0:00 on Oct. 11, 2022. As an example, the first time is one hour. Also, as an example, the second interval is one hour. In the embodiment, the first time is set to one hour, but it is not limited thereto, and may be a date and time in a period between the first shipping date and time and the first arrival date and time. In addition, the second interval is set to one hour, but it is not limited thereto, and may be shorter than the first interval. Thus, the positioning interval in the period between the first shipping date and time at which the pallet P is shipped and the first arrival date and time can be made shorter than the positioning interval before the first shipping date and time at which the pallet P is not shipped, and the position of the pallet P can be acquired with higher accuracy.

In this case, the processor 19 sets the positioning interval to the second interval until the date and time reaches 8:00 on Oct. 11, 2022, at which the remaining time until the first arrival date and time is one hour, after the current date and time reaches the first shipping date and time of 0:00 on Oct. 11, 2022.

When the positioning interval is set to the second interval, that is, one hour, the GPS receiving circuit 11 acquires the positioning information in a cycle of once an hour. That is, when the current date and time is a date and time after the first shipping date and time, the GPS receiving circuit 11 acquires the first position information at the second interval shorter than the first interval. Each time the positioning information is acquired, the processor 19 transmits the transmission information to the management server 20 via the first communication circuit 12. That is, the processor 19 transmits the transmission information to the management server 20 in a cycle of once every hour. In this way, when the positioning interval is set to one hour, the communication interval is also one hour.

As described above, the monitoring terminal 10 acquires the positioning information in a cycle of once an hour and transmits the transmission information to the management server 20 in a cycle of once an hour until the date and time reaches 8:00 on Oct. 11, 2022, at which the remaining time until the first arrival date and time is one hour, after the current date and time reaches the first shipping date and time of 0:00 on Oct. 11, 2022.

The processor 19 sets the positioning interval to a third interval shorter than the second interval when the remaining time until the first arrival date and time is equal to or shorter than the first time after the current date and time reaches the first shipping date and time of 0:00 on Oct. 11, 2022. As an example, the third interval is one minute. In this case, the processor 19 sets the positioning interval to the third interval after the date and time reached 8:00 on Oct. 11, 2022, at which the remaining time until the first arrival date and time is one hour. In the embodiment, the third interval is set to one minute, but it is not limited thereto, and may be shorter than the second interval. Thus, it is possible to more accurately acquire the position of the pallet P around the first arrival date and time.

When the positioning interval is set to the third interval, that is, one minute, the GPS receiving circuit 11 acquires the positioning information in a cycle of once a minute. That is, the GPS receiving circuit 11 acquires the first position information at the third interval shorter than the second interval when the current date and time is a date and time after the first shipping date and time and within a predetermined time from the first arrival date and time. Each time the positioning information is acquired, the processor 19 transmits the transmission information to the management server 20 via the first communication circuit 12. That is, the processor 19 transmits the transmission information to the management server 20 in a cycle of once a minute. In this way, when the positioning interval is set to one minute, the communication interval is also one minute.

As described above, the monitoring terminal 10 acquires the positioning information in a cycle of once a minute and transmits the transmission information to the management server 20 in a cycle of once a minute until the current date and time reaches the first arrival date and time of 9:00 on Oct. 11, 2022, after the date and time reached 8:00 on Oct. 11, 2022, at which the remaining time until the first arrival date and time is one hour.

After the current date and time has reached the first arrival date and time of 9:00 on Oct. 11, 2022, the processor 19 returns the positioning interval to the first interval. Thus, after the first arrival date and time has arrived, the monitoring terminal 10 acquires the positioning information again in a cycle of once a day and transmits the transmission information to the management server 20 in a cycle of once a day.

As described above, in the second operation example, the monitoring terminal 10 acquires the first position information at the first interval when the current date and time is a date and time before the first shipping date and time, and acquires the first position information at the second interval shorter than the first interval when the current date and time is a date and time after the first shipping date and time. In addition, the monitoring terminal 10 acquires the first position information at the third interval shorter than the second interval when the current date and time is a date and time after the first shipping date and time and within a predetermined time from the first arrival date and time.

In the second operation example, the positioning interval of the monitoring terminal 10 becomes shorter as the current date and time approaches the first arrival date and time, and thus, even when the date and time at which the pallet P actually arrives at the base B, which is the first destination, is greatly delayed from the first arrival date and time due to a shipping delay, more detailed position information of the pallet P can be acquired around the first arrival date and time.

3. Third Operation Example of Monitoring Terminal 10

Figure 5:
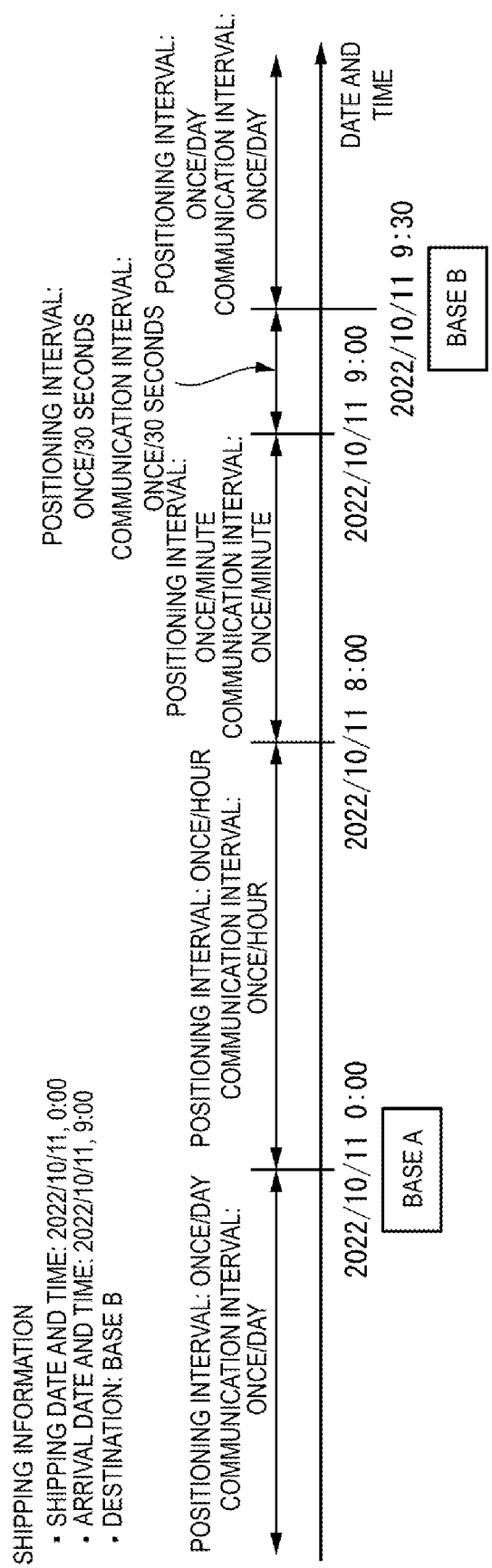
FIG. 5 is an explanatory diagram relating to a third operation example of the monitoring terminal.

Next, a third operation example of the monitoring terminal 10 will be described with reference to FIG. 5. FIG. 5 is an explanatory diagram relating to the third operation example of the monitoring terminal 10. The horizontal axis shown in FIG. 5 indicates a date and time. In the third operation example, the first destination, the first shipping date and time, and the first arrival date and time of the pallet P included in the shipping information are the same as those in the first operation example.

In the third operation example, the operation until the current date and time reaches the first shipping date and time of 0:00 on Oct. 11, 2022 is the same as that in the first operation example. That is, the processor 19 sets the positioning interval to the first interval until the current date and time reaches the first shipping date and time of 0:00 on Oct. 11, 2022. Thus, the monitoring terminal 10 acquires the positioning information in a cycle of once a day and transmits the transmission information to the management server 20 in a cycle of once a day until the first shipping date and time of 0:00 on Oct. 11, 2022 arrives.

In the third operation example, the operation in the period between the first shipping date and time and the first arrival date and time is the same as that in the second operation example. That is, the processor 19 sets the positioning interval to the second interval shorter than the first interval when the remaining time until the first arrival date and time is longer than the first time after the first shipping date and time of 0:00 on Oct. 11, 2022 arrived.

Thus, the monitoring terminal 10 acquires the positioning information in a cycle of once an hour and transmits the transmission information to the management server 20 in a cycle of once an hour until the date and time reaches 8:00 on Oct. 11, 2022, at which the remaining time until the first arrival date and time is one hour, after the first shipping date and time of 0:00 on Oct. 11, 2022 arrived.

The processor 19 sets the positioning interval to the third interval when the remaining time until the first arrival date and time is equal to or shorter than the first time. Thus, the monitoring terminal 10 acquires the positioning information in a cycle of once a minute and transmits the transmission information to the management server 20 in a cycle of once a minute until the first arrival date and time of 9:00 on Oct. 11, 2022 arrives after the date and time reached 8:00 on Oct. 11, 2022, at which the remaining time until the first arrival date and time is one hour.

When the current date and time reaches the first arrival date and time, it is estimated that the pallet P has reached the base B, but in reality, the pallet P may not reach the base B at the first arrival date and time due to a shipping delay. Thus, when the first arrival date and time has arrived, the processor 19 calculates a distance from the pallet P to the base B, which is the first destination, based on the first position information included in the positioning information acquired by the GPS receiving circuit 11. That is, when the current date and time is the first arrival date and time, the processor 19 calculates the distance from the pallet P to the first destination based on the first position information. The shipping information includes the position information of the first destination as the information relating to the first destination. The processor 19 calculates the distance from the pallet P to the base B based on the first position information and the position information of the first destination.

When the distance from the pallet P to the base B is longer than a first distance, the processor 19 sets the positioning interval to a fourth interval shorter than the third interval. As an example, the first distance is 50 m. In addition, as an example, the fourth interval is 30 seconds. In the embodiment, the fourth interval is set to 30 seconds, but it is not limited thereto, and may be shorter than the third interval. Thus, the position of the pallet P around the first arrival date and time can be acquired with higher accuracy.

If the distance from the pallet P to the base B is longer than the first distance when the current date and time reaches the first arrival date and time of 9:00 on Oct. 11, 2022, it is estimated that the pallet P has not reached the base B at the first arrival date and time. In this way, the processor 19 sets the positioning interval to the fourth interval when the first arrival date and time of 9:00 on Oct. 11, 2022 arrives and the distance from the pallet P to the base B is longer than the first distance.

When the positioning interval is set to the fourth interval, that is, 30 seconds, the GPS receiving circuit 11 acquires the positioning information in a cycle of once every 30 seconds. That is, the GPS receiving circuit 11 acquires the first position information at the fourth interval shorter than the third interval when the distance from the pallet P to the first destination is longer than the first distance. Each time the positioning information is acquired, the processor 19 transmits the transmission information to the management server 20 via the first communication circuit 12. That is, the processor 19 transmits the transmission information to the management server 20 in a cycle of once every 30 seconds. In this way, when the positioning interval is set to 30 seconds, the communication interval is also 30 seconds.

As described above, the monitoring terminal 10 acquires the positioning information in a cycle of once every 30 seconds and transmits the transmission information to the management server 20 in a cycle of once every 30 seconds when the current date and time reaches the first arrival date and time and the distance from the pallet P to the base B is longer than the first distance.

Even after the positioning interval has been set to the fourth interval, the processor 19 calculates the distance from the pallet P to the base B based on the first position information included in the positioning information acquired by the GPS receiving circuit 11. Then, when the distance from the pallet P to the base B becomes equal to or shorter than the first distance, the processor 19 returns the positioning interval to the first interval. When the distance from the pallet P to the base B becomes equal to or shorter than the first distance at a date and time after the first arrival date and time, it is estimated that the pallet P has actually reached the base B.

As shown in FIG. 5, for example, when the distance from the pallet P to the base B becomes equal to or shorter than the first distance at 9:30 on Oct. 11, 2022, the processor 19 returns the positioning interval to the first interval at 9:30 on Oct. 11, 2022. Thus, after 9:30 on Oct. 11, 2022, which is estimated to be the date and time at which the pallet P actually arrives at the base B, the monitoring terminal 10 again acquires the positioning information in a cycle of once a day and transmits the transmission information to the management server 20 in a cycle of once a day.

As described above, in the third operation example, similarly to the second operation example, the monitoring terminal 10 acquires the first position information at the first interval when the current date and time is a date and time before the first shipping date and time, and acquires the first position information at the second interval shorter than the first interval when the current date and time is a date and time after the first shipping date and time. In addition, the monitoring terminal 10 acquires the first position information at the third interval shorter than the second interval when the current date and time is a date and time after the first shipping date and time and within a predetermined time from the first arrival date and time.

Further, in the third operation example, the monitoring terminal 10 calculates the distance from the pallet P to the first destination based on the first position information when the current date and time is the first arrival date and time, and acquires the first position information at the fourth interval shorter than the third interval when the distance is longer than the first distance, that is, when it is estimated that the pallet P has not actually reached the first destination at the first arrival date and time.

As described above, in the third operation example, in addition to the fact that the positioning interval of the monitoring terminal 10 becomes shorter as the current date and time approaches the first arrival date and time, when it is estimated that the pallet P has not actually reached the first destination at the first arrival date and time, the positioning interval is set to the fourth interval shorter than the third interval even after the first arrival date and time. Accordingly, even when the date and time at which the pallet P actually arrives at the base B, which is the first destination, is greatly delayed from the first arrival date and time due to a shipping delay, more detailed position information of the pallet P can be acquired around the date and time at which the pallet P actually arrives at the first destination.

4. Fourth Operation Example of Monitoring Terminal 10

Figure 6:
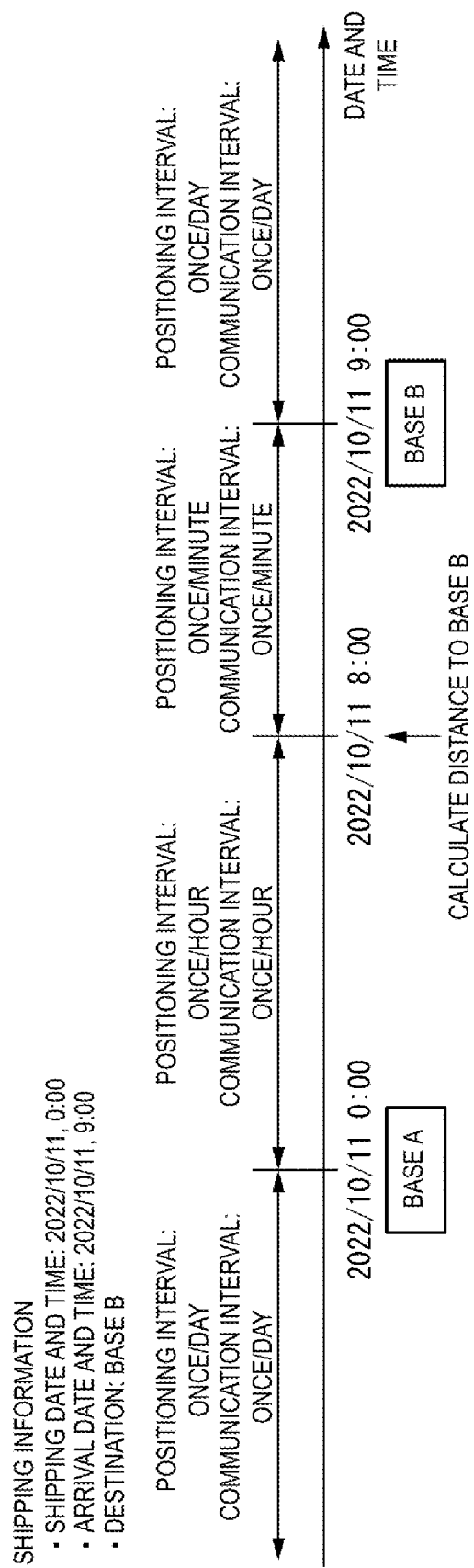
FIG. 6 is a first explanatory diagram relating to a fourth operation example of the monitoring terminal.
Figure 7:
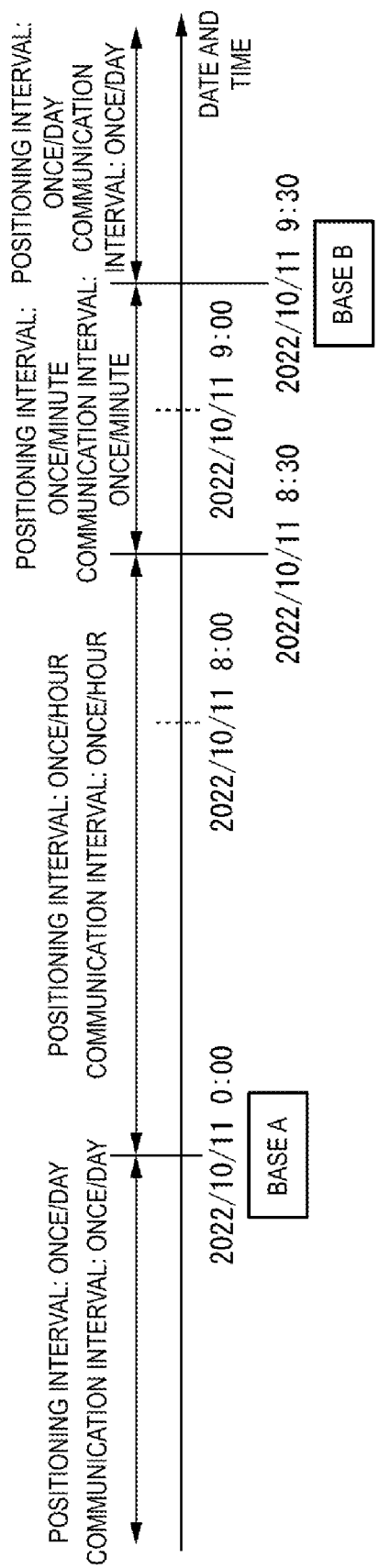
FIG. 7 is a second explanatory diagram relating to the fourth operation example of the monitoring terminal.

Next, a fourth operation example of the monitoring terminal 10 will be described with reference to FIGS. 6 and 7. FIGS. 6 and 7 are explanatory diagrams relating to the fourth operation example of the monitoring terminal 10. The horizontal axis shown in FIGS. 6 and 7 indicates a date and time. In the fourth operation example, the first destination, the first shipping date and time, and the first arrival date and time of the pallet P included in the shipping information are the same as those in the first operation example.

In the fourth operation example, the operation until the current date and time reaches the first shipping date and time of 0:00 on Oct. 11, 2022 is the same as that in the first operation example. That is, as shown in FIG. 6, the processor 19 sets the positioning interval to the first interval until the first shipping date and time of 0:00 on Oct. 11, 2022 arrives. Thus, the monitoring terminal 10 acquires the positioning information in a cycle of once a day and transmits the transmission information to the management server 20 in a cycle of once a day until the first shipping date and time of 0:00 on Oct. 11, 2022 arrives.

In addition, the processor 19 sets the positioning interval to the second interval shorter than the first interval when the remaining time until the first arrival date and time is longer than the first time after the current date and time reaches the first shipping date and time of 0:00 on Oct. 11, 2022.

Thus, the monitoring terminal 10 acquires the positioning information in a cycle of once an hour and transmits the transmission information to the management server 20 in a cycle of once an hour until the date and time reaches 8:00 on Oct. 11, 2022, at which the remaining time until the first arrival date and time is one hour, after the current date and time has reached the first shipping date and time of 0:00 on Oct. 11, 2022.

When the remaining time until the first arrival date and time is equal to or shorter than the first time, the processor 19 calculates the distance from the pallet P to the base B, which is the first destination, based on the first position information included in the positioning information acquired by the GPS receiving circuit 11. That is, the processor 19 calculates the distance from the pallet P to the base B when the date and time reached 8:00 on Oct. 11, 2022, at which the remaining time until the first arrival date and time is one hour. In other words, the processor 19 calculates the distance from the pallet P to the first destination based on the first position information when the current date and time is a date and time within a predetermined time from the first arrival date and time.

Then, based on the distance from the pallet P to the base B, the processor 19 calculates a second arrival date and time indicating a date and time different from the first arrival date and time. For example, based on the first position information obtained in a period from the first shipping date and time of 0:00 on Oct. 11, 2022 to 8:00 on Oct. 11, 2022, at which the remaining time to the first arrival date and time is one hour, the processor 19 calculates an average moving speed of the pallet P, and by dividing the distance from the pallet P to the base B by the average moving speed, calculates the time required for the pallet P to reach the base B. Then, the processor 19 calculates the second arrival date and time by adding the time required for the pallet P to reach the base B to 8:00 on Oct. 11, 2022.

As shown in FIG. 7, for example, it is assumed that 9:30 on Oct. 11, 2022 is calculated as the second arrival date and time. The processor 19 corrects the first arrival date and time stored in the storage device 18 to the second arrival date and time. In this way, when the current date and time is a date and time within a predetermined time from the first arrival date and time, the processor 19 calculates the distance from the pallet P to the first destination based on the first position information. Then, based on the calculated distance, the processor 19 changes the date and time, at which the pallet P arrives at the first destination, from the first arrival date and time to the second arrival date and time.

Then, when the remaining time until the second arrival date and time is longer than the first time, the processor 19 sets the positioning interval to the second interval. Thus, the monitoring terminal 10 acquires the positioning information in a cycle of once an hour and transmits the transmission information to the management server 20 in a cycle of once an hour until the date and time reaches 8:30 on Oct. 11, 2022, at which the remaining time until the second arrival date and time is one hour, after the current date and time has reached the first shipping date and time of 0:00 on Oct. 11, 2022.

The processor 19 sets the positioning interval to the third interval when the remaining time until the second arrival date and time is equal to or shorter than the first time. That is, the processor 19 sets the positioning interval to the third interval after the date and time reached 8:30 on Oct. 11, 2022, at which the remaining time until the second arrival date and time is one hour. Thus, the GPS receiving circuit 11 acquires the first position information at the third interval shorter than the second interval when the current date and time is a date and time after the first shipping date and time and within a predetermined time from the second arrival date and time.

Thus, the monitoring terminal 10 acquires the positioning information in a cycle of once a minute and transmits the transmission information to the management server 20 in a cycle of once a minute until the date and time reaches the second arrival date and time of 9:30 on Oct. 11, 2022, after the date and time reached 8:30 on Oct. 11, 2022, at which the remaining time until the second arrival date and time is one hour.

After the date and time reached the second arrival date and time of 9:30 on Oct. 11, 2022, the processor 19 returns the positioning interval to the first interval. Thus, after the second arrival date and time has arrived, the monitoring terminal 10 again acquires the positioning information in a cycle of once a day and transmits the transmission information to the management server 20 in a cycle of once a day.

As described above, in the fourth operation example, the monitoring terminal 10 acquires the first position information at the first interval when the current date and time is a date and time before the first shipping date and time, and acquires the first position information at the second interval shorter than the first interval when the current date and time is a date and time after the first shipping date and time. In addition, when the current date and time is a date and time within a predetermined time from the first arrival date and time, the monitoring terminal 10 calculates the distance from the pallet P to the first destination based on the first position information.

Based on the calculated distance, the monitoring terminal 10 changes the date and time, at which the pallet P arrives at the first destination, from the first arrival date and time to the second arrival date and time indicating a date and time different from the first arrival date and time. Then, when the current date and time is a date and time after the first shipping date and time and within a predetermined time from the second arrival date and time, the monitoring terminal 10 acquires the first position information at the third interval shorter than the second interval.

As described above, in the fourth operation example, when the current date and time is a date and time within a predetermined time from the first arrival date and time, the monitoring terminal 10 calculates the second arrival date and time, at which the pallet P is expected to actually reach the first destination, based on the distance from the pallet P to the first destination. In the fourth operation example, the positioning interval of the monitoring terminal 10 becomes shorter as the second arrival date and time approaches, and thus, even when the date and time at which the pallet P actually arrives at the base B, which is the first destination, is greatly delayed from the first arrival date and time due to a shipping delay, more detailed position information of the pallet P can be acquired around the second arrival date and time at which the pallet P is expected to actually reach the first destination.

The first to fourth operation examples have been described above, but when the actual shipping date and time of the pallet P is delayed from the first shipping date and time included in the shipping information for some reason, the positioning interval and the communication interval of the monitoring terminal 10 may be shortened before the actual shipping date and time, and the power consumption of the monitoring terminal 10 may increase unnecessarily.

In order to cope with the shipping delay as described above, the processor 19 acquires the date and time at which at least one of the gyro sensor 14 and the acceleration sensor 15 detects the movement of the pallet P as a movement date and time. For example, the processor 19 acquires the date and time at which at least one of an angular velocity detected by the gyro sensor 14 and an acceleration detected by the acceleration sensor 15 exceeds a threshold as the movement date and time. When a time difference between the movement date and time acquired as described above and the first shipping date and time included in the shipping information is greater than a predetermined time, the processor 19 changes the first shipping date and time included in the shipping information to the date and time indicated by the movement date and time.

As described above, by changing the first shipping date and time included in the shipping information to the date and time indicated by the movement date and time, control of the positioning interval is performed starting from the date and time at which the shipping of the pallet P is estimated to have actually started, and thus, it is possible to avoid an unnecessary increase in the power consumption of the monitoring terminal 10 due to the shipping delay.

5. Fifth Operation Example of Monitoring Terminal 10

Figure 8:
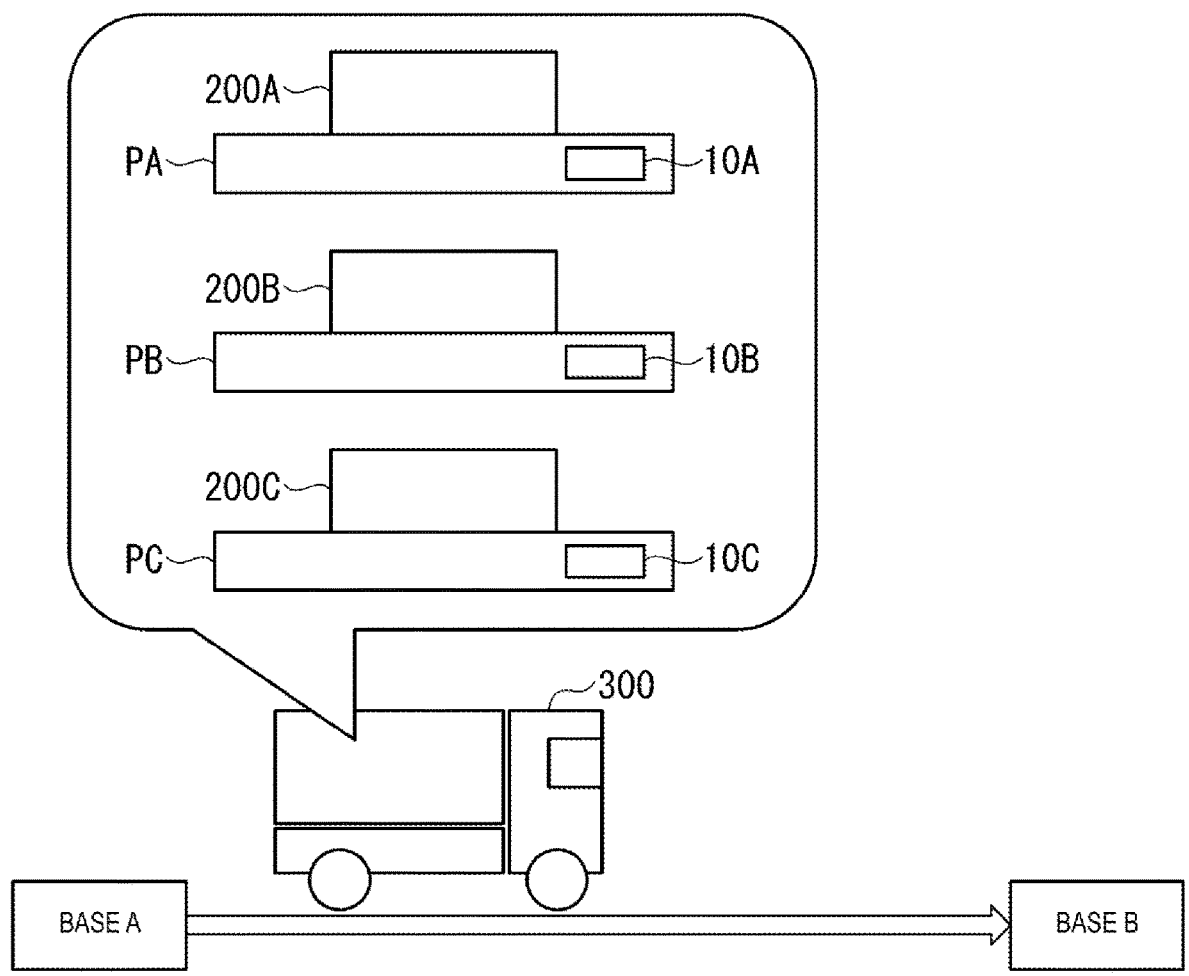
FIG. 8 is a diagram showing a situation in which a fifth operation example of the monitoring terminal works effectively.

Next, a fifth operation example of the monitoring terminal 10 will be described with reference to FIGS. 8 to 12. FIG. 8 is a diagram showing a situation in which the fifth operation example of the monitoring terminal 10 works effectively. As shown in FIG. 8, as the situation in which the fifth operation example works effectively, a situation in which a plurality of monitoring terminals 10 are shipped to the same destination by one shipping vehicle 300 with each of the monitoring terminals 10 attached to the pallet P is assumed.

As shown in FIG. 8, as the plurality of monitoring terminals 10, a monitoring terminal 10A, a monitoring terminal 10B, and a monitoring terminal 10C are exemplified. The monitoring terminal 10A is attached to a pallet PA on which cargo 200A is placed. The monitoring terminal 10B is attached to a pallet PB on which cargo 200B is placed. The monitoring terminal 10C is attached to a pallet PC on which cargo 200C is placed. Destinations of the pallets PA, PB, and PC are the base B. The pallets PA, PB, and PC are shipped from the base A to the base B by one shipping vehicle 300.

In the situation described above, each of the monitoring terminals 10A, 10B, and 10C may acquire the positioning information and transmit the transmission information at the positioning intervals described in the first to fourth operation examples. However, in this case, the position information included in the transmission information transmitted from the monitoring terminals 10A, 10B, and 10C to the management server 20 is information indicating the same position. For that reason, in such a situation as described above, there is little technical merit in operating the monitoring terminals 10A, 10B, and 10C at the same time. Rather, the total power consumption of the monitoring terminals 10A, 10B, and 10C may increase unnecessarily.

The fifth operation example of the monitoring terminal 10 is an operation example of curbing the total power consumption of the plurality of monitoring terminals 10 in the situation as described above. The fifth operation example of the monitoring terminal 10 will be specifically described below.

Figures 9, 10:
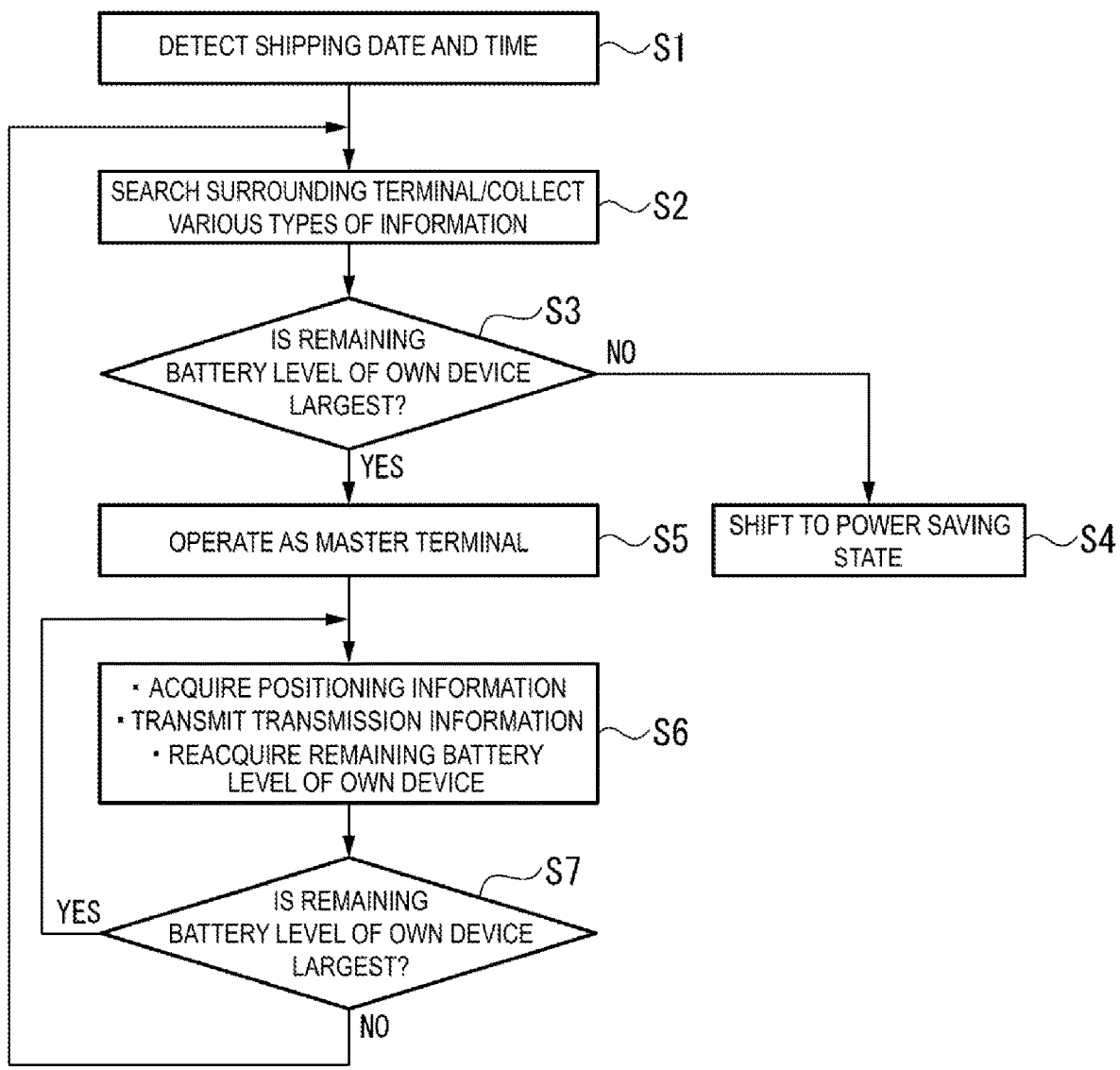
FIG. 9 is a first flowchart showing each process executed by a processor of the monitoring terminal in the fifth operation example.
FIG. 10 is a diagram showing a specific example in which each monitoring terminal becomes either a master terminal or a slave terminal depending on its remaining battery level in the situation of FIG. 8.

FIG. 9 is a first flowchart showing each process executed by the processor 19 of the monitoring terminal 10 in the fifth operation example. In the situation shown in FIG. 8, the processor 19 of each of the monitoring terminals 10A, 10B, and 10C executes each process shown in FIG. 9.

As shown in FIG. 9, the processor 19 monitors the current date and time obtained from the clock device and detects that the shipping date and time has arrived (step S1). When the processor 19 detects that the shipping date and time has arrived, the processor 19 searches for other monitoring terminals 10 present around the own device via the second communication circuit 13 and collects various types of information from the other monitoring terminals 10 (step S2).

For example, the various types of information collected from the other monitoring terminals 10 include at least one of terminal information, shipping information, and reception environment information. The terminal information includes at least a terminal ID and a remaining battery level. The reception environment information includes at least an average signal strength at the time of positioning and a communication signal strength. The average signal strength at the time of positioning is an average value of signal strengths of satellite signals included in the positioning information. The average signal strength is an example of a satellite signal strength. The communication signal strength is, for example, a strength of a signal received by the first communication circuit 12 from a wireless access point such as a base station.

As described above, the processor 19 acquires at least remaining battery levels of the other monitoring terminals 10 and terminal IDs of the other monitoring terminals 10 from the other monitoring terminals 10 via the second communication circuit 13, and then determines whether or not the remaining battery level of the own device is greater than the remaining battery levels of the other monitoring terminals 10 (step S3). In other words, in step S3, the processor 19 determines whether or not the remaining battery level of the own device is the largest as compared with the remaining battery levels of the other monitoring terminals 10.

When the remaining battery level of the own device is smaller than the remaining battery levels of the other monitoring terminals 10 (No at step S3), the processor 19 shifts the own device to a power saving state (step S4). For example, the power saving state is a sleep state, a standby state, or the like. In the following description, the monitoring terminal 10 that shifts to the power saving state may be referred to as a slave terminal.

On the other hand, when the remaining battery level of the own device is greater than the remaining battery levels of the other monitoring terminals 10 (step S3: Yes), the processor 19 operates as a master terminal (step S5). The master terminal is the monitoring terminal 10 in a normal operation state, that is, the monitoring terminal 10 that acquires the positioning information and transmits the transmission information at predetermined intervals.

An important point here is that, when the processor 19 operates as the master terminal, the processor 19 transmits the transmission information including the position information of the own device, the terminal ID of the own device, and the terminal IDs of the other monitoring terminals 10 located therearound to the management server 20 via the first communication circuit 12. This is because the monitoring terminal 10 that shifts to the power saving state does not transmit the transmission information including the terminal ID to the management server 20 as long as it is in the power saving state. For that reason, it is required to notify the management server 20 that the position information included in the transmission information transmitted from the master terminal is information indicating not only the position of the pallet P to which the master terminal is attached but also the position of the pallet P to which another slave terminal is attached.

On the other hand, when the processor 19 causes the own device to shift to the power saving state, the processor 19 does not transmit the transmission information including the position information of the own device, the terminal ID of the own device, and the terminal IDs of the other monitoring terminals 10 located therearound to the management server 20.

As the master terminal, the processor 19 acquires the positioning information and transmits the transmission information at predetermined intervals and acquires the remaining battery level of the own device again (step S6). Then, the processor 19 determines again whether or not the remaining battery level of the own device is greater than the remaining battery levels of the other monitoring terminals 10 (step S7).

When the remaining battery level of the own device is greater than the remaining battery levels of the other monitoring terminals 10 (step S7: Yes), the processor 19 returns to step S6 and continues to operate as the master terminal. On the other hand, when the remaining battery level of the own device is smaller than the remaining battery levels of the other monitoring terminals 10 (step S7: No), the processor 19 returns to step S2 to search for the other monitoring terminals 10 present around the own device again and collect various types of information from the other monitoring terminals 10.

Then, the processor 19 determines again whether or not the remaining battery level of the own device is greater than the remaining battery levels of the other monitoring terminals 10 (step S3), and the processor 19 continues to operate as the master terminal if the remaining battery level of the own device is greater than the remaining battery levels of the other monitoring terminals 10 (step S5), and the processor 19 shifts the own device to the power saving state if the remaining battery level of the own device is smaller than the remaining battery levels of the other monitoring terminals 10 (step S4).

FIG. 10 is a diagram showing a specific example in which each monitoring terminal 10 becomes either the master terminal or the slave terminal depending on its remaining battery level in the situation shown in FIG. 8.

As shown in FIG. 10, for example, when the remaining battery level of the monitoring terminal 10A is 20%, the remaining battery level of the monitoring terminal 10B is 80%, and the remaining battery level of the monitoring terminal 10C is 50% as of the shipping date and time, the processor 19 of each of the monitoring terminals 10 executes each process shown in FIG. 9, and thus, the monitoring terminal 10B operates as the master terminal and the monitoring terminals 10A and 10C become the slave terminals. In other words, the monitoring terminal 10B is in the normal operation state, and the monitoring terminals 10A and 10C are in the power saving state.

According to the fifth operation example described above, in the situation in which the plurality of monitoring terminals 10 are shipped to the same destination by one shipping vehicle 300 while each of the monitoring terminals 10 is attached to the pallet P, only the monitoring terminal 10 having the largest remaining battery level acquires the positioning information and transmits the transmission information, and thus, it is possible to curb the total power consumption of the plurality of monitoring terminals 10.

The flowchart of FIG. 9 shows an example in which the monitoring terminal 10 having the largest remaining battery level among the plurality of monitoring terminals 10 shipped to the same destination by one shipping vehicle 300 operates as the master terminal, but for example, as described below, the monitoring terminal 10 having the largest average signal strength, that is, the largest satellite signal strength among the plurality of monitoring terminals 10 may operate as the master terminal.

Figures 11, 12:
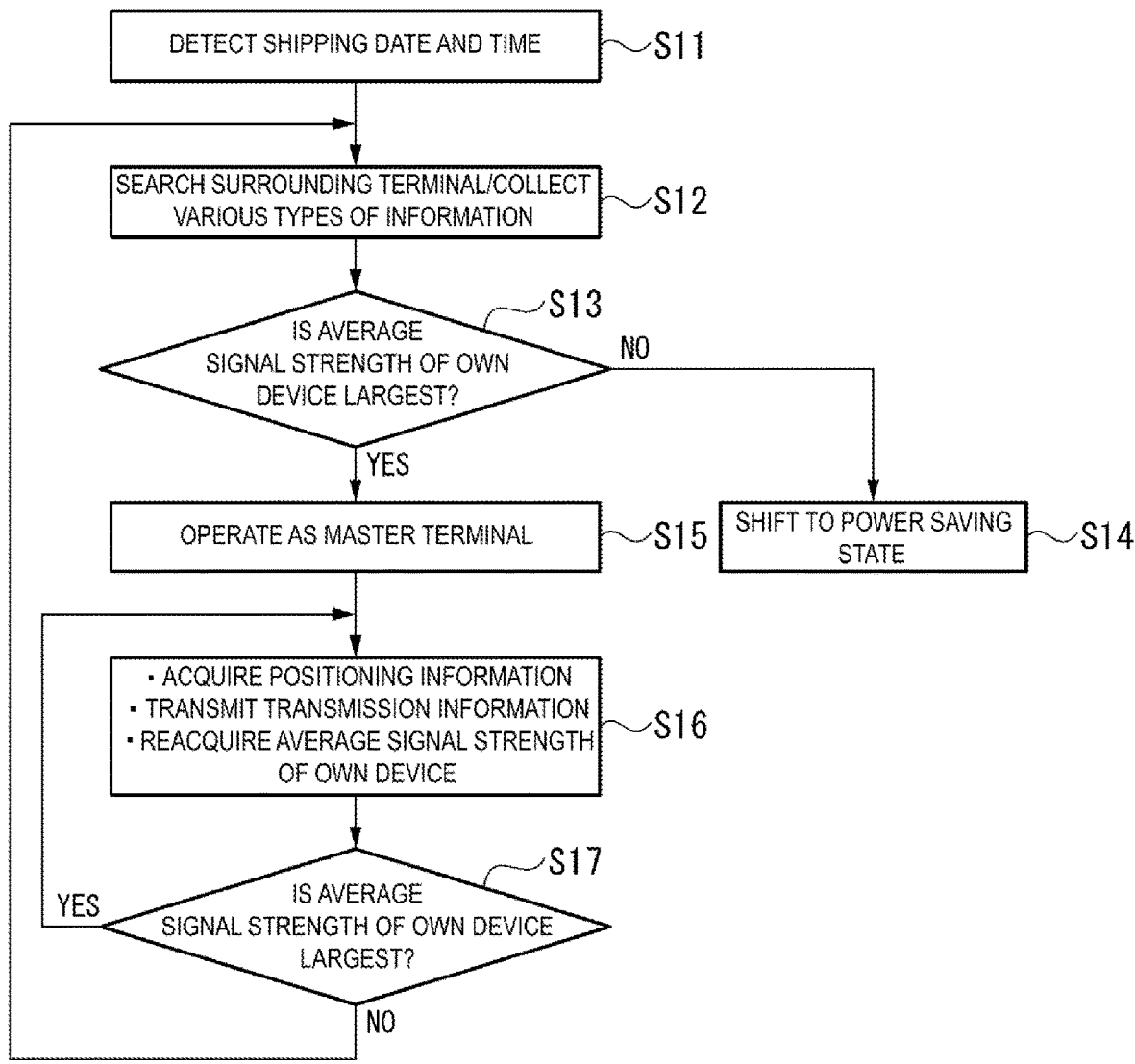
FIG. 11 is a second flowchart showing each process executed by the processor of the monitoring terminal in the fifth operation example.
FIG. 12 is a diagram showing a specific example in which each monitoring terminal becomes either the master terminal or the slave terminal depending on its average signal strength in the situation of FIG. 8.

FIG. 11 is a second flowchart showing each process executed by the processor 19 of the monitoring terminal 10 in the fifth operation example. In the situation shown in FIG. 8, the processor 19 of each of the monitoring terminals 10A, 10B, and 10C executes each process shown in FIG. 11.

As shown in FIG. 11, the processor 19 monitors the date and time obtained from the clock device and detects that the shipping date and time has arrived (step S11). When the processor 19 detects that the shipping date and time has arrived, the processor 19 searches for other monitoring terminals 10 present around the own device via the second communication circuit 13 and collects various types of information from the other monitoring terminals 10 (step S12). As already described, the various types of information include at least one of the terminal information, the shipping information, and the receiving environment information.

After acquiring at least the average signal strength of the other monitoring terminals 10 and the terminal IDs of the other monitoring terminals 10 from the other monitoring terminals 10 via the second communication circuit 13, the processor 19 determines whether or not the average signal strength of the own device is greater than the average signal strengths of the other monitoring terminals 10 (step S13). In other words, in step S13, the processor 19 determines whether or not the average signal strength of the own device is the largest as compared with the average signal strengths of the other monitoring terminals 10.

When the average signal strength of the own device is smaller than the average signal strengths of the other monitoring terminals 10 (step S13: No), the processor 19 shifts the own device to the power saving state (step S14). When the processor 19 shifts the own device to the power saving state, the processor 19 does not transmit the transmission information including the position information of the own device, the terminal ID of the own device, and the terminal IDs of other monitoring terminals 10 located therearound to the management server 20.

On the other hand, when the average signal strength of the own device is greater than the average signal strengths of the other monitoring terminals 10 (step S13: Yes), the processor 19 operates as the master terminal (step S15). When the processor 19 operates as the master terminal, the processor 19 transmits the transmission information including the position information of the own device, the terminal ID of the own device, and the terminal IDs of the other monitoring terminals 10 located therearound to the management server 20 via the first communication circuit 12.

The processor 19, as the master terminal, acquires the positioning information and transmits the transmission information at predetermined intervals, and reacquires the average signal strength of the own device (step S16). Then, the processor 19 determines again whether or not the average signal strength of the own device is greater than the average signal strengths of the other monitoring terminals 10 (step S17).

When the average signal strength of the own device is greater than the average signal strengths of the other monitoring terminals 10 (step S17: Yes), the processor 19 returns to step S16 and continues to operate as the master terminal. On the other hand, when the average signal strength of the own device is smaller than the average signal strengths of the other monitoring terminals 10 (step S17: No), the processor 19 returns to step S12 to search for the other monitoring terminals 10 present around the own device again and collect various types of information from the other monitoring terminals 10.

Then, the processor 19 determines again whether or not the average signal strength of the own device is greater than the average signal strengths of the other monitoring terminals 10 (step S13), and the processor 19 continues to operate as the master terminal if the average signal strength of the own device is greater than the average signal strengths of the other monitoring terminals 10 (step S15), and the processor 19 shifts the own device to the power saving state if the average signal strength of the own device is smaller than the average signal strengths of the other monitoring terminals 10 (step S14).

FIG. 12 is a diagram showing a specific example in which each monitoring terminal 10 becomes either the master terminal or the slave terminal depending on its average signal strength (for example, average SNR value) in the situation shown in FIG. 8.

As shown in FIG. 12, for example, when the average signal strength of the monitoring terminal 10A is 38, the average signal strength of the monitoring terminal 10B is 32, and the average signal strength of the monitoring terminal 10C is 45 as of the shipping date and time, the processor 19 of each of the monitoring terminals 10 executes each process shown in FIG. 11, and thus, the monitoring terminal 10C operates as the master terminal and the monitoring terminals 10A and 10B become the slave terminals. In other words, the monitoring terminal 10C is in the normal operation state, and the monitoring terminals 10A and 10B are in the power saving state.

As described above, in the situation in which the plurality of monitoring terminals 10 are shipped to the same destination by one shipping vehicle 300 with each of the monitoring terminals 10 attached to the pallet P, only the monitoring terminal 10 having the largest average signal strength acquires the positioning information and transmits the transmission information, and thus, it is possible to curb the total power consumption of the plurality of monitoring terminals 10 and to further increase the possibility of the GPS receiving circuit 11 acquiring the positioning information.

Also, as shown in FIG. 12, when the average signal strength of the monitoring terminal 10C is the largest and the communication signal strength of the monitoring terminal 10A is the largest, the monitoring terminal 10C may become a terminal in charge of acquiring the positioning information and the monitoring terminal 10A may become a terminal in charge of transmitting the transmission information to the management server 20. In this case, the monitoring terminal 10B is in the power saving state.

In this case, the monitoring terminal 10C is in the power saving state until an acquisition timing of the positioning information arrives. When the acquisition timing of the positioning information arrives, the monitoring terminal 10C returns from the power saving state and acquires the positioning information. The monitoring terminal 10C transmits the transmission information including the position information of the own device and the terminal IDs of the monitoring terminals 10A, 10B, and 10C to the monitoring terminal 10A, and then shifts to the power saving state again.

On the other hand, the monitoring terminal 10A is in the power saving state until the transmission information is received from the monitoring terminal 10C. When the transmission information is received from the monitoring terminal 10C, the monitoring terminal 10A returns from the power saving state, transmits the transmission information received from the monitoring terminal 10C to the management server 20, and then shifts to the power saving state again.

As described above, the monitoring terminal 10C is in charge of acquiring the positioning information and the monitoring terminal 10A is in charge of transmitting the transmission information to the management server 20, and thus, it is possible to increase the possibility that the positioning information is acquired and the transmission information is transmitted to the management server 20.

6. Sixth Operation Example of Monitoring Terminal 10

Figure 13:
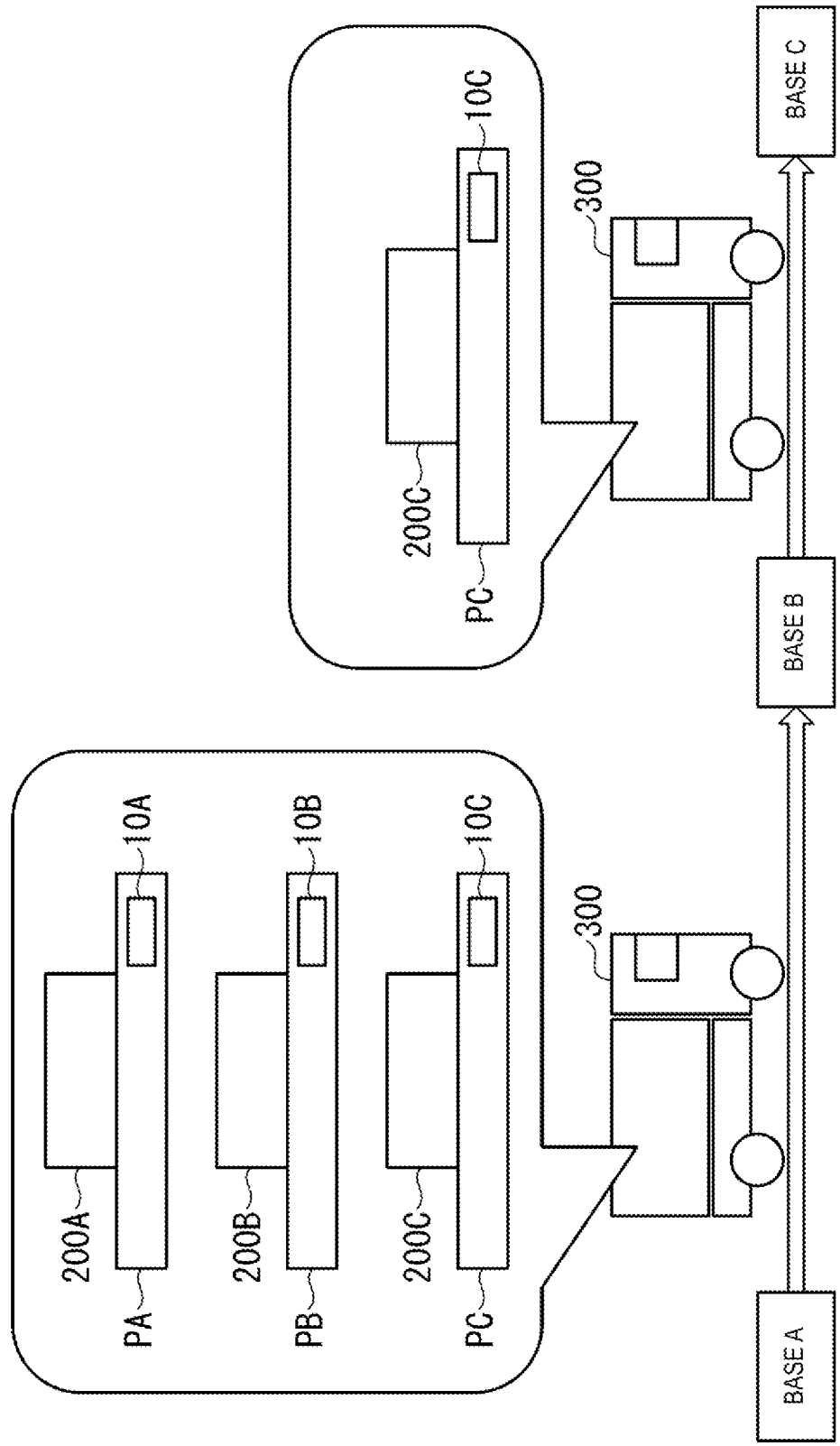
FIG. 13 is a diagram showing a situation in which a sixth operation example of the monitoring terminal works effectively.

Next, a sixth operation example of the monitoring terminal 10 will be described with reference to FIGS. 13 to 15. FIG. 13 is a diagram showing a situation in which the sixth operation example of monitoring terminal 10 works effectively. As shown in FIG. 13, as the situation in which the sixth operation example works effectively, a situation in which a plurality of monitoring terminals 10 are shipped to different destinations by one shipping vehicle 300 with each of the monitoring terminals 10 attached to the pallet P is assumed.

As shown in FIG. 13, the monitoring terminals 10A, 10B, and 10C are exemplified as the plurality of monitoring terminals 10. The monitoring terminal 10A is attached to the pallet PA on which the cargo 200A is placed. The monitoring terminal 10B is attached to the pallet PB on which the cargo 200B is placed. The monitoring terminal 10C is attached to the pallet PC on which the cargo 200C is placed. Destinations of the pallets PA and PB are the base B. A destination of the pallet PC is the base C. First, the pallets PA, PB, and PC are shipped from the base A to the base B by one shipping vehicle 300. The pallets PA and PB are unloaded from the shipping vehicle 300 at the base B. After that, the pallet PC is shipped from the base B to the base C by the shipping vehicle 300.

In the situation described above, each of the monitoring terminals 10A, 10B, and 10C may acquire the positioning information and transmit the transmission information at the intervals described in the first to fourth operation examples. However, in this case, the position information included in the transmission information transmitted from the monitoring terminals 10A, 10B, and 10C to the management server 20 during the period in which the shipping vehicle 300 moves from the base A to the base B is information indicating the same position. For that reason, in such a situation as described above, there is little technical merit in operating the monitoring terminals 10A, 10B, and 10C at the same time. Rather, the total power consumption of the monitoring terminals 10A, 10B, and 10C may increase unnecessarily.

The sixth operation example of the monitoring terminal 10 is an operation example of curbing the total power consumption of the plurality of monitoring terminals 10 in the situation as described above. The sixth operation example of the monitoring terminal 10 will be specifically described below.

In the sixth operation example, the operation during the period in which the shipping vehicle 300 moves from the base A to the base B is the same as that in the fifth operation example. That is, when the processor 19 of the monitoring terminal 10 detects that the shipping date and time has arrived, the processor 19 searches for other monitoring terminals 10 present around the own device via the second communication circuit 13 and collects various types of information from the other monitoring terminals 10. As already described, the various types of information include at least one of the terminal information, the shipping information, and the receiving environment information.

The processor 19 acquires at least the remaining battery levels of the other monitoring terminals 10 and the terminal IDs of the other monitoring terminals 10 from the other monitoring terminals 10 via the second communication circuit 13, and then operates as the master terminal when the remaining battery level of the own device is greater than the remaining battery levels of the other monitoring terminals 10. On the other hand, when the remaining battery level of the own device is smaller than the remaining battery levels of the other monitoring terminals 10, the processor 19 shifts the own device to the power saving state. In this case, the monitoring terminal 10 is the slave terminal.

The above operation is the same as that of the fifth operation example. A particular operation of the sixth operation example will be described below separately for a first case and a second case.

(1) First Case

When the processor 19 of the master terminal determines that it has reached the destination of the slave terminal, that is, the destination of the pallet P to which the slave terminal is attached, before the own device, the master terminal notifies the slave terminal and the management server 20 that it has reached the destination of the slave terminal.

For example, when the arrival date and time of the slave terminal, that is, the arrival date and time of the pallet P to which the slave terminal is attached, has arrived, the processor 19 of the master terminal may determine that the own device has reached the destination of the slave terminal. Alternatively, the processor 19 of the master terminal may determine that the own device has reached the destination of the slave terminal when a distance between the position of the own device and the destination of the slave terminal becomes equal to or shorter than a predetermined distance.

After notifying the slave terminal and the management server 20 that the master terminal has reached the destination of the slave terminal, the processor 19 of the master terminal continues to operate as the master terminal until the master terminal arrives at the destination of the own device.

The processor 19 of the slave terminal maintains the power saving state when it is notified that the master terminal has reached the destination of the slave terminal. This is because when the master terminal has reached the destination of the slave terminal, the slave terminal is unloaded from the shipping vehicle 300 together with the pallet P to which the slave terminal is attached.

FIG. 14 is a first diagram showing a specific example in which each monitoring terminal 10 becomes either the master terminal or the slave terminal depending on its remaining battery level in the situation shown in FIG. 13. As shown in FIG. 14, for example, it is assumed that, as of the shipping date and time, the remaining battery level of the monitoring terminal 10A whose destination is the base B is 20%, the remaining battery level of the monitoring terminal 10B whose destination is the base B is 50%, and the remaining battery level of the monitoring terminal 10C whose destination is the base C is 80%.

In this case, during the period in which the shipping vehicle 300 moves from the base A to the base B, the monitoring terminal 10C operates as the master terminal, and the monitoring terminals 10A and 10B serve as the slave terminals. In other words, the monitoring terminal 10C is in the normal operation state, and the monitoring terminals 10A and 10B are in the power saving state. When the processors 19 of the monitoring terminals 10A, 10B, and 10C execute the processing described in the first case, the monitoring terminals 10A, 10B, and 10C operate as follows.

When the monitoring terminal 10C arrives at the base B, which is the destination of the monitoring terminals 10A and 10B, before the base C, which is the destination of the own device, the monitoring terminal 10C notifies the monitoring terminals 10A and 10B and the management server 20 that the monitoring terminal 10C has reached the destinations of the monitoring terminals 10A and 10B. After that, the monitoring terminal 10C continues to operate as the master terminal. Then, when the monitoring terminal 10C arrives at the base C, which is the destination of the own device, the monitoring terminal 10C notifies the management server 20 that the monitoring terminal 10C has reached the base C, which is the destination of the monitoring terminal 10C, and then shifts to the power saving state.

(2) Second Case

When the processor 19 of the master terminal determines that the own device has reached the destination of the own device, that is, the destination of the pallet P to which the own device is attached, before the slave terminal, the processor 19 of the master terminal notifies the slave terminal and the management server 20 that the master terminal has reached the destination.

For example, the processor 19 of the master terminal may determine that the own device has reached the destination when the arrival date and time of the own device, that is, the arrival date and time of the pallet P to which the own device is attached has arrived. Alternatively, the processor 19 of the master terminal may determine that the own device has reached the destination when a distance between the position of the own device and the destination of the own device becomes equal to or shorter than a predetermined distance.

After notifying the slave terminals and the management server 20 that the master terminal has reached the destination, the processor 19 of the master terminal shifts the own device to the power saving state. This is because when the master terminal has reached the destination, the master terminal is unloaded from the shipping vehicle 300 together with the pallet P to which the master terminal is attached.

When it is notified that the master terminal has reached the destination, the processor 19 of the slave terminal returns from the power saving state and determines whether or not the destination of the master terminal is the same as the destination of the own device.

When the destination of the master terminal is the same as the destination of the own device, the processor 19 of the slave terminal shifts the own device to the power saving state again. This is because the slave terminal whose own destination is the same as the destination of the master terminal is unloaded from the shipping vehicle 300 together with the master terminal.

When the destination of the master terminal is different from the destination of the own device, the processor 19 of the slave terminal searches for other monitoring terminals 10 present around the own device and collects various types of information from the other monitoring terminals 10. The processor 19 of the slave terminal operates as a new master terminal when the remaining battery level of the own device is greater than the remaining battery levels of the other monitoring terminals 10. Also, when there is no other monitoring terminal 10 around the own device, the processor 19 of the slave terminal operates as a new master terminal regardless of the remaining battery level of the slave terminal.

On the other hand, when the remaining battery level of the own device is smaller than the remaining battery levels of the other monitoring terminals 10, the processor 19 of the slave terminal shifts the own device to the power saving state again. In this case, the slave terminal maintains the power saving state until the slave terminal arrives at its destination.

FIG. 15 is a second diagram showing a specific example in which each monitoring terminal 10 becomes either the master terminal or the slave terminal depending on its remaining battery level in the situation shown in FIG. 13. As shown in FIG. 15, for example, it is assumed that, as of the shipping date and time, the remaining battery level of the monitoring terminal 10A whose destination is the base B is 20%, the remaining battery level of the monitoring terminal 10B whose destination is the base B is 80%, and the remaining battery level of the monitoring terminal 10C whose destination is the base C is 50%.

In this case, during the period in which the shipping vehicle 300 moves from the base A to the base B, the monitoring terminal 10B operates as the master terminal, and the monitoring terminals 10A and 10C serve as the slave terminals. In other words, the monitoring terminal 10B is in the normal operation state, and the monitoring terminals 10A and 10C are in the power saving state. When the processors 19 of the monitoring terminals 10A, 10B, and 10C execute the processing described in the second case, the monitoring terminals 10A, 10B, and 10C operate as follows.

When the monitoring terminal 10B arrives at the base B, which is the destination of the own device, before the base C, which is the destination of the monitoring terminal 10C, it notifies the monitoring terminals 10A and 10C that the monitoring terminal 10B has reached the base B, which is its destination. In addition, after notifying the management server 20 that the monitoring terminal 10B has reached the base B, which is the destination of the monitoring terminal 10B, the monitoring terminal 10B shifts to the power saving state.

When receiving the notification from the monitoring terminal 10B, the monitoring terminal 10A returns from the power saving state and determines whether or not the destination of the monitoring terminal 10B is the same as the destination of the own device. In the example shown in FIG. 15, the monitoring terminal 10A determines that the destination of the monitoring terminal 10B is the same as the destination of the own device, and shifts to the power saving state again.

Similarly, when receiving the notification from the monitoring terminal 10B, the monitoring terminal 10C returns from the power saving state and determines whether or not the destination of the monitoring terminal 10B is the same as the destination of the own device. In the example shown in FIG. 15, the monitoring terminal 10C determines that the destination of the monitoring terminal 10B is different from the destination of the own device. In this case, the monitoring terminal 10C operates as a new master terminal. Then, when the monitoring terminal C arrives at the base C, which is the destination of the own device, the monitoring terminal 10C notifies the management server 20 that the monitoring terminal 10C has reached the base C, which is its destination, and then shifts to the power saving state.

According to the sixth operation example described above, in the situation in which the plurality of monitoring terminals 10 are shipped to different destinations by one shipping vehicle 300 with each of the monitoring terminals 10 attached to the pallet P, only the monitoring terminal 10 having the largest remaining battery level acquires the positioning information and transmits the transmission information, and thus, it is possible to curb the total power consumption of the plurality of monitoring terminals 10.

7. Seventh Operation Example of Monitoring Terminal 10

Next, a seventh operation example of the monitoring terminal 10 will be described with reference to FIGS. 16 and 17. The situation in which the seventh operation example of monitoring terminal 10 works effectively is the same as the situation shown in FIG. 13.

In the seventh operation example, the operation during the period in which the shipping vehicle 300 moves from the base A to the base B is the same as that in the fifth operation example. That is, when the processor 19 of the monitoring terminal 10 detects that the shipping date and time has arrived, the processor 19 searches for other monitoring terminals 10 present around the own device via the second communication circuit 13 and collects various types of information from the other monitoring terminals 10. As already described, the various types of information include at least one of the terminal information, the shipping information, and the receiving environment information.

The processor 19 operates as the master terminal when the battery remaining amount of the own device is greater than the battery remaining levels of the other monitoring terminals 10. On the other hand, when the remaining battery level of the own device is smaller than the remaining battery levels of the other monitoring terminals 10, the processor 19 shifts the own device to the power saving state. In this case, the monitoring terminal 10 is the slave terminal.

The above operation is the same as that of the fifth operation example. A particular operation of the seventh operation example will be described below. In the seventh operation example, it is assumed that, among the plurality of monitoring terminals 10, the monitoring terminal 10 whose destination is the farthest, in other words, the monitoring terminal 10 whose arrival date and time is the most future date and time, operates as the master terminal. That is, the arrival date and time of the slave terminal is a date and time before the arrival date and time of the master terminal. In the seventh operation example, the processor 19 of the master terminal executes the following processing.

The processor 19 of the master terminal monitors a remaining time until the arrival date and time of the slave terminal. When the remaining time until the arrival date and time of the slave terminal is longer than the first time, the processor 19 of the master terminal sets the positioning interval to the second interval shorter than the first interval. On the other hand, when the remaining time until the arrival date and time of the slave terminal is equal to or shorter than the first time, the processor 19 of the master terminal sets the positioning interval to the third interval shorter than the second interval.

After the arrival date and time of the slave terminal has arrived, the processor 19 of the master terminal monitors a remaining time until the arrival date and time of the own device. The processor 19 of the master terminal sets the positioning interval to the second interval shorter than the first interval when the remaining time until the arrival date and time of the own device is longer than the first time. On the other hand, the processor 19 of the master terminal sets the positioning interval to the third interval shorter than the second interval when the remaining time until the arrival date and time of the own device is equal to or shorter than the first time.

FIG. 16 is a third diagram showing a specific example in which each monitoring terminal 10 becomes either the master terminal or the slave terminal depending on its remaining battery level in the situation shown in FIG. 13. As shown in FIG. 16, for example, it is assumed that, as of the shipping date and time, the remaining battery level of the monitoring terminal 10A whose destination is the base B is 20%, the remaining battery level of the monitoring terminal 10B whose destination is the base B is 50%, and the remaining battery level of the monitoring terminal 10C whose destination is the base C is 80%.

As shown in FIG. 16, for example, the arrival date and time included in the shipping information held by the monitoring terminals 10A and 10B whose destination is the base B is 9:00 on Oct. 11, 2022, and the arrival date and time included in the shipping information held by the monitoring terminal 10C whose destination is the base C is 15:00 on Oct. 11, 2022.

In this case, during the period in which the shipping vehicle 300 moves from the base A to the base C, the monitoring terminal 10C operates as the master terminal, and the monitoring terminals 10A and 10B serve as the slave terminals. In other words, the monitoring terminal 10C is in the normal operation state, and the monitoring terminals 10A and 10B are in the power saving state.

Figure 17:
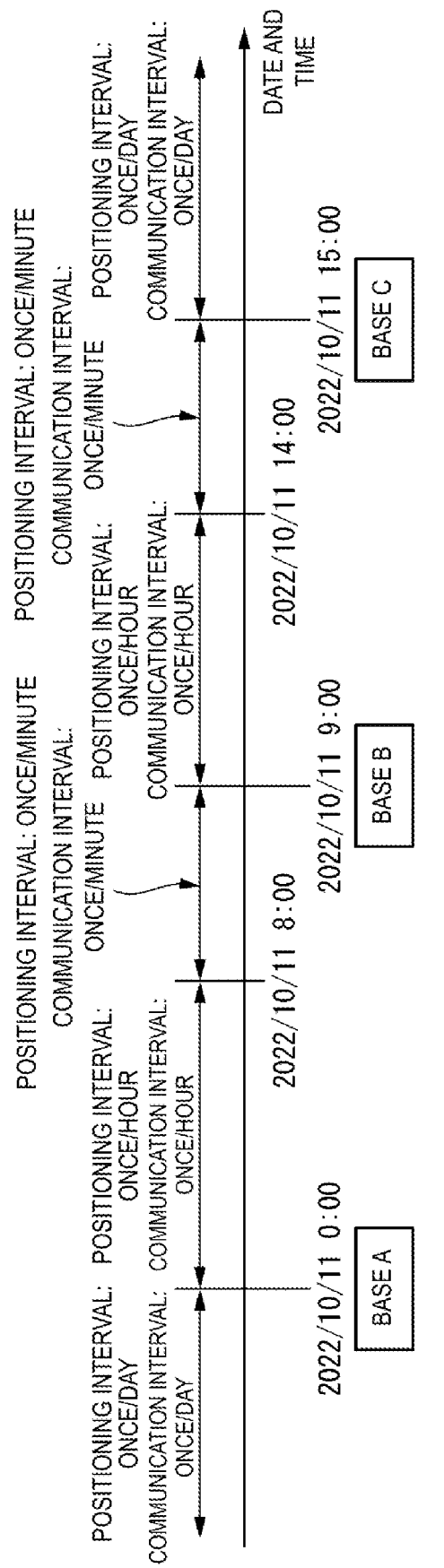
FIG. 17 is an explanatory diagram showing an operation of the master terminal in the example shown in FIG. 16.

FIG. 17 is an explanatory diagram showing an operation of the master terminal, that is, the monitoring terminal 10C in the example shown in FIG. 16. As shown in FIG. 17, the processor 19 of the monitoring terminal 10C sets the positioning interval to the second interval shorter than the first interval when the remaining time until the arrival date and time of the monitoring terminals 10A and 10B is longer than the first time after the shipping date and time of 0:00 on Oct. 11, 2022 arrived. As an example, both the first time and the second interval are both one hour.

In this case, the processor 19 of the monitoring terminal 10C sets the positioning interval to the second interval until the date and time reaches 8:00 on Oct. 11, 2022, at which the remaining time until the arrival date and time of the monitoring terminals 10A and 10B is one hour, after the shipping date and time of 0:00 on Oct. 11, 2022 arrived.

When the positioning interval is set to the second interval, that is, one hour, the GPS receiving circuit 11 of the monitoring terminal 10C acquires the positioning information in a cycle of once an hour. Each time the positioning information is acquired, the processor 19 of the monitoring terminal 10C transmits the transmission information including the position information of the own device and the terminal IDs of the monitoring terminals 10A, 10B, and 10C to the management server 20 via the first communication circuit 12. That is, the processor 19 of the monitoring terminal 10C transmits the transmission information to the management server 20 in a cycle of once an hour.

As described above, the monitoring terminal 10C acquires the positioning information in a cycle of once an hour and transmits the transmission information to the management server 20 in a cycle of once an hour until the date and time reaches 8:00 on Oct. 11, 2022, at which the remaining time to the arrival date and time of the monitoring terminal 10A and 10B is one hour, after the shipping date and time of 0:00 on Oct. 11, 2022 arrived.

The processor 19 of the monitoring terminal 10C sets the positioning interval to the third interval shorter than the second interval when the remaining time until the arrival date and time of the monitoring terminals 10A and 10B is equal to or shorter than the first time. In this case, the processor 19 sets the positioning interval to the third interval after the date and time reached 8:00 on Oct. 11, 2022, at which the remaining time until the arrival date and time of the monitoring terminals 10A and 10B is one hour. As an example, the third interval is one minute.

When the positioning interval is set to the third interval, that is, one minute, the GPS receiving circuit 11 of the monitoring terminal 10C acquires the positioning information in a cycle of once a minute. That is, the GPS receiving circuit 11 of the monitoring terminal 10C acquires the position information of the own device at the third interval shorter than the second interval when the remaining battery level of the own device is greater than the remaining battery levels of the other monitoring terminals 10 and when the current date and time is a date and time within a predetermined time from the arrival date and time of the monitoring terminals 10A and 10B. Each time the positioning information is acquired, the processor 19 of the monitoring terminal 10C transmits the transmission information including the position information of the own device and the terminal IDs of the monitoring terminals 10A, 10B, and 10C to the management server 20 via the first communication circuit 12. That is, the processor 19 of the monitoring terminal 10C transmits the transmission information to the management server 20 in a cycle of once a minute.

As described above, the monitoring terminal 10C acquires the positioning information in a cycle of once a minute and transmits the transmission information to the management server 20 in a cycle of once a minute until the date and time reaches 9:00 on Oct. 11, 2022, which is the arrival date and time of the monitoring terminals 10A and 10B, after the date and time reached 8:00 on Oct. 11, 2022, at which the remaining time until the arrival date and time of the monitoring terminals 10A and 10B is one hour.

The processor 19 of the monitoring terminal 10C sets the positioning interval to the second interval shorter than the first interval when the remaining time until the arrival date and time of the own device is longer than the first time after the date and time reached 9:00 on Oct. 11, 2022, which is the arrival date and time of the monitoring terminals 10A and 10B.

In this case, the processor 19 of the monitoring terminal 10C sets the positioning interval to the second interval until the date and time reaches 14:00 on Oct. 11, 2022, at which the remaining time until the arrival date and time of the own device is one hour, after the date and time reached 9:00 on Oct. 11, 2022, which is the arrival date and time of the monitoring terminals 10A and 10B.

When the positioning interval is set to the second interval, that is, one hour, the GPS receiving circuit 11 of the monitoring terminal 10C acquires the positioning information in a cycle of once an hour. Each time the positioning information is acquired, the processor 19 of the monitoring terminal 10C transmits the transmission information including the position information of the own device and the terminal ID of the own device to the management server 20 via the first communication circuit 12. That is, the processor 19 of the monitoring terminal 10C transmits the transmission information to the management server 20 in a cycle of once an hour.

At 9:00 on Oct. 11, 2022, which is the arrival date and time of the monitoring terminals 10A and 10B, it is estimated that the monitoring terminals 10A and 10B are unloaded from the shipping vehicle 300 to the base B together with the pallets PA and PB. For that reason, as described above, after the date and time reached 9:00 on Oct. 11, 2022, which is the arrival date and time of the monitoring terminals 10A and 10B, the processor 19 of the monitoring terminal 10C transmits the transmission information that includes the terminal ID of the own device and does not include the terminal IDs of the monitoring terminals 10A and 10B to the management server 20.

As described above, the monitoring terminal 10C acquires the positioning information in a cycle of once an hour and transmits the transmission information to the management server 20 in a cycle of once an hour until the date and time reaches 14:00 on Oct. 11, 2022, at which the remaining time until the arrival date and time of the own device is one hour, after the date and time reached 9:00 on Oct. 11, 2022, which is the arrival date and time of the monitoring terminals 10A and 10B.

The processor 19 of the monitoring terminal 10C sets the positioning interval to the third interval shorter than the second interval when the remaining time until the arrival date and time of the own device is equal to or shorter than the first time. In this case, the processor 19 sets the positioning interval to the third interval after the date and time reached 14:00 on Oct. 11, 2022, at which the remaining time until the arrival date and time of the own device is one hour.

When the positioning interval is set to the third interval, that is, one minute, the GPS receiving circuit 11 of the monitoring terminal 10C acquires the positioning information in a cycle of once a minute. Each time the positioning information is acquired, the processor 19 of the monitoring terminal 10C transmits the transmission information including the position information of the own device and the terminal ID of the own device to the management server 20 via the first communication circuit 12. That is, the processor 19 of the monitoring terminal 10C transmits the transmission information to the management server 20 in a cycle of once a minute.

As described above, the monitoring terminal 10C acquires the positioning information in a cycle of once a minute and transmits the transmission information to the management server 20 in a cycle of once a minute until the date and time reaches 15:00 on Oct. 11, 2022, which is the arrival date and time of the own device, after the date and time reached 14:00 on Oct. 11, 2022, at which the remaining time until the arrival date and time of the own device is one hour.

The processor 19 of the monitoring terminal 10C returns the positioning interval to the first interval after the date and time reached 15:00 on Oct. 11, 2022, which is the arrival date and time of the own device. Thus, after the arrival date and time of the own device has arrived, the monitoring terminal 10C acquires the positioning information again in a cycle of once a day and transmits the transmission information to the management server 20 in a cycle of once a day.

According to the seventh operation example described above, in the situation in which the plurality of monitoring terminals 10 are shipped to different destinations by one shipping vehicle 300 with each of the monitoring terminals 10 attached to the pallet P, only the monitoring terminal 10 having the largest remaining battery level acquires the positioning information and transmits the transmission information, and thus, it is possible to curb the total power consumption of the plurality of monitoring terminals 10.

In addition, according to the seventh operation example, the positioning interval of the master terminal (monitoring terminals 10C) becomes shorter as the arrival date and time of the slave terminals (monitoring terminals 10A and 10B) approaches, and thus, even when the actual arrival date and time at the base B, which is the destination of the slave terminals, is greatly delayed from the arrival date and time of the slave terminals due to a shipping delay, more detailed position information of the pallets P (pallets PA and PB) to which the slave terminals are attached can be acquired around the arrival date and time of the slave terminals.

Further, according to the seventh operation example, the positioning interval of the master terminal becomes shorter as the arrival date and time of the master terminal approaches, and thus, even when the actual arrival date and time at the base C, which is the destination of the master terminal, is greatly delayed from the arrival date and time of the master terminal due to a shipping delay, more detailed position information of the pallet P (pallet PC) to which the master terminal is attached can be acquired around the arrival date and time of the master terminal.

Effects of First Embodiment

As described above, the monitoring terminal 10 of the embodiment includes the processor 19 that acquires the current date and time indicating the date and time at present, the storage device 18 that stores the first destination to which the pallet P is shipped and the first shipping date and time indicating the date and time at which the pallet P is shipped to the first destination, and the GPS receiving circuit 11 that acquires the first position information indicating the position of the pallet P at the first interval when the current date and time is a date and time before the first shipping date and time. When the current date and time is a date and time after the first shipping date and time, the GPS receiving circuit 11 acquires the first position information at the second interval shorter than the first interval.

As described above, the monitoring terminal 10 according to the embodiment acquires the first position information at the first interval when the current date and time is a date and time before the first shipping date and time, and acquires the first position information at the second interval shorter than the first interval when the current date and time is a date and time after the first shipping date and time. Accordingly, according to the monitoring terminal 10 of the embodiment, even when the date and time at which the pallet P actually arrives at the first destination is greatly delayed from the first arrival date and time due to a shipping delay, detailed position information of the pallet P can be acquired around the first arrival date and time.

In the monitoring terminal 10 of the embodiment, the storage device 18 stores the first arrival date and time indicating the date and time at which the pallet P arrives at the first destination, and the GPS receiving circuit 11 acquires the first position information at the third interval shorter than the second interval when the current date and time is a date and time after the first shipping date and time and within a predetermined time from the first arrival date and time.

As described above, the monitoring terminal 10 of the embodiment acquires the first position information at the first interval when the current date and time is a date and time before the first shipping date and time, and acquires the first position information at the second interval shorter than the first interval when the current date and time is a date and time after the first shipping date and time. In addition, when the current date and time is a date and time after the first shipping date and time and within a predetermined time from the first arrival date and time, the monitoring terminal 10 acquires the first position information at the third interval shorter than the second interval.

In this way, in the embodiment, the positioning interval of the monitoring terminal 10 becomes shorter as the current date and time approaches the first arrival date and time, and thus, even when the date and time at which the pallet P actually arrives at the first destination is greatly delayed from the first arrival date and time due to a shipping delay, more detailed position information of the pallet P can be acquired around the first arrival date and time.

In the monitoring terminal 10 of the embodiment, the processor 19 calculates the distance from the pallet P to the first destination based on the first position information when the current date and time becomes the first arrival date and time, and the GPS receiving circuit 11 acquires the first position information at the fourth interval shorter than the third interval when the calculated distance is longer than the first distance.

As described above, the monitoring terminal 10 according to the embodiment acquires the first position information at the first interval when the current date and time is a date and time before the first shipping date and time, and acquires the first position information at the second interval shorter than the first interval when the current date and time is a date and time after the first shipping date and time. In addition, the monitoring terminal 10 acquires the first position information at the third interval shorter than the second interval when the current date and time is a date and time after the first shipping date and time and within a predetermined time from the first arrival date and time.

Further, the monitoring terminal 10 of the embodiment calculates the distance from the pallet P to the first destination based on the first position information when the current date and time becomes the first arrival date and time, and acquires the first position information at the fourth interval shorter than the third interval when the calculated distance is longer than the first distance, that is, when it is estimated that the pallet P has not actually reached the first destination at the first arrival date and time.

In this way, in the embodiment, in addition to the fact that the positioning interval of the monitoring terminal 10 becomes shorter as the current date and time approaches the first arrival date and time, when it is estimated that the pallet P has not actually reached the first destination at the first arrival date and time, the positioning interval is set to the fourth interval shorter than the third interval even after the first arrival date and time. Accordingly, even when the date and time at which the pallet P actually arrives at the first destination is greatly delayed from the first arrival date and time due to a shipping delay, more detailed position information of the pallet P can be acquired around the date and time at which the pallet P actually arrives at the first destination.

In the monitoring terminal 10 of the embodiment, the storage device 18 stores the first arrival date and time indicating the date and time at which the pallet P arrives at the first destination. The processor 19 calculates the distance from the pallet P to the first destination based on the first position information when the current date and time is a date and time within a predetermined time from the first arrival date and time. Based on the calculated distance, the processor 19 changes the date and time at which the pallet P arrives at the first destination from the first arrival date and time to the second arrival date and time indicating a date and time different from the first arrival date and time. The GPS receiving circuit 11 acquires the first position information at the third interval shorter than the second interval when the current date and time is a date and time after the first shipping date and time and within a predetermined time from the second arrival date and time.

As described above, the monitoring terminal 10 according to the embodiment acquires the first position information at the first interval when the current date and time is a date and time before the first shipping date and time, and acquires the first position information at the second interval shorter than the first interval when the current date and time is a date and time after the first shipping date and time. In addition, when the current date and time is a date and time within a predetermined time from the first arrival date and time, the monitoring terminal 10 calculates the distance from the pallet P to the first destination based on the first position information.

Based on the calculated distance, the monitoring terminal 10 changes the date and time, at which the pallet P arrives at the first destination, from the first arrival date and time to the second arrival date and time. Then, when the current date and time is a date and time after the first shipping date and time and within a predetermined time from the second arrival date and time, the monitoring terminal 10 acquires the first position information at the third interval shorter than the second interval.

In this way, in the embodiment, when the current date and time is a date and time within a predetermined time from the first arrival date and time, the monitoring terminal 10 calculates the second arrival date and time, at which the pallet P is expected to actually reach the first destination, based on the distance from the pallet P to the first destination. In the embodiment, the positioning interval of the monitoring terminal 10 becomes shorter as such a second arrival date and time approaches, and thus, even when the date and time at which the pallet P actually arrives at the base B, which is the first destination, is greatly delayed from the first arrival date and time due to a shipping delay, more detailed position information of the pallet P can be acquired around the second arrival date and time at which the pallet P is expected to actually reach the first destination.

The monitoring terminal 10 of the embodiment further includes the gyro sensor 14 and the acceleration sensor 15 that detect the movement of the pallet P. The processor 19 changes the first shipping date and time to the date and time indicated by the movement date and time at which a time difference between the movement date and time indicating the date and time at which the gyro sensor 14 and the acceleration sensor 15 detect the movement of the pallet P and the first shipping date and time is greater than a predetermined time.

As described above, by changing the first shipping date and time to the date and time indicated by the movement date and time, control of the positioning interval is performed starting from the date and time at which it is estimated that the shipping of the pallet P is actually started, and thus, it is possible to avoid an unnecessary increase in the power consumption of the monitoring terminal 10 due to the shipping delay.

The monitoring terminal 10 of the embodiment includes the first communication circuit 12 that communicates with the management server 20, the storage device 18 stores the terminal ID of the monitoring terminal 10, and the processor 19 transmits the terminal ID and the first position information to the management server 20.

Thus, it is possible to notify the management server 20 of the position of the monitoring terminal 10, that is, the position of the pallet P to which the monitoring terminal 10 is attached.

The monitoring terminal 10 of the embodiment further includes the second communication circuit 13 that communicates with the other monitoring terminal 10 that acquire the second position information indicating the position of the other pallet P, and the processor 19 acquires the remaining battery level of the other monitoring terminal 10 and the terminal ID of the other monitoring terminal 10 from the other monitoring terminal 10. When the remaining battery level of the own device is greater than the remaining battery level of the other monitoring terminal 10, the processor 19 transmits the terminal ID of the own device, the terminal ID of the other monitoring terminal 10, and the position information of the own device to the management server 20. When the remaining battery level of the own device is smaller than the remaining battery level of the other monitoring terminal 10, the processor 19 does not transmit the terminal ID of the own device, the terminal ID of the other monitoring terminal 10, and the position information of the own device to the management server 20.

According to the embodiment as described above, for example, in the situation in which the plurality of monitoring terminals 10 are shipped to the same destination by one shipping vehicle 300 with each of the monitoring terminals 10 attached to the pallet P, only the monitoring terminal 10 having the largest remaining battery level acquires the position information and transmits the transmission information, and thus, it is possible to curb the total power consumption of the plurality of monitoring terminals 10.

In the monitoring terminal 10 of the embodiment, the processor 19 acquires the second destination to which the other pallet P is shipped from the other monitoring terminal 10. When the remaining battery level of the monitoring terminal 10 is greater than the remaining battery level of the other monitoring terminal 10 and when it is determined that the monitoring terminal 10 has reached the second destination, the processor 19 transmits the information indicating that the monitoring terminal 10 has reached the second destination to the management server 20.

According to the embodiment described above, for example, in the situation in which the plurality of monitoring terminals 10 are shipped to different destinations by one shipping vehicle 300 with each of the monitoring terminals 10 attached to the pallet P, only the monitoring terminal 10 having the largest remaining battery level acquires the position information and transmits the transmission information, and thus, it is possible to curb the total power consumption of the plurality of monitoring terminals 10.

In the monitoring terminal 10 of the embodiment, when the remaining battery level of the monitoring terminal 10 is greater than the remaining battery level of the other monitoring terminal 10 and when it is determined that the monitoring terminal 10 has reached the first destination, the processor 19 transmits the information indicating that the monitoring terminal 10 has reached the first destination to the management server 20 and the other monitoring terminal 10.

According to the embodiment described above, for example, in the situation in which the plurality of monitoring terminals 10 are shipped to different destinations by one shipping vehicle 300 with each of the monitoring terminals 10 attached to the pallet P, only the monitoring terminal 10 having the largest remaining battery level acquires the position information and transmits the transmission information, and thus, it is possible to curb the total power consumption of the plurality of monitoring terminals 10.

In the monitoring terminal 10 of the embodiment, the processor 19 acquires the third arrival date and time indicating the arrival date and time at the second destination to which the other pallet P is shipped from the other monitoring terminal 10. When the remaining battery level of the monitoring terminal 10 is greater than the remaining battery level of other monitoring terminal 10 and when the current date and time is a date and time within a predetermined time from the third arrival date and time, the GPS receiving circuit 11 acquires the first position information at the third interval shorter than the second interval.

According to the embodiment as described above, in the situation in which the plurality of monitoring terminals 10 are shipped to different destinations by one shipping vehicle 300 with each of the monitoring terminals 10 attached to the pallet P, only the monitoring terminal 10 having the largest remaining battery level acquires the position information and transmits the transmission information, and thus, it is possible to curb the total power consumption of the plurality of monitoring terminals 10.

In addition, according to the embodiment, the positioning interval of the monitoring terminal 10 (master terminal) that acquires the position information becomes shorter as the arrival date and time of the other monitoring terminal 10 (slave terminal) that has shifted to the power saving state approaches, and thus, even when the actual arrival date and time at the destination of the slave terminal is greatly delayed from the arrival date and time of the slave terminal due to a shipping delay, more detailed position information of the pallet P to which the slave terminal is attached can be acquired around the arrival date and time of the slave terminal.

The monitoring terminal 10 of the embodiment further includes the second communication circuit 13 that communicates with the other monitoring terminal 10 that acquires the second position information indicating the position of the other pallet P, and the processor 19 acquires the average signal strength of the other monitoring terminal 10 and the terminal ID of the other monitoring terminal 10 from the other monitoring terminal 10. When the average signal strength of the own device is greater than the average signal strength of the other monitoring terminal 10, the processor 19 transmits the terminal ID of the own device, the terminal ID of the other monitoring terminal 10, and the position information of the own device to the management server 20. When the average signal strength of the own device is smaller than the average signal strength of the other monitoring terminal 10, the processor 19 does not transmit the terminal ID of the own device, the terminal ID of the other monitoring terminal 10, and the position information of the own device to the management server 20.

According to the embodiment as described above, for example, in the situation in which the plurality of monitoring terminals 10 are shipped to the same destination by one shipping vehicle 300 with each of the monitoring terminals 10 attached to the pallet P, only the monitoring terminal 10 having the largest average signal strength acquires the position information and transmits the transmission information, and thus, it is possible to curb the total power consumption of the plurality of monitoring terminals 10 and to further increase the possibility of the GPS receiving circuit 11 acquiring the position information.

Second Embodiment

Next, a second embodiment of the present disclosure will be described. The second embodiment described below is an embodiment of a terminal management system. In the second embodiment exemplified below, the same reference numerals as those used in the first embodiment will be assigned to configurations common to the first embodiment, and detailed description thereof will be omitted as appropriate.

Figure 18:
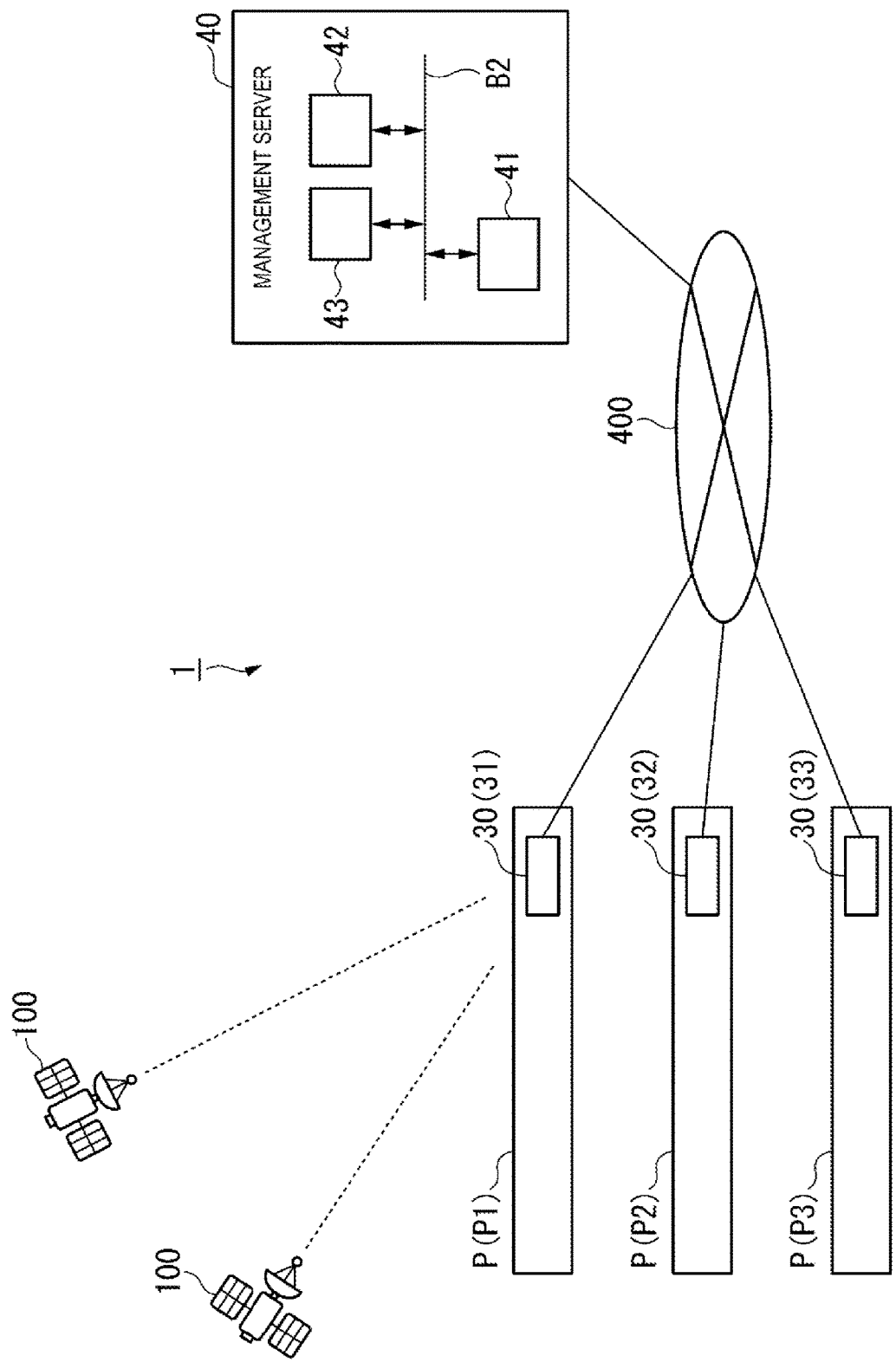
FIG. 18 is a diagram showing an example of a schematic configuration of a terminal management system.

FIG. 18 is a diagram showing an example of a schematic configuration of a terminal management system 1 according to the embodiment. As shown in FIG. 18, the terminal management system 1 includes a plurality of monitoring terminals 30 and a management server 40. The plurality of monitoring terminals 30 are attached to a plurality of pallets P on a one-to-one basis. In the embodiment, for convenience of description, a form in which the terminal management system 1 includes three monitoring terminals 30 is exemplified. Accordingly, the number of pallets P is also three.

The terminal management system 1 includes, as the three monitoring terminals 30, a first monitoring terminal 31, a second monitoring terminal 32, and a third monitoring terminal 33. The first monitoring terminal 31 is attached to a first pallet P1 of the three pallets P. The second monitoring terminal 32 is attached to a second pallet P2 of the three pallets P. The third monitoring terminal 33 is attached to a third pallet P3 of the three pallets P.

Each of the monitoring terminals 30 communicates with the management server 40 via a network 400. Although each of the monitoring terminals 30 is directly coupled to the network 400 in FIG. 18, each of the monitoring terminals 30 actually communicates with the management server 40 coupled to the network 400 via an access point such as a wireless base station.

The first monitoring terminal 31 acquires first positioning information including first position information indicating a position of the first pallet P1 at predetermined intervals based on satellite signals received from a plurality of artificial satellites 100. In the following description, the interval at which the first positioning information is acquired may be referred to as a first positioning interval. For example, the first positioning information includes, in addition to the first position information, first strength information indicating a signal strength of a satellite signal, first time information indicating a time, and first date information indicating a date. The first pallet P1 is an example of the first object.

Each time the first positioning information is acquired, the first monitoring terminal 31 transmits first transmission information including the first position information and identification information of the first monitoring terminal 31 to the management server 40. That is, the first monitoring terminal 31 transmits the first transmission information to the management server 40 at the same interval as the first positioning interval. In the following description, the interval at which the first transmission information is transmitted may be referred to as a first communication interval. For example, the identification information of the first monitoring terminal 31 is a terminal ID individually assigned to the first monitoring terminal 31. In the following description, the terminal ID of the first monitoring terminal 31 may be referred to as a first terminal ID.

The second monitoring terminal 32 acquires second positioning information including second position information indicating a position of the second pallet P2 at predetermined intervals based on satellite signals received from the plurality of artificial satellites 100. In the following description, the interval at which the second positioning information is acquired may be referred to as a second positioning interval. For example, the second positioning information includes, in addition to the second position information, second strength information indicating a signal strength of a satellite signal, second time information indicating a time, and second date information indicating a date. The second pallet P2 is an example of the second object.

Each time the second positioning information is acquired, the second monitoring terminal 32 transmits second transmission information including the second position information and identification information of the second monitoring terminal 32 to the management server 40. That is, the second monitoring terminal 32 transmits the second transmission information to the management server 40 at the same interval as the second positioning interval. In the following description, the interval at which the second transmission information is transmitted may be referred to as a second communication interval. For example, the identification information of the second monitoring terminal 32 is a terminal ID individually assigned to the second monitoring terminal 32. In the following description, the terminal ID of the second monitoring terminal 32 may be referred to as a second terminal ID.

The third monitoring terminal 33 acquires third positioning information including third position information indicating a position of the third pallet P3 at predetermined intervals based on satellite signals received from the plurality of artificial satellites 100. In the following description, the interval at which the third positioning information is acquired may be referred to as a third positioning interval. For example, the third positioning information includes, in addition to the third position information, third strength information indicating a signal strength of a satellite signal, third time information indicating a time, and third date information indicating a date. The third pallet P3 is an example of a third object.

Each time the third positioning information is acquired, the third monitoring terminal 33 transmits third transmission information including the third position information and identification information of the third monitoring terminal 33 to the management server 40. That is, the third monitoring terminal 33 transmits the third transmission information to the management server 40 at the same interval as the third positioning interval. In the following description, the interval at which the third transmission information is transmitted may be referred to as a third communication interval. For example, the identification information of the third monitoring terminal 33 is a terminal ID individually assigned to the third monitoring terminal 33. In the following description, the terminal ID of the third monitoring terminal 33 may be referred to as a third terminal ID.

In addition, it is of course needless to say that the first monitoring terminal 31, the second monitoring terminal 32, and the third monitoring terminal 33 do not necessarily receive the satellite signals from the same artificial satellites 100. The first positioning interval of the first monitoring terminal 31, the second positioning interval of the second monitoring terminal 32, and the third positioning interval of the third monitoring terminal 33 are individually controlled by the management server 40.

The management server 40 is a computer that manages the terminal management system 1. The management server 40 includes a communication circuit 41, a storage device 42, and a processor 43. The processor 43 is communicably coupled to the communication circuit 41 and the storage device 42 via a bus B2. The management server 40 is an example of the information processing device.

The communication circuit 41 communicates with external devices including each of the monitoring terminals 30 via the network 400. The communication circuit 41 transmits signals including information input from the processor 43 via the network 400 and outputs information included in signals received from the network 400 to the processor 43. The communication circuit 41 is an example of a communication unit of the information processing device.

The storage device 42 includes a nonvolatile memory that stores programs, various types of setting data, and the like required for causing the processor 43 to execute various processes, and a volatile memory that is used as a temporary storage destination of data when the processor 43 executes various processes. For example, the storage device 42 includes a flash memory or the like as a nonvolatile memory, and includes a RAM or the like as a volatile memory. The storage device 42 may also include a mass storage device such as a hard disk drive. The storage device 42 is an example of a storage unit of the information processing device.

The storage device 42 stores first shipping information, second shipping information, and third shipping information. The first shipping information includes a first destination to which the first pallet P1 is shipped, a first shipping date and time indicating a date and time at which the first pallet P1 is shipped to the first destination, and a first arrival date and time indicating a date and time at which the first pallet P1 arrives at the first destination.

The second shipping information includes a second destination to which the second pallet P2 is shipped, a second shipping date and time indicating a date and time at which the second pallet P2 is shipped to the second destination, and a third arrival date and time indicating a date and time at which the second pallet P2 arrives at the second destination.

The third shipping information includes a third destination to which the third pallet P3 is shipped, a third shipping date and time indicating a date and time at which the third pallet P3 is shipped to the third destination, and a fourth arrival date and time indicating a date and time at which the third pallet P3 arrives at the third destination.

A pallet ID, which is identification information of the pallet P, is individually assigned to the pallet P. In the following description, the pallet ID assigned to the first pallet P1 is referred to as a first pallet ID, the pallet ID assigned to the second pallet P2 is referred to as a second pallet ID, and the pallet ID assigned to the third pallet P3 is referred to as a third pallet ID.

When the first monitoring terminal 31 is attached to the first pallet P1, the first terminal ID of the first monitoring terminal 31 is associated with the first pallet ID of the first pallet P1. When the second monitoring terminal 32 is attached to the second pallet P2, the second terminal ID of the second monitoring terminal 32 is associated with the second pallet ID of the second pallet P2. When the third monitoring terminal 33 is attached to the third pallet P3, the third terminal ID of the third monitoring terminal 33 is associated with the third pallet ID of the third pallet P3. The storage device 42 stores a management table indicating the correspondence relationship between the terminal IDs and the pallet IDs.

The processor 43 controls the overall operation of the management server 40 in accordance with a program stored in the storage device 42 in advance. For example, the processor 43 is configured by one or a plurality of CPUs. Some or all functions of the processor 43 may be configured by a circuit such as a DSP, an ASIC, a PLD, or an FPGA. The processor 43 performs various processes in parallel or sequentially. The processor 43 is an example of a control unit of the information processing device.

The processor 43 separately controls the first positioning interval of the first monitoring terminal 31, the second positioning interval of the second monitoring terminal 32, and the third positioning interval of the third monitoring terminal 33 based on the first shipping information, the second shipping information, and the third shipping information stored in the storage device 42.

The processor 43 receives the first transmission information including the first position information and the first terminal ID from the first monitoring terminal 31 via the communication circuit 41 every time the first positioning information is acquired by the first monitoring terminal 31. When the processor 43 receives the first transmission information, the processor 43 searches the management table for the first pallet ID associated with the first terminal ID included in the first transmission information, and associates the first position information included in the first transmission information with the searched first pallet ID.

The processor 43 receives the second transmission information including the second position information and the second terminal ID from the second monitoring terminal 32 via the communication circuit 41 every time the second positioning information is acquired by the second monitoring terminal 32. When the processor 43 receives the second transmission information, the processor 43 searches the management table for the second pallet ID associated with the second terminal ID included in the second transmission information, and associates the second position information included in the second transmission information with the searched second pallet ID.

The processor 43 receives the third transmission information including the third position information and the third terminal ID from the third monitoring terminal 33 via the communication circuit 41 every time the third positioning information is acquired by the third monitoring terminal 33. When the processor 43 receives the third transmission information, the processor 43 searches the management table for the third pallet ID associated with the third terminal ID included in the third transmission information, and associates the third position information included in the third transmission information with the searched third pallet ID.

The processor 43 acquires a current date and time indicating a date and time at present. For example, the processor 43 acquires a date and time obtained from a clock device mounted on the processor 43 as the current date and time.

Although details will be described later, the processor 43 monitors the current date and time obtained from the clock device mounted on the processor 43, and instructs the first monitoring terminal 31 to set the first positioning interval to a first interval until the first shipping date and time included in the first shipping information arrives. In addition, after the first shipping date and time arrives, the processor 43 instructs the first monitoring terminal 31 to make the first positioning interval shorter than the first interval in accordance with a remaining time until the first arrival date and time. The processor 43 similarly controls the second positioning interval of the second monitoring terminal 32 and the third positioning interval of the third monitoring terminal 33.

Next, operations of the terminal management system 1 configured as described above will be specifically described while presenting some examples. Operations of the terminal management system 1 has many points similar to the operations of the monitoring terminal 10 described in the first embodiment, and thus, in the following description, the operations of the terminal management system 1 will be described with reference to the drawings used in the first embodiment.

1. First Operation Example of Terminal Management System 1

First, a first operation example of the terminal management system 1 will be described with reference to FIG. 3. In the first operation example, a case in which the first destination included in the first shipping information is the base B, the first shipping date and time included in the first shipping information is 0:00 on Oct. 11, 2022, and the first arrival date and time included in the first shipping information is 9:00 on Oct. 11, 2022, is exemplified. The first pallet P1 is located at the base A until the date and time reaches the first shipping date and time of 0:00 on Oct. 11, 2022.

The processor 43 of the management server 40 monitors the current date and time obtained from the clock device, and instructs the first monitoring terminal 31 to set the first positioning interval to the first interval until the first shipping date and time of 0:00 on Oct. 11, 2022 arrives. In other words, when the current date and time is a date and time before the first shipping date and time, the processor 43 instructs the first monitoring terminal 31 to acquire the first position information at the first interval.

As an example, the first interval is one day, that is, 24 hours. In the embodiment, the first interval is set to one day, but it is not limited thereto, and may be an interval longer than an interval in a period between the first shipping date and time and the first arrival date and time, which will be described later. Thus, since the first positioning interval before the first shipping date and time at which the first pallet P1 does not move can be curbed, it is possible to curb electric power consumed by the first monitoring terminal 31.

When receiving the above instruction from the management server 40, the first monitoring terminal 31 acquires the first positioning information in a cycle of once a day and transmits the first transmission information including the first position information and the first terminal ID to the management server 40 in a cycle of once a day until the first shipping date and time of 0:00 on Oct. 11, 2022 arrives. In this way, when the current date and time is a date and time before the first shipping date and time, the first monitoring terminal 31 acquires the first position information at the first interval.

The processor 43 of the management server 40 instructs the first monitoring terminal 31 to set the first positioning interval to a second interval shorter than the first interval when the remaining time until the first arrival date and time is greater than 0 after the first shipping date and time of 0:00 on Oct. 11, 2022 arrived. In other words, when the current date and time is a date and time after the first shipping date and time, the processor 43 instructs the first monitoring terminal 31 to acquire the first position information at the second interval shorter than the first interval. As an example, the second interval is 10 minutes.

When receiving the above instruction from the management server 40, the first monitoring terminal 31 acquires the first positioning information in a cycle of once every ten minutes and transmits the first transmission information to the management server 40 in a cycle of once every ten minutes until the first arrival date and time of 9:00 on Oct. 11, 2022 arrives after the first shipping date and time of 0:00 on Oct. 11, 2022 arrived. In this way, when the current date and time is a date and time after the first shipping date and time, the first monitoring terminal 31 acquires the first position information at the second interval shorter than the first interval.

The processor 43 of the management server 40 instructs the first monitoring terminal 31 to return the first positioning interval to the first interval after the first arrival date and time of 9:00 on Oct. 11, 2022 arrived. Thus, after the first arrival date and time has arrived, the first monitoring terminal 31 acquires the first positioning information again in a cycle of once a day and transmits the first transmission information to the management server 40 in a cycle of once a day.

As described above, in the first operation example, the processor 43 of the management server 40 instructs the first monitoring terminal 31 to acquire the first position information at the first interval when the current date and time is a date and time before the first shipping date and time. In addition, the processor 43 of the management server 40 instructs the first monitoring terminal 31 to acquire the first position information at the second interval shorter than the first interval when the current date and time is a date and time after the first shipping date and time.

According to the first operation example, even when the date and time at which the first pallet P1 actually arrives at the base B, which is the first destination, is greatly delayed from the first arrival date and time due to a shipping delay, detailed position information of the first pallet P1 can be acquired around the first arrival date and time.

2. Second Operation Example of Terminal Management System 1

Next, a second operation example of the terminal management system 1 will be described with reference to FIG. 4. In the second operation example, the first destination, the first shipping date and time, and the first arrival date and time included in the first shipping information are the same as those in the first operation example.

In the second operation example, the operation until the first shipping date and time of 0:00 on Oct. 11, 2022 arrives is the same as that in the first operation example. That is, the processor 43 of the management server 40 instructs the first monitoring terminal 31 to set the first positioning interval to the first interval until the first shipping date and time of 0:00 on Oct. 11, 2022 arrives.

Thus, the first monitoring terminal 31 acquires the first positioning information in a cycle of once a day and transmits the first transmission information to the management server 40 in a cycle of once a day until the first shipping date and time of 0:00 on Oct. 11, 2022 arrives.

The processor 43 of the management server 40 instructs the first monitoring terminal 31 to set the first positioning interval to a second interval shorter than the first interval when the remaining time until the first arrival date and time is longer than a first time after the first shipping date and time of 0:00 on Oct. 11, 2022 arrived. In this case, the processor 43 of the management server 40 instructs the first monitoring terminal 31 to set the first positioning interval to the second interval until the date and time reaches 8:00 on Oct. 11, 2022, at which the remaining time until the first arrival date and time is one hour, after the first shipping date and time of 0:00 on Oct. 11, 2022 arrived.

In other words, when the current date and time is a date and time after the first shipping date and time, the processor 43 instructs the first monitoring terminal 31 to acquire the first position information at the second interval shorter than the first interval. As an example, the first time is one hour. As an example, the second interval is one hour. In the embodiment, the first time is set to one hour, but it is not limited thereto, and may be a date and time between the first shipping date and time and the first arrival date and time. In addition, the second interval is set to one hour, but it is not limited thereto, and may be shorter than the first interval. Thus, the first positioning interval in the period between the first shipping date and time and the first arrival date and time, in which the first pallet P1 is being shipped, can be made shorter than the first positioning interval before the first shipping date and time at which the first pallet P1 has not been shipped, and the position of the first pallet P1 can be acquired with higher accuracy.

When receiving the above instruction from the management server 40, the first monitoring terminal 31 acquires the first positioning information in a cycle of once an hour and transmits the first transmission information to the management server 40 in a cycle of once an hour until the date and time reaches 8:00 on Oct. 11, 2022, at which the remaining time until the first arrival date and time is one hour, after the first shipping date and time of 0:00 on Oct. 11, 2022 arrived. In this way, when the current date and time is a date and time after the first shipping date and time, the first monitoring terminal 31 acquires the first position information at the second interval shorter than the first interval.

The processor 43 of the management server 40 instructs the first monitoring terminal 31 to set the first positioning interval to a third interval shorter than the second interval when the remaining time until the first arrival date and time is equal to or shorter than the first time after the first shipping date and time of 0:00 on Oct. 11, 2022 arrived. In this case, the processor 43 of the management server 40 instructs the first monitoring terminal 31 to set the first positioning interval to the third interval after the date and time reached 8:00 on Oct. 11, 2022, at which the remaining time until the first arrival date and time is one hour.

In other words, the processor 43 instructs the first monitoring terminal 31 to acquire the first position information at the third interval shorter than the second interval when the current date and time is a date and time after the first shipping date and time and within a predetermined time from the first arrival date and time. As an example, the third interval is one minute. In the embodiment, the third interval is set to one minute, but it is not limited thereto, and may be shorter than the second interval. Thus the position of the first pallet P1 around the first arrival date and time can be acquired with higher accuracy.

When receiving the above instruction from the management server 40, the first monitoring terminal 31 acquires the first positioning information in a cycle of once a minute and transmits the first transmission information to the management server 40 in a cycle of once a minute until the first arrival date and time of 9:00 on Oct. 11, 2022 arrives after the date and time reached 8:00 on Oct. 11, 2022, at which the remaining time until the first arrival date and time is one hour. In this way, when the current date and time is a date and time after the first shipping date and time and within a predetermined time from the first arrival date and time, the first monitoring terminal 31 acquires the first position information at the third interval shorter than the second interval.

The processor 43 of the management server 40 instructs the first monitoring terminal 31 to return the first positioning interval to the first interval after the first arrival date and time of 9:00 on Oct. 11, 2022 arrived. Thus, after the first arrival date and time has arrived, the first monitoring terminal 31 acquires the first positioning information again in a cycle of once a day and transmits the first transmission information to the management server 40 in a cycle of once a day.

As described above, in the second operation example, when the current date and time is a date and time before the first shipping date and time, the processor 43 of the management server 40 instructs the first monitoring terminal 31 to acquire the first position information at the first interval. In addition, when the current date and time is a date and time after the first shipping date and time, the processor 43 of the management server 40 instructs the first monitoring terminal 31 to acquire the first position information at the second interval shorter than the first interval. Further, when the current date and time is a date and time after the first shipping date and time and within a predetermined time from the first arrival date and time, the processor 43 of the management server 40 instructs the first monitoring terminal 31 to acquire the first position information at the third interval shorter than the second interval.

According to the second operation example, the first positioning interval of the first monitoring terminal 31 becomes shorter as the first arrival date and time approaches, and thus, even when the date and time at which the first pallet P1 actually arrives at the base B, which is the first destination, is greatly delayed from the first arrival date and time due to a shipping delay, more detailed position information of the first pallet P1 can be acquired around the first arrival date and time.

3. Third Operation Example of Terminal Management System 1

Next, a third operation example of the terminal management system 1 will be described with reference to FIG. 5. In the third operation example, the first destination, the first shipping date and time, and the first arrival date and time included in the first shipping information are the same as those in the first operation example.

In the third operation example, the operation until the first shipping date and time of 0:00 on Oct. 11, 2022 arrives is the same as that in the first operation example. That is, the processor 43 of the management server 40 instructs the first monitoring terminal 31 to set the first positioning interval to the first interval until the first shipping date and time of 0:00 on Oct. 11, 2022 arrives.

Thus, the first monitoring terminal 31 acquires the first positioning information in a cycle of once a day and transmits the first transmission information to the management server 40 in a cycle of once a day until the first shipping date and time of 0:00 on Oct. 11, 2022 arrives.

In the third operation example, the operation in the period between the first shipping date and time and the first arrival date and time is the same as that in the second operation example. That is, the processor 43 of the management server 40 instructs the first monitoring terminal 31 to set the first positioning interval to the second interval shorter than the first interval when the remaining time until the first arrival date and time is longer than the first time after the first shipping date and time of 0:00 on Oct. 11, 2022 arrived.

Thus, the first monitoring terminal 31 acquires the first positioning information in a cycle of once an hour and transmits the first transmission information to the management server 40 in a cycle of once an hour until the date and time reaches 8:00 on Oct. 11, 2022, at which the remaining time until the first arrival date and time is one hour, after the first shipping date and time of 0:00 on Oct. 11, 2022 arrived.

The processor 43 of the management server 40 instructs the first monitoring terminal 31 to set the first positioning interval to the third interval when the remaining time until the first arrival date and time is equal to or shorter than the first time. Thus, the first monitoring terminal 31 acquires the first positioning information in a cycle of once a minute and transmits the first transmission information to the management server 40 in a cycle of once a minute until the first arrival date and time of 9:00 on Oct. 11, 2022 arrives after the date and time reached 8:00 on Oct. 11, 2022, at which the remaining time until the first arrival date and time is one hour.

When the first arrival date and time has arrived, it is estimated that the first pallet P1 has reached the base B, but in reality, there may be a case in which the first pallet P1 has not reached the base B at the first arrival date and time due to a shipping delay. Thus, when the first arrival date and time has arrived, the processor 43 of the management server 40 calculates a distance from the first pallet P1 to the base B, which is the first destination, based on the first position information included in the first transmission information received from the first monitoring terminal 31.

In other words, when the current date and time is the first arrival date and time, the processor 43 of the management server 40 calculates the distance from the first pallet P1 to the first destination based on the first position information. The first shipping information includes position information of the first destination as information relating to the first destination. The processor 43 of the management server 40 calculates the distance from the first pallet P1 to the base B based on the first position information and the position information of the first destination.

When the distance from the first pallet P1 to the base B is longer than a first distance, the processor 43 of the management server 40 instructs the first monitoring terminal 31 to set the first positioning interval to a fourth interval shorter than the third interval. In other words, when the calculated distance is longer than the first distance, the processor 43 instructs the first monitoring terminal 31 to acquire the first position information at the fourth interval shorter than the third interval.

As an example, the first distance is 50 m. Also, as an example, the fourth interval is 30 seconds. In the embodiment, the fourth interval is set to 30 seconds, but it is not limited thereto, and may be shorter than the third interval. Thus, the position of the pallet P around the arrival date and time can be acquired with higher accuracy.

If the distance from the first pallet P1 to the base B is longer than the first distance when the date and time reaches the first arrival date and time of 9:00 on Oct. 11, 2022, it is estimated that the first pallet P1 has not reached the base B at the first arrival date and time. In this way, when the first arrival date and time of 9:00 on Oct. 11, 2022 arrives and the distance from the first pallet P1 to the base B is longer than the first distance, the processor 43 of the management server 40 instructs the first monitoring terminal 31 to set the first positioning interval to the fourth interval.

When receiving the above instruction from the management server 40, the first monitoring terminal 31 acquires the first positioning information in a cycle of once every 30 seconds and transmits the first transmission information to the management server 40 in a cycle of once every 30 seconds when the first arrival date and time arrives and the distance from the first pallet P1 to the base B is longer than the first distance.

Even after the processor 43 of the management server 40 instructs the first monitoring terminal 31 to set the first positioning interval to the fourth interval, the processor 43 calculates the distance from the first pallet P1 to the base B based on the first position information included in the first transmission information received from the first monitoring terminal 31. Then, when the distance from the first pallet P1 to the base B becomes equal to or shorter than the first distance, the processor 43 of the management server 40 instructs the first monitoring terminal 31 to return the first positioning interval to the first interval. When the distance from the first pallet P1 to the base B becomes equal to or shorter than the first distance after the first arrival date and time, it is estimated that the first pallet P1 has actually reached the base B.

As shown in FIG. 5, for example, when the distance from the first pallet P1 to the base B becomes equal to or shorter than the first distance at 9:30 on Oct. 11, 2022, the processor 43 of the management server 40 instructs the first monitoring terminal 31 to return the first positioning interval to the first interval at 9:30 on Oct. 11, 2022. Thus, after 9:30 on Oct. 11, 2022, which is estimated to be the date and time at which the first pallet P1 has actually reached the base B, the first monitoring terminal 31 acquires the first positioning information in a cycle of once a day again and transmits the first transmission information to the management server 40 in a cycle of once a day.

As described above, in the third operation example, similarly to the second operation example, when the current date and time is a date and time before the first shipping date and time, the processor 43 of the management server 40 instructs the first monitoring terminal 31 to acquire the first position information at the first interval. When the current date and time is a date and time after the first shipping date and time, the processor 43 of the management server 40 instructs the first monitoring terminal 31 to acquire the first position information at the second interval shorter than the first interval. When the current date and time is a date and time after the first shipping date and time and within a predetermined time from the first arrival date and time, the processor 43 of the management server 40 instructs the first monitoring terminal 31 to acquire the first position information at the third interval shorter than the second interval.

Further, in the third operation example, when the current date and time is the first arrival date and time, the processor 43 of the management server 40 calculates the distance from the first pallet P1 to the first destination based on the first position information. When the calculated distance is longer than the first distance, that is, when it is estimated that the first pallet P1 has not actually reached the first destination at the first arrival date and time, the processor 43 instructs the first monitoring terminal 31 to acquire the first position information at the fourth interval shorter than the third interval.

As described above, in the third operation example, in addition to the fact that the first positioning interval of the first monitoring terminal 31 becomes shorter as the first arrival date and time approaches, when it is estimated that the first pallet P1 has not actually reached the first destination at the first arrival date and time, the first positioning interval is set to the fourth interval shorter than the third interval even after the first arrival date and time. Accordingly, even when the date and time at which the first pallet P1 actually arrives at the base B, which is the first destination, is greatly delayed from the first arrival date and time due to a shipping delay, more detailed position information of the first pallet P1 can be acquired around the date and time at which the first pallet P1 actually arrives at the first destination.

4. Fourth Operation Example of Terminal Management System 1

Next, a fourth operation example of the terminal management system 1 will be described with reference to FIGS. 6 and 7. In the fourth operation example, the first destination, the first shipping date and time, and the first arrival date and time included in the first shipping information are the same as those in the first operation example.

In the fourth operation example, the operation until the first shipping date and time of 0:00 on Oct. 11, 2022 arrives is the same as in the first operation example. That is, as shown in FIG. 6, the processor 43 of the management server 40 instructs the first monitoring terminal 31 to set the first positioning interval to the first interval until the first shipping date and time of 0:00 on Oct. 11, 2022 arrives. Thus, the first monitoring terminal 31 acquires the first positioning information in a cycle of once a day and transmits the first transmission information to the management server 40 in a cycle of once a day until the first shipping date and time of 0:00 on Oct. 11, 2022 arrives.

In addition, the processor 43 of the management server 40 instructs the first monitoring terminal 31 to set the first positioning interval to the second interval shorter than the first interval when the remaining time until the first arrival date and time is longer than the first time after the first shipping date and time of 0:00 on Oct. 11, 2022 arrived.

Thus, the first monitoring terminal 31 acquires the first positioning information in a cycle of once an hour and transmits the first transmission information to the management server 40 in a cycle of once an hour until the date and time reaches 8:00 on Oct. 11, 2022, at which the remaining time until the first arrival date and time is one hour, after the first shipping date and time of 0:00 on Oct. 11, 2022 arrived.

When the remaining time until the first arrival date and time is equal to or shorter than the first time, the processor 43 of the management server 40 calculates the distance from the first pallet P1 to the base B, which is the first destination, based on the first position information included in the first transmission information received from the first monitoring terminal 31. That is, the processor 43 of the management server 40 calculates the distance from the first pallet P1 to the base B when the date and time reached 8:00 on Oct. 11, 2022, at which the remaining time until the first arrival date and time is one hour. In other words, the processor 43 calculates the distance from the first pallet P1 to the first destination based on the first position information when the current date and time is a date and time within a predetermined time from the first arrival date and time.

Then, the processor 43 of the management server 40 calculates a second arrival date and time indicating a date and time different from the first arrival date and time based on the distance from the first pallet P1 to the base B. For example, the processor 43 calculates an average moving speed of the first pallet P1 based on the first position information obtained in the period from the first shipping date and time of 0:00 on Oct. 11, 2022 to 8:00 on Oct. 11, 2022, at which the remaining time until the first arrival date and time is one hour, and calculates the time required for the first pallet P1 to reach the base B by dividing the distance from the first pallet P1 to the base B by the average moving speed. Then, the processor 43 calculates the second arrival date and time by adding the time required for the first pallet P1 to reach the base B to 8:00 on Oct. 11, 2022.

As shown in FIG. 7, for example, it is assumed that 9:30 on Oct. 11, 2022, is calculated as the second arrival date and time. The processor 43 of the management server 40 corrects the first arrival date and time stored in the storage device 42 to the second arrival date and time. In this way, when the current date and time is a date and time within a predetermined time from the first arrival date and time, the processor 43 calculates the distance from the first pallet P1 to the first destination based on the first position information. Then, based on the calculated distance, the processor 43 changes the date and time, at which the first pallet P1 arrives at the first destination, from the first arrival date and time to the second arrival date and time indicating a date and time different from the first arrival date and time.

Then, when the remaining time until the second arrival date and time is longer than the first time, the processor 43 instructs the first monitoring terminal 31 to set the first positioning interval to the second interval. Thus, the first monitoring terminal 31 acquires the first positioning information in a cycle of once an hour and transmits the first transmission information to the management server 40 in a cycle of once an hour until the date and time reaches 8:30 on Oct. 11, 2022, at which the remaining time until the second arrival date and time is one hour, after the first shipping date and time of 0:00 on Oct. 11, 2022 arrived.

The processor 43 of the management server 40 instructs the first monitoring terminal 31 to set the first positioning interval to the third interval when the remaining time until the second arrival date and time is equal to or shorter than the first time. That is, the processor 43 instructs the first monitoring terminal 31 to set the first positioning interval to the third interval after the date and time reached 8:30 on Oct. 11, 2022, at which the remaining time until the second arrival date and time is one hour. In other words, when the current date and time is a date and time after the first shipping date and time and within a predetermined time from the second arrival date and time, the processor 43 instructs the first monitoring terminal 31 to acquire the first position information at the third interval shorter than the second interval.

Thus, the first monitoring terminal 31 acquires the first positioning information in a cycle of once a minute and transmits the first transmission information to the management server 40 in a cycle of once a minute until the second arrival date and time of 9:30 on Oct. 11, 2022 arrives after the date and time reached 8:30 on Oct. 11, 2022, at which the remaining time until the second arrival date and time is one hour.

The processor 43 of the management server 40 instructs the first monitoring terminal 31 to return the first positioning interval to the first interval after the second arrival date and time of 9:30 on Oct. 11, 2022 arrived. Thus, after the second arrival date and time arrived, the first monitoring terminal 31 acquires the first positioning information again in a cycle of once a day and transmits the first transmission information to the management server 40 in a cycle of once a day.

As described above, in the fourth operation example, the processor 43 of the management server 40 instructs the first monitoring terminal 31 to acquire the first position information at the first interval when the current date and time is a date and time before the first shipping date and time. The processor 43 instructs the first monitoring terminal 31 to acquire the first position information at the second interval shorter than the first interval when the current date and time is a date and time after the first shipping date and time.

Further, in the fourth operation example, when the current date and time is a date and time within a predetermined time from the first arrival date and time, the processor 43 calculates the distance from the first pallet P1 to the first destination based on the first position information. The processor 43 changes the date and time at which the first pallet P1 arrives at the first destination from the first arrival date and time to the second arrival date and time based on the calculated distance. When the current date and time is a date and time after the first shipping date and time and within a predetermined time from the second arrival date and time, the processor 43 instructs the first monitoring terminal 31 to acquire the first position information at the third interval shorter than the second interval.

As described above, in the fourth operation example, when the current date and time is a date and time within a predetermined time from the first arrival date and time, the processor 43 of the management server 40 calculates the distance from the first pallet P1 to the first destination and based on the distance, calculates the second arrival date and time at which the first pallet P1 is expected to actually reach the first destination. In the fourth operation example, the first positioning interval of the first monitoring terminal 31 becomes shorter as the second arrival date and time approaches, and thus, even when the date and time at which the first pallet P1 actually arrives at the base B, which is the first destination, is greatly delayed from the first arrival date and time due to a shipping delay, more detailed position information of the first pallet P1 can be acquired around the second arrival date and time at which the first pallet P1 is expected to actually reach the first destination.

The first to fourth operation examples have been described above, but when the actual shipping date and time of the first pallet P1 is delayed from the first shipping date and time included in the first shipping information for some reason, the first positioning interval and the first communication interval of the first monitoring terminal 31 may be shortened earlier than the actual shipping date and time, and thus, the power consumption of the first monitoring terminal 31 may increase unnecessarily.

In order to cope with the shipping delay described above, for example, the first monitoring terminal 31 includes a sensor that detects the movement of the first pallet P1, such as a gyro sensor or an acceleration sensor. The first monitoring terminal 31 acquires the date and time at which at least one of the gyro sensor and the acceleration sensor detects the movement of the first pallet P1 as a movement date and time. The first monitoring terminal 31 transmits the acquired movement date and time to the management server 40.

The processor 43 of the management server 40 acquires the movement date and time indicating the date and time at which the movement of the first pallet P1 has been detected from the first monitoring terminal 31 via the communication circuit 41. When a time difference between the movement date and time acquired as described above and the first shipping date and time included in the first shipping information is greater than a predetermined time, the processor 43 changes the first shipping date and time included in the first shipping information to the date and time indicated by the movement date and time.

As described above, by changing the first shipping date and time included in the first shipping information to the date and time indicated by the movement date and time, the control of the first positioning interval is performed starting from the date and time at which the shipping of the first pallet P1 is estimated to have actually started, and thus, it is possible to avoid an unnecessary increase in the power consumption of the first monitoring terminal 31 due to the shipping delay.

5. Fifth Operation Example of Terminal Management System 1

Next, a fifth operation example of the terminal management system 1 will be described. As shown in FIG. 8, the situation in which the fifth operation example of the terminal management system 1 works effectively is a situation in which a plurality of monitoring terminals 30 are shipped to the same destination by one shipping vehicle 300 with each of the monitoring terminals 30 attached to the pallet P.

In the situation described above, each of the plurality of monitoring terminals 30 may acquire the positioning information and transmit the transmission information at the positioning interval described in the first to fourth operation examples. However, in this case, the position information included in the transmission information transmitted from the plurality of monitoring terminals 30 to the management server 40 is information indicating the same position. For that reason, in such a situation as described above, there is little technical merit in operating the plurality of monitoring terminals 30 at the same time. Rather, the total power consumption of the plurality of monitoring terminals 30 may increase unnecessarily.

The fifth operation example of the terminal management system 1 is an operation example for curbing the total power consumption of the plurality of monitoring terminals 30 in the situation as described above. In the fifth operation example, the processor 43 of the management server 40 executes the following processing.

First, the processor 43 of the management server 40 groups two or more monitoring terminals 30 shipped by the same shipping unit among the plurality of monitoring terminals 30.

For example, the storage device 42 stores a first shipping unit that is a unit for shipping the first pallet P1 to the first destination, a second shipping unit that is a unit for shipping the second pallet P2 to the second destination, and a third shipping unit that is a unit for shipping the third pallet P3 to the third destination.

For example, the storage device 42 stores, as information relating to the first shipping unit, information (a departure date and time of the shipping vehicle 300, a vehicle type and a number of the shipping vehicle 300, and the like) relating to the shipping vehicle 300 such as a truck that ships the first pallet P1 to the first destination. Similarly, the storage device 42 stores information relating to the shipping vehicle 300 that ships the second pallet P2 to the second destination as information relating to the second shipping unit, and stores information relating to the shipping vehicle 300 that ships the third pallet P3 to the third destination as information relating to the third shipping unit.

For example, the processor 43 groups two or more monitoring terminals 30 shipped by the same shipping unit among the plurality of monitoring terminals 30 based on the information relating to the first shipping unit, the second shipping unit, and the third shipping unit stored in the storage device 42.

Subsequently, the processor 43 acquires various types of information of the monitoring terminals 30 included in the group via the communication circuit 41.

For example, the processor 43 acquires at least one of the remaining battery levels and the reception environment information of the monitoring terminals 30 included in the group. The reception environment information includes at least an average signal strength at the time of positioning and a communication signal strength. The average signal strength at the time of positioning is an average value of signal strengths of satellite signals included in the positioning information. The average signal strength is an example of the satellite signal strength. The communication signal strength is, for example, a strength of signals received by the monitoring terminals 30 from a wireless access point such as a base station.

Subsequently, the processor 43 selects the monitoring terminal 30 having the largest remaining battery level among the monitoring terminals 30 included in the group as the master terminal, and selects the monitoring terminals 30 other than the master terminal as the slave terminals.

For example, it is assumed that three monitoring terminals 30 of the first monitoring terminal 31, the second monitoring terminal 32, and the third monitoring terminal 33 are included in the group. When the remaining battery level of the first monitoring terminal 31 is the largest among the three monitoring terminals 30, the processor 43 selects the first monitoring terminal 31 as the master terminal and selects the second monitoring terminal 32 and the third monitoring terminal 33 as the slave terminals.

Subsequently, the processor 43 instructs the slave terminals among the monitoring terminals 30 included in the group to shift to the power saving state.

For example, as described above, when the second monitoring terminal 32 and the third monitoring terminal 33 are selected as the slave terminals, the processor 43 instructs the second monitoring terminal 32 and the third monitoring terminal 33 to shift to the power saving state in which they do not communicate with the management server 40.

Subsequently, the processor 43 controls the positioning interval of the master terminal among the monitoring terminals 30 included in the group.

For example, when the first monitoring terminal 31 is selected as the master terminal as described above, as described in the first to fourth operation examples, the processor 43 instructs the first monitoring terminal 31 to acquire the first position information at the first interval when the current date and time is a date and time before the first shipping date and time. In addition, the processor 43 instructs the first monitoring terminal 31 to acquire the first position information at the second interval shorter than the first interval when the current date and time is a date and time after the first shipping date and time.

According to the fifth operation example as described above, in the situation in which the plurality of monitoring terminals 30 are shipped to the same destination by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

Although an example in which the monitoring terminal 30 having the largest remaining battery level is selected as the master terminal among the plurality of monitoring terminals 30 shipped to the same destination by one shipping vehicle 300 has been described in the above description, for example, the monitoring terminal 30 having the largest average signal strength, that is, the largest satellite signal strength may be selected as the master terminal among the plurality of monitoring terminals 30.

Thus, it is possible to curb the total power consumption of the plurality of monitoring terminals 30, and to further increase the possibility of the monitoring terminal 30 selected as the master terminal acquiring the positioning information.

6. Sixth Operation Example of Terminal Management System 1

Next, a sixth operation example of the terminal management system 1 will be described. As shown in FIG. 13, the situation in which the sixth operation example of the terminal management system 1 works effectively is a situation in which a plurality of monitoring terminals 30 are shipped to different destinations by one shipping vehicle 300 with each of the monitoring terminals 30 attached to the pallet P.

In the situation described above, each of the plurality of monitoring terminals 30 may acquire the positioning information and transmit the transmission information at the positioning interval described in the first to fourth operation examples. However, in this case, the position information included in the transmission information transmitted from the plurality of monitoring terminals 30 to the management server 40 during the period in which the shipping vehicle 300 moves from the base A to the base B is information indicating the same position. For that reason, in such a situation as described above, there is little technical merit in operating the plurality of monitoring terminals 30 at the same time. Rather, the total power consumption of the plurality of monitoring terminals 30 may increase unnecessarily.

The sixth operation example of the terminal management system 1 is an operation example for curbing the total power consumption of the plurality of monitoring terminals 30 in the situation as described above. In the sixth operation example, the processor 43 of the management server 40 executes the following processing.

In the sixth operation example, the operation during the period in which the shipping vehicle 300 moves from the base A to the base B is the same as that in the fifth operation example.

That is, first, the processor 43 of the management server 40 groups two or more monitoring terminals 30 shipped by the same shipping unit among the plurality of monitoring terminals 30.

Subsequently, the processor 43 acquires various types of information of the monitoring terminals 30 included in the group via the communication circuit 41.

Subsequently, the processor 43 selects the monitoring terminal 30 having the largest remaining battery level among the monitoring terminals 30 included in the group as the master terminal, and selects the monitoring terminals 30 other than the master terminal as the slave terminals.

Subsequently, the processor 43 instructs the slave terminals among the monitoring terminals 30 included in the group to shift to the power saving state.

Subsequently, the processor 43 controls the positioning interval of the master terminal among the monitoring terminals 30 included in the group.

The above operation is the same as that in the fifth operation example. A particular operation of the sixth operation example will be described below separately for a first case and a second case.

(1) First Case

When the master terminal is determined to have reached the destination of the slave terminals before the destination of the master terminal, the processor 43 of the management server 40 notifies the slave terminals that the master terminal have reached the destination of the slave terminals.

For example, when the arrival date and time of the slave terminals, that is, the arrival date and time of the pallets P to which the slave terminals are attached, has arrived, the processor 43 may determine that the master terminal has reached the destination of the slave terminal. Alternatively, when the distance between the position of the master terminal and the destination of the slave terminals becomes equal to or shorter than a predetermined distance, the processor 43 may determine that the master terminal has reached the destination of the slave terminals.

Even after the master terminal is determined to have reached the destination of the slave terminals, the processor 43 continues to control the positioning interval of the master terminal.

Then, when the master terminal is determined to have reached the destination of the master terminal, the processor 43 instructs the master terminal to shift to the power saving state.

(2) Second Case

When the master terminal is determined to have reached the destination of the master terminal before the destination of the slave terminals, the processor 43 of the management server 40 instructs the master terminal to shift to the power saving state.

For example, when the arrival date and time of the master terminal, that is, the arrival date and time of the pallet P to which the master terminal is attached, has arrived, the processor 43 may determine that the master terminal has reached the destination of the master terminal. Alternatively, when the distance between the position of the master terminal and the destination of the master terminal becomes equal to or shorter than a predetermined distance, the processor 43 may determine that the master terminal has reached the destination of the master terminal.

Subsequently, the processor 43 notifies the slave terminal whose destination is the same as the destination of the master terminal among the slave terminals included in the group that the slave terminal has reached its destination.

Subsequently, the processor 43 excludes the master terminal and the slave terminal whose destination is the same as the destination of the master terminal from the group.

When the number of slave terminals remaining in the group is one, the processor 43 selects the one slave terminal remaining in the group as a new master terminal and controls a positioning interval of the new master terminal.

When the number of slave terminals remaining in the group is two or more, the processor 43 selects a terminal having the largest remaining battery level among the slave terminals remaining in the group as a new master terminal and controls a positioning interval of the new master terminal.

According to the sixth operation example described above, in the situation in which the plurality of monitoring terminals 30 are shipped to different destinations by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

7. Seventh Operation Example of Terminal Management System 1

Next, a seventh operation example of the terminal management system 1 will be described. A situation in which the seventh operation example of the terminal management system 1 works effectively is the same as the situation shown in FIG. 13.

In the seventh operation example, the operation during the period in which the shipping vehicle 300 moves from the base A to the base B is the same as that in the fifth operation example.

That is, first, the processor 43 of the management server 40 groups two or more monitoring terminals 30 shipped by the same shipping unit among the plurality of monitoring terminals 30.

Subsequently, the processor 43 acquires various types of information of the monitoring terminals 30 included in the group via the communication circuit 41.

Subsequently, the processor 43 selects the monitoring terminal 30 having the largest remaining battery level among the monitoring terminals 30 included in the group as the master terminal, and selects the monitoring terminals 30 other than the master terminal as the slave terminals.

Subsequently, the processor 43 instructs the slave terminals among the monitoring terminals 30 included in the group to shift to the power saving state.

Subsequently, the processor 43 controls the positioning interval of the master terminal among the monitoring terminals 30 included in the group.

The above operation is the same as that in the fifth operation example. A particular operation of the seventh operation example will be described below. In the seventh operation example, it is assumed that among the plurality of monitoring terminals 30, the monitoring terminal 30 whose destination is the farthest, in other words, the monitoring terminal 30 whose arrival date and time is the most future date and time is selected as the master terminal. That is, the arrival date and time of the monitoring terminals 30 selected as the slave terminals are before the arrival date and time of the master terminal. In the seventh operation example, the processor 43 of the management server 40 executes the following processing.

The processor 43 of the management server 40 monitors the remaining time until the arrival date and time of the slave terminals. When the remaining time until the arrival date and time of the slave terminals is longer than the first time, the processor 43 instructs the master terminal to set the positioning interval to the second interval shorter than the first interval.

On the other hand, when the remaining time until the arrival date and time of the slave terminal is equal to or shorter than the first time, the processor 43 instructs the master terminal to set the positioning interval to the third interval shorter than the second interval.

After the arrival date and time of the slave terminals arrived, the processor 43 monitors the remaining time until the arrival date and time of the master terminal. When the remaining time until the arrival date and time of the master terminal is longer than the first time, the processor 43 instructs the master terminal to set the positioning interval to the second interval shorter than the first interval.

On the other hand, when the remaining time until the arrival date and time of the master terminal is equal to or shorter than the first time, the processor 43 instructs the master terminal to set the positioning interval to the third interval shorter than the second interval.

For example, it is assumed that as of the shipping date and time, the remaining battery level of the second monitoring terminal 32 whose destination is the base B is 20%, the remaining battery level of the third monitoring terminal 33 whose destination is the base B is 50%, and the remaining battery level of the first monitoring terminal 31 whose destination is the base C is 80%.

In addition, for example, the first arrival date and time included in the first shipping information is 15:00 on Oct. 11, 2022, and the third arrival date and time included in the second shipping information and the fourth arrival date and time included in the third shipping information are 9:00 on Oct. 11, 2022.

In this case, the processor 43 of the management server 40 selects the first monitoring terminal 31 as the master terminal and selects the second monitoring terminal 32 and the third monitoring terminal 33 as the slave terminals during the period in which the shipping vehicle 300 moves from the base A to the base C.

As shown in FIG. 17, the processor 43 of the management server 40 instructs the first monitoring terminal 31 to set the first positioning interval to the second interval shorter than the first interval when the remaining time until the third arrival date and time of the second monitoring terminal 32 is longer than the first time after the first shipping date and time of 0:00 on Oct. 11, 2022 arrived. As an example, both the first time and the second interval are one hour.

Thus, the first monitoring terminal 31 acquires the first positioning information in a cycle of once an hour and transmits the first transmission information to the management server 40 in a cycle of once an hour until the date and time reaches 8:00 on Oct. 11, 2022, at which the remaining time until the second arrival date and time of the second monitoring terminal 32 is one hour, after the first shipping date and time of 0:00 on Oct. 11, 2022 arrived.

When the remaining time until the third arrival date and time of the second monitoring terminal 32 is equal to or shorter than the first time, the processor 43 of the management server 40 instructs the first monitoring terminal 31 to set the first positioning interval to the third interval shorter than the second interval.

Thus, the first monitoring terminal 31 acquires the first positioning information in a cycle of once a minute and transmits the first transmission information to the management server 40 in a cycle of once a minute until the third arrival date and time of 9:00 on Oct. 11, 2022 arrives after the date and time reached 8:00 on Oct. 11, 2022, at which the remaining time until the third arrival date and time of the second monitoring terminal 32 is one hour.

The processor 43 of the management server 40 instructs the first monitoring terminal 31 to set the first positioning interval to the second interval shorter than the first interval when the remaining time until the first arrival date and time of the first monitoring terminal 31 is longer than the first time after the date and time reached 9:00 on Oct. 11, 2022, which is the third arrival date and time of the second monitoring terminal 32.

Thus, the first monitoring terminal 31 acquires the first positioning information in a cycle of once an hour and transmits the first transmission information to the management server 40 in a cycle of once an hour until the date and time reaches 14:00 on Oct. 11, 2022, at which the remaining time until the first arrival date and time is one hour, after the third arrival date and time of 9:00 on Oct. 11, 2022 arrived.

The processor 43 of the management server 40 instructs the first monitoring terminal 31 to set the first positioning interval to the third interval shorter than the second interval when the remaining time until the first arrival date and time is equal to or shorter than the first time.

Thus, the first monitoring terminal 31 acquires the first positioning information in a cycle of once a minute and transmits the first transmission information to the management server 40 in a cycle of once a minute until the first arrival date and time of 15:00 on Oct. 11, 2022 arrives after the date and time reached 14:00 on Oct. 11, 2022, at which the remaining time until the first arrival date and time is one hour.

The processor 43 of the management server 40 instructs the first monitoring terminal 31 to shift to the power saving state after the first arrival date and time of 15:00 on Oct. 11, 2022 arrived. Thus, after the first arrival date and time arrived, the first monitoring terminal 31 acquires the first positioning information at the first interval, that is, in a cycle of once a day, and transmits the first transmission information to the management server 40 in a cycle of once a day.

According to the seventh operation example as described above, in the situation in which the plurality of monitoring terminals 30 are shipped to different destinations by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

In addition, according to the seventh operation example, the positioning interval of the master terminal (first monitoring terminal 31) becomes shorter as the arrival date and time of the slave terminals (the second monitoring terminal 32 and the third monitoring terminal 33) approaches, and thus, even when the date and time at which the slave terminals actually reach the base B, which is the destination of the slave terminals, is greatly delayed from the arrival date and time of the slave terminals due to a shipping delay, more detailed position information of the pallets P (the second pallet P2 and the third pallet P3) to which the slave terminals are attached can be acquired around the arrival date and time of the slave terminals.

Further, according to the seventh operation example, the positioning interval of the master terminal becomes shorter as the arrival date and time of the master terminal approaches, and thus, even when the date and time at which the master terminal actually arrives at the base C, which is the destination of the master terminal, is greatly delayed from the arrival date and time of the master terminal due to a shipping delay, more detailed position information of the pallet P (first pallet P1) to which the master terminal is attached can be acquired around the arrival date and time of the master terminal.

Effects of Second Embodiment

As described above, the terminal management system 1 according to the embodiment includes the first monitoring terminal 31, which is attached to the first pallet P1 and acquires the first position information indicating the position of the first pallet P1 at predetermined intervals, and the management server 40. The management server 41 includes the communication circuit 41, the storage device 42, and the processor 43. The communication circuit 41 communicates with the first monitoring terminal 31. The storage device 42 stores the first destination to which the first pallet P1 is shipped and the first shipping date and time indicating the date and time at which the first pallet P1 is shipped to the first destination. The processor 43 acquires the current date and time indicating the date and time at present, and instructs the first monitoring terminal 31 to acquire the first position information at the first interval when the current date and time is a date and time before the first shipping date and time. The processor 43 instructs the first monitoring terminal 31 to acquire the first position information at the second interval shorter than the first interval when the current date and time is a date and time after the first shipping date and time.

According to the terminal management system 1 of the embodiment as described above, even when the date and time at which the first pallet P1 actually arrives at the base B, which is the first destination, is greatly delayed from the first arrival date and time due to a shipping delay, detailed position information of the first pallet P1 can be acquired around the first arrival date and time.

In the terminal management system 1 of the embodiment, the storage device 42 of the management server 40 stores the first arrival date and time indicating the date and time at which the first pallet P1 arrives at the first destination, and the processor 43 of the management server 40 instructs the first monitoring terminal 31 to acquire the first position information at the third interval shorter than the second interval when the current date and time is a date and time after the first shipping date and time and within a predetermined time from the first arrival date and time.

According to the terminal management system 1 of the embodiment as described above, the first positioning interval of the first monitoring terminal 31 becomes shorter as the first arrival date and time approaches, and thus, even when the date and time at which the first pallet P1 actually arrives at the first destination is greatly delayed from the first arrival date and time due to a shipping delay, more detailed position information of the first pallet P1 can be acquired around the first arrival date and time.

In the terminal management system 1 of the embodiment, the processor 43 calculates the distance from the first pallet P1 to the first destination based on the first position information when the current date and time is the first arrival date and time, and instructs the first monitoring terminal 31 to acquire the first position information at the fourth interval shorter than the third interval when the distance is longer than the first distance.

According to the terminal management system 1 of the embodiment as described above, in addition to the fact that the first positioning interval of the first monitoring terminal 31 becomes shorter as the first arrival date and time approaches, when the first pallet P1 is not estimated to have actually reached the first destination at the first arrival date and time, the first position information is acquired at the fourth interval shorter than the third interval even after the first arrival date and time. Accordingly, even when the date and time at which the first pallet P1 actually arrives at the first destination is greatly delayed from the first arrival date and time due to a shipping delay, more detailed position information of the first pallet P1 can be acquired around the date and time at which the first pallet P1 actually arrives at the first destination.

In the terminal management system 1 of the embodiment, the storage device 42 of the management server 40 stores the first arrival date and time indicating the date and time at which the first pallet P1 arrives at the first destination. The processor 43 of the management server 40 calculates the distance from the first pallet P1 to the first destination based on the first position information when the current date and time is a date and time within a predetermined time from the first arrival date and time. The processor 43 changes the date and time, at which the first pallet P1 arrives at the first destination, from the first arrival date and time to the second arrival date and time based on the calculated distance. When the current date and time is a date and time after the first shipping date and time and within a predetermined time from the second arrival date and time, the processor 43 instructs the first monitoring terminal 31 to acquire the first position information at the third interval shorter than the second interval.

In the terminal management system 1 of the embodiment as described above, the processor 43 of the management server 40 calculates the distance from the first pallet P1 to the first destination when the current date and time is a date and time within a predetermined time from the first arrival date and time, and based on the distance, calculates the second arrival date and time at which the first pallet P1 is expected to actually reach the first destination. In the embodiment, the first positioning interval of the first monitoring terminal 31 becomes shorter as such a second arrival date and time approaches, and thus, even when the date and time at which the first pallet P1 actually arrives at the first destination is greatly delayed from the first arrival date and time due to a shipping delay, more detailed position information of the first pallet P1 can be acquired around the second arrival date and time at which the first pallet P1 is expected to actually reach the first destination.

In the terminal management system 1 according to the embodiment, the processor 43 of the management server 40 acquires the movement date and time indicating the date and time at which the movement of the first pallet P1 is detected from the first monitoring terminal 41. When the time difference between the movement date and time and the first shipping date and time is greater than a predetermined time, the processor 43 changes the first shipping date and time to the date and time indicated by the movement date and time.

As described above, by changing the first shipping date and time to the date and time indicated by the movement date and time obtained from the first monitoring terminal 31, the control of the first positioning interval is performed starting from the date and time at which the shipping of the first pallet P1 is estimated to have actually started, and thus, it is possible to avoid an unnecessary increase in the power consumption of the first monitoring terminal 31 due to the shipping delay.

The terminal management system 1 according to the embodiment further includes the second monitoring terminal 32 that is attached to the second pallet P2 and acquires the second position information indicating the position of the second pallet P2 at predetermined intervals. The communication circuit 41 of the management server 40 communicates with the second monitoring terminal 32. The storage device 42 of the management server 40 stores the second destination to which the second pallet P2 is shipped, the second shipping date and time indicating the date and time at which the second pallet P2 is shipped to the second destination, the first shipping unit that is the unit for shipping the first pallet P1 to the first destination, and the second shipping unit that is the unit for shipping the second pallet P2 to the second destination. When the first shipping unit and the second shipping unit are the same shipping unit, the processor 43 of the management server 40 instructs either the first monitoring terminal 31 or the second monitoring terminal 32 to shift to the power saving state in which it does not communicate with the management server 40.

According to the embodiment as described above, for example, in the situation in which the plurality of monitoring terminals 30 are shipped by one shipping vehicle 300 with each of the monitoring terminals 30 attached to the pallet P, either the first monitoring terminal 31 or the second monitoring terminal 32 is in the power saving state, and thus, it is possible to curb the total power consumption of the plurality of monitoring terminals 30.

In the terminal management system 1 of the embodiment, the processor 43 of the management server 40 acquires the remaining battery level of the first monitoring terminal 31 and the remaining battery level of the second monitoring terminal 32. When the remaining battery level of the first monitoring terminal 31 is smaller than the remaining battery level of the second monitoring terminal 32, the processor 43 instructs the first monitoring terminal 31 to shift to the power saving state. When the remaining battery level of the second monitoring terminal 32 is smaller than the remaining battery level of the first monitoring terminal 31, the processor 43 instructs the second monitoring terminal 32 to shift to the power saving state.

According to the embodiment as described above, for example, in the situation in which the plurality of monitoring terminals 30 are shipped to the same destination by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

In the terminal management system 1 of the embodiment, when the remaining battery level of the second monitoring terminal 32 is smaller than the remaining battery level of the first monitoring terminal 31 and when the first monitoring terminal 31 is determined to have reached the first destination, the processor 43 of management server 40 instructs the first monitoring terminal 31 to shift to the power saving state. When the remaining battery level of the second monitoring terminal 32 is smaller than the remaining battery level of the first monitoring terminal 31 and when the first monitoring terminal 31 is determined to have reached the second destination, the processor 43 notifies the second monitoring terminal 32 that the first monitoring terminal 31 has reached the second destination.

According to the embodiment as described above, for example, in the situation in which the plurality of monitoring terminals 30 are shipped to different destinations by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

In the terminal management system 1 of the embodiment, the storage device 42 of the management server 40 stores the third arrival date and time indicating the date and time at which the second pallet P2 arrives at the second destination. When the remaining battery level of the second monitoring terminal 32 is smaller than the remaining battery level of the first monitoring terminal 31 and when the current date and time is a date and time within a predetermined time from the third arrival date and time, the processor 43 of the management server 40 instructs the first monitoring terminal 31 to acquire the first position information at the third interval shorter than the second interval.

According to the embodiment as described above, in the situation in which the plurality of monitoring terminals 30 are shipped to different destinations by one shipping vehicle 300 with each of the monitoring terminals 30 attached to the pallet P, only the monitoring terminal 30 having the largest remaining battery level acquires the positioning information and transmits the transmission information, and thus, it is possible to curb the total power consumption of the plurality of monitoring terminals 30.

In addition, according to the embodiment, the first positioning interval of the first monitoring terminal 31 (master terminal) that acquires the first position information becomes shorter as the third arrival date and time of the second monitoring terminal 32 (slave terminal) that has shifted to the power saving state approaches, and thus, even when the date and time at which the second monitoring terminal 32 actually arrives at the second destination is greatly delayed from the third arrival date and time due to a shipping delay, more detailed position information of the second pallet P2 can be acquired around the third arrival date and time.

The terminal management method of the embodiment includes acquiring the position information indicating the position of the pallet P at predetermined intervals using the monitoring terminal 30 attached to the pallet P, acquiring the current date and time indicating the date and time at present using the management server 40, instructing the monitoring terminal 30 to acquire the position information at the first interval using the management server 40 when the current date and time is a date and time before the shipping date and time indicating the date and time at which the pallet P is shipped to the destination, and instructing the monitoring terminal 30 to acquire the position information at the second interval shorter than the first interval using the management server 40 when the current date and time is a date and time after the shipping date and time.

According to the terminal management method of the embodiment as described above, even when the date and time at which the pallet P actually arrives at the destination is greatly delayed from the arrival date and time due to a shipping delay, detailed position information of the pallet P can be acquired around the arrival date and time.

The program according to the embodiment causes a computer to execute instructing the monitoring terminal 30 to acquire the position information indicating the position of the pallet P at the first interval when the current date and time indicating the date and time at present is a date and time before the shipping date and time indicating the date and time at which the pallet P to which the monitoring terminal 30 is attached is shipped to the destination, and instructing the monitoring terminal 30 to acquire the position information at the second interval shorter than the first interval when the current date and time is a date and time after the shipping date and time. The management server 40 is an example of the computer.

According to the program of the embodiment as described above, even when the date and time at which the pallet P actually arrives at the destination is greatly delayed from the arrival date and time due to a shipping delay, detailed position information of the pallet P can be acquired around the arrival date and time.

Although the embodiments of the present disclosure have been described above, the technical scope of the present disclosure is not limited to the above embodiments, and various changes can be made without departing from the gist of the present disclosure.

Summary of Present Disclosure

A summary of the present disclosure will be appended below.

Appendix 1

A monitoring terminal including: a control unit configured to acquire a current date and time indicating a date and time at present; a storage unit configured to store a first destination to which a first object is shipped and a shipping date and time indicating a date and time at which the first object is shipped to the first destination; and an acquisition unit configured to acquire first position information indicating a position of the first object at a first interval when the current date and time is a date and time before the shipping date and time, wherein the acquisition unit acquires the first position information at a second interval shorter than the first interval, when the current date and time is a date and time after the shipping date and time.

The monitoring terminal of Appendix 1 acquires the first position information at the first interval when the current date and time is a date and time before the shipping date and time, and acquires the first position information at the second interval shorter than the first interval when the current date and time is a date and time after the shipping date and time. Accordingly, according to the monitoring terminal of Appendix 1, even when the date and time at which the first object actually arrives at the first destination is greatly delayed from the first arrival date and time due to a shipping delay, detailed position information of the first object can be acquired around the first arrival date and time.

Appendix 2

The monitoring terminal according to Appendix 1, wherein the storage unit stores a first arrival date and time indicating a date and time at which the first object arrives at the first destination, and the acquisition unit acquires the first position information at a third interval shorter than the second interval, when the current date and time is a date and time after the shipping date and time and within a predetermined time from the first arrival date and time.

The monitoring terminal of Appendix 2 acquires the first position information at the first interval when the current date and time is a date and time before the shipping date and time, and acquires the first position information at the second interval shorter than the first interval when the current date and time is a date and time after the shipping date and time. In addition, the monitoring terminal of Appendix 2 acquires the first position information at the third interval shorter than the second interval when the current date and time is a date and time after the shipping date and time and within a predetermined time from the first arrival date and time.

In this way, in Appendix 2, the positioning interval of the monitoring terminal becomes shorter as the current date and time approaches the first arrival date and time, and thus, even when the date and time at which the first object actually arrives at the first destination is greatly delayed from the first arrival date and time due to a shipping delay, more detailed position information of the first object can be acquired around the first arrival date and time.

Appendix 3

The monitoring terminal according to Appendix 2, wherein the control unit calculates a distance from the first object to the first destination based on the first position information, when the current date and time is the first arrival date and time, and the acquisition unit acquires the first position information at a fourth interval shorter than the third interval when the distance is longer than a first distance.

The monitoring terminal of Appendix 3 acquires the first position information at the first interval when the current date and time is a date and time before the shipping date and time, and acquires the first position information at the second interval shorter than the first interval when the current date and time is a date and time after the shipping date and time. In addition, the monitoring terminal of Appendix 3 acquires the first position information at the third interval shorter than the second interval when the current date and time is a date and time after the shipping date and time and within a predetermined time from the first arrival date and time.

Further, the monitoring terminal of Appendix 3 calculates the distance from the first object to the first destination based on the first position information when the current date and time is the first arrival date and time, and acquires the first position information at the fourth interval shorter than the third interval when the calculated distance is longer than the first distance, that is, when the first object is not estimated to have actually reached the first destination at the first arrival date and time.

In this way, in Appendix 3, in addition to the fact that the positioning interval of the monitoring terminal becomes shorter as the current date and time approaches the first arrival date and time, when the first object is not estimated to have actually reached the first destination at the first arrival date and time, the monitoring terminal acquires the first position information at the fourth interval shorter than the third interval even after the first arrival date and time. Accordingly, even when the date and time at which the first object actually arrives at the first destination is greatly delayed from the first arrival date and time due to a shipping delay, more detailed position information of the first object can be acquired around the date and time at which the first object actually arrives at the first destination.

Appendix 4

The monitoring terminal according to Appendix 1, wherein the storage unit stores a first arrival date and time indicating a date and time at which the first object arrives at the first destination, the control unit calculates a distance from the first object to the first destination based on the first position information, when the current date and time is a date and time within a predetermined time from the first arrival date and time, the control unit changes, based on the distance, a date and time at which the first object arrives at the first destination from the first arrival date and time to a second arrival date and time indicating a date and time different from the first arrival date and time, and the acquisition unit acquires the first position information at a third interval shorter than the second interval, when the current date and time is a date and time after the shipping date and time and within the predetermined time from the second arrival date and time.

The monitoring terminal of Appendix 4 acquires the first position information at the first interval when the current date and time is a date and time before the shipping date and time, and acquires the first position information at the second interval shorter than the first interval when the current date and time is a date and time after the shipping date and time. In addition, the monitoring terminal of Appendix 4 calculates the distance from the first object to the first destination based on the first position information when the current date and time is a date and time within a predetermined time from the first arrival date and time.

The monitoring terminal of Appendix 4 changes the date and time at which the first object arrives at the first destination from the first arrival date and time to the second arrival date and time based on the calculated distance. Then, the monitoring terminal of Appendix 4 acquires the first position information at the third interval shorter than the second interval when the current date and time is a date and time after the shipping date and time and within a predetermined time from the second arrival date and time.

In this way, in Appendix 4, when the current date and time is a date and time within a predetermined time from the first arrival date and time, the monitoring terminal calculates the second arrival date and time at which the first object is expected to actually reach the first destination based on the distance from the first object to the first destination. In Appendix 4, the positioning interval of the monitoring terminal becomes shorter as such a second arrival date and time approaches, and thus, even when the date and time at which the first object actually arrives at the first destination is greatly delayed from the first arrival date and time due to a shipping delay, more detailed position information of the first object can be acquired around the second arrival date and time at which the first object is expected to actually reach the first destination.

Appendix 5

The monitoring terminal according to any one of Appendixes 1 to 4, further including a detection unit configured to detect movement of the first object, wherein the control unit changes the shipping date and time to a date and time indicated by a movement date and time when a time difference between a movement date and time indicating a date and time at which the detection unit detected the movement of the first object and the shipping date and time is greater than a predetermined time.

As in Appendix 5, by changing the shipping date and time to the date and time indicated by the movement date and time, control of the positioning interval is performed starting from a date and time at which the shipping of the first object is estimated to have actually started, and thus, it is possible to avoid an unnecessary increase in the power consumption of the monitoring terminal due to the shipping delay.

Appendix 6

The monitoring terminal according to any one of Appendixes 1 to 5, further including a first communication unit configured to communicate with an information processing device, wherein the storage unit stores first identification information indicating identification information of the monitoring terminal, and the control unit transmits the first identification information and the first position information to the information processing device.

According to Appendix 6, it is possible to notify the information processing device of the position of the monitoring terminal, that is, the position of the first object to which the monitoring terminal is attached.

Appendix 7

The monitoring terminal according to Appendix 6, further including a second communication unit configured to communicate with another monitoring terminal that acquires second position information indicating a position of a second object, wherein the control unit acquires a remaining battery level of the other monitoring terminal and second identification information indicating identification information of the other monitoring terminal, from the other monitoring terminal, the control unit transmits the first identification information, the second identification information, and the first position information to the information processing device when a remaining battery level of the monitoring terminal is greater than the remaining battery level of the other monitoring terminal, and the control unit does not transmit the first identification information, the second identification information, and the first position information to the information processing device when the remaining battery level of the monitoring terminal is smaller than the remaining battery level of the other monitoring terminal.

According to Appendix 7, for example, in a situation in which a plurality of monitoring terminals are shipped to the same destination by the same shipping unit with each of the monitoring terminals attached to the object, only a monitoring terminal having the largest remaining battery level acquires the position information and transmits various types of information, and thus, it is possible to curb the total power consumption of the plurality of monitoring terminals.

Appendix 8

The monitoring terminal according to Appendix 7, wherein the control unit acquires, from the other monitoring terminal, a second destination to which the second object is shipped, and the control unit transmits the arrival at the second destination to the information processing device when the remaining battery level of the monitoring terminal is greater than the remaining battery level of the other monitoring terminal and when the arrival at the second destination is determined.

According to Appendix 8, for example, in the situation in which the plurality of monitoring terminals are shipped to different destinations by the same shipping unit with each of the monitoring terminals attached to the object, only the monitoring terminal having the largest remaining battery level acquires the position information and transmits various types of information, and thus, it is possible to curb the total power consumption of the plurality of monitoring terminals 10.

Appendix 9

The monitoring terminal according to Appendix 8, wherein the control unit transmits, to the information processing device and the other monitoring terminal, the arrival at the first destination when the remaining battery level of the monitoring terminal is greater than the remaining battery level of the other monitoring terminal and when the arrival at the first destination is determined.

According to Appendix 9, for example, in the situation in which the plurality of monitoring terminals are shipped to different destinations by the same shipping unit with each of the monitoring terminals attached to the object, only the monitoring terminal having the largest remaining battery level acquires the position information and transmits various types of information, and thus, it is possible to curb the total power consumption of the plurality of monitoring terminals 10.

Appendix 10

The monitoring terminal according to Appendix 7, wherein the control unit acquires, from the other monitoring terminal, a third arrival date and time indicating a date and time at which the second object arrives at a second destination to which the second object is shipped, and the acquisition unit acquires the first position information at a third interval shorter than the second interval, when the remaining battery level of the monitoring terminal is greater than the remaining battery level of the other monitoring terminal and when the current date and time is a date and time within a predetermined time from the third arrival date and time.

According to Appendix 10, for example, in the situation in which the plurality of monitoring terminals are shipped to different destinations by the same shipping unit with each of the monitoring terminals attached to the object, only the monitoring terminal having the largest remaining battery level acquires the position information and transmits various types of information, and thus, it is possible to curb the total power consumption of the plurality of monitoring terminals.

In addition, according to Appendix 10, the positioning interval of the monitoring terminal that acquires the position information becomes shorter as the arrival date and time of the other monitoring terminal shifted to the power saving state approaches, and thus, even when the date and time at which the other monitoring terminal actually arrives at the destination is greatly delayed from the arrival date and time of the other monitoring terminal due to a shipping delay, more detailed position information of the object to which the other monitoring terminal is attached can be acquired around the arrival date and time of the other monitoring terminal.

Appendix 11

The monitoring terminal according to Appendix 6, further including a second communication unit configured to communicate with another monitoring terminal configured to acquire second position information indicating a position of a second object, wherein the control unit acquires a satellite signal strength of the other monitoring terminal and second identification information indicating identification information of the other monitoring terminal from the other monitoring terminal, the control unit transmits the first identification information, the second identification information, and the first position information to the information processing device when a satellite signal strength of the monitoring terminal is greater than the satellite signal strength of the other monitoring terminal, and the control unit does not transmit the first identification information, the second identification information, and the first position information to the information processing device when the satellite signal strength of the monitoring terminal is smaller than the satellite signal strength of the other monitoring terminal.

According to Appendix 11, for example, in the situation in which the plurality of monitoring terminals are shipped to the same destination by the same shipping unit with each of the monitoring terminals attached to the object, only a monitoring terminal having the largest satellite signal strength acquires the position information and transmits various types of information, and thus, it is possible to curb the total power consumption of the plurality of monitoring terminals.

Appendix 12

A terminal management system including: a first monitoring terminal that is attached to a first object and acquires first position information indicating a position of the first object at predetermined intervals; and an information processing device including a communication unit configured to communicate with the first monitoring terminal, a storage unit configured to store a first destination to which the first object is shipped and a first shipping date and time indicating a date and time at which the first object is shipped to the first destination, and a control unit that acquires a current date and time indicating a date and time at present, instructs the first monitoring terminal to acquire the first position information at a first interval when the current date and time is a date and time before the first shipping date and time, and instructs the first monitoring terminal to acquire the first position information at a second interval shorter than the first interval when the current date and time is a date and time after the first shipping date and time.

According to the terminal management system of Appendix 12, even when the date and time at which the first object actually arrives at the first destination is greatly delayed from the first arrival date and time due to a shipping delay, detailed position information of the first object can be acquired around the first arrival date and time.

Appendix 13

The terminal management system according to Appendix 12, wherein the storage unit of the information processing device stores a first arrival date and time indicating a date and time at which the first object arrives at the first destination, and the control unit of the information processing device instructs the first monitoring terminal to acquire the first position information at a third interval shorter than the second interval when the current date and time is a date and time after the first shipping date and time and within a predetermined time from the first arrival date and time.

According to the terminal management system of Appendix 13, the positioning interval of the first monitoring terminal becomes shorter as the first arrival date and time approaches, and thus, even when the date and time at which the first object actually arrives at the first destination is greatly delayed from the first arrival date and time due to a shipping delay, more detailed position information of the first object can be acquired around the first arrival date and time.

Appendix 14

The terminal management system according to Appendix 13, wherein the control unit of the information processing device calculates a distance from the first object to the first destination based on the first position information when the current date and time is the first arrival date and time, and instructs the first monitoring terminal to acquire the first position information at a fourth interval shorter than the third interval when the distance is longer than a first distance.

According to the terminal management system of Appendix 14, in addition to the fact that the positioning interval of the first monitoring terminal becomes shorter as the first arrival date and time approaches, when the first object is not estimated to have actually reached the first destination at the first arrival date and time, the first position information is acquired at the fourth interval shorter than the third interval even after the first arrival date and time. Accordingly, even when the date and time at which the first object actually arrives at the first destination is greatly delayed from the first arrival date and time due to a shipping delay, more detailed position information of the first object can be acquired around the date and time at which the first object actually arrives at the first destination.

Appendix 15

The terminal management system according to Appendix 12, wherein the storage unit of the information processing device stores a first arrival date and time indicating a date and time at which the first object arrives at the first destination, and the control unit of the information processing device calculates a distance from the first object to the first destination based on the first position information when the current date and time is a date and time within a predetermined time from the first arrival date and time, changes, based on the distance, a date and time at which the first object arrives at the first destination from the first arrival date and time to a second arrival date and time indicating a date and time different from the first arrival date and time, and instructs the first monitoring terminal to acquire the first position information at a third interval shorter than the second interval when the current date and time is a date and time after the first shipping date and time and within a predetermined time from the second arrival date and time.

In the terminal management system of Appendix 15, the control unit of the information processing device calculates the distance from the first object to the first destination when the current date and time is a date and time within a predetermined time from the first arrival date and time, and based on the distance, calculates the second arrival date and time at which the first object is expected to actually reach the first destination. In Appendix 15, the positioning interval of the first monitoring terminal becomes shorter as such a second arrival date and time approaches, and thus, even when the date and time at which the first object actually arrives at the first destination is greatly delayed from the first arrival date and time due to a shipping delay, more detailed position information of the first object can be acquired around the second arrival date and time at which the first object is expected to actually reach the first destination.

Appendix 16

The terminal management system according to any one of Appendixes 12 to 15, wherein the control unit of the information processing device acquires a movement date and time indicating a date and time at which movement of the first object is detected from the first monitoring terminal, and changes the first shipping date and time to a date and time indicated by the movement date and time at which a time difference between the movement date and time and the first shipping date and time is greater than a predetermined time.

As in Appendix 16, by changing the first shipping date and time to the date and time indicated by the movement date and time acquired from the first monitoring terminal, control of the positioning interval is performed starting from the date and time at which the shipping of the first object is estimated to have actually started, and thus, it is possible to avoid an unnecessary increase in the power consumption of the first monitoring terminal due to the shipping delay.

Appendix 17

The terminal management system according to Appendix 12, further including a second monitoring terminal attached to a second object and configured to acquire second position information indicating a position of the second object at predetermined intervals, wherein the communication unit of the information processing device communicates with the second monitoring terminal, the storage unit of the information processing device stores a second destination to which the second object is shipped, a second shipping date and time indicating a date and time at which the second object is shipped to the second destination, a first shipping unit that is a unit configured to ship the first object to the first destination, and a second shipping unit that is a unit configured to ship the second object to the second destination, and the control unit of the information processing device instructs either the first monitoring terminal or the second monitoring terminal to shift to a power saving state in which communication with the information processing device is not performed when the first shipping unit and the second shipping unit are the same shipping unit.

According to Appendix 17 described above, for example, in a situation in which a plurality of monitoring terminals are shipped by the same shipping unit with each of them attached to the object, either the first monitoring terminal or the second monitoring terminal is in the power saving state, and thus, it is possible to curb the total power consumption of the plurality of monitoring terminals.

Appendix 18

The terminal management system according to Appendix 17, wherein the control unit of the information processing device acquires a remaining battery level of the first monitoring terminal and a remaining battery level of the second monitoring terminal, instructs the first monitoring terminal to shift to the power saving state when the remaining battery level of the first monitoring terminal is smaller than the remaining battery level of the second monitoring terminal, and instructs the second monitoring terminal to shift to the power saving state when the remaining battery level of the second monitoring terminal is smaller than the remaining battery level of the first monitoring terminal.

According to Appendix 18 as described above, for example, in the situation in which the plurality of monitoring terminals are shipped to the same destination by the same shipping unit with each of them attached to the object, only a monitoring terminal having the largest remaining battery level acquires the position information and transmits various types of information, and thus, it is possible to curb the total power consumption of the plurality of monitoring terminals.

Appendix 19

The terminal management system according to Appendix 18, wherein the control unit of the information processing device instructs the first monitoring terminal to shift to the power saving state when the remaining battery level of the second monitoring terminal is smaller than the remaining battery level of the first monitoring terminal and when the first monitoring terminal is determined to have reached the first destination, and notifies the second monitoring terminal that the first monitoring terminal reached the second destination when the remaining battery level of the second monitoring terminal is smaller than the remaining battery level of the first monitoring terminal and when the first monitoring terminal is determined to have reached the second destination.

According to Appendix 19, for example, in the situation in which the plurality of monitoring terminals are shipped to different destinations by the same shipping unit with each of them attached to the object, only the monitoring terminal having the largest remaining battery level acquires the position information and transmits various types of information, and thus, it is possible to curb the total power consumption of the plurality of monitoring terminals.

Appendix 20

The terminal management system according to Appendix 17, wherein the storage unit of the information processing device stores a third arrival date and time indicating a date and time at which the second object arrives at the second destination, and the control unit of the information processing device instructs the first monitoring terminal to acquire the first position information at a third interval shorter than the second interval when the remaining battery level of the second monitoring terminal is smaller than the remaining battery level of the first monitoring terminal and when the current date and time is a date and time within a predetermined time from the third arrival date and time.

According to Appendix 20, in the situation in which the plurality of monitoring terminals are shipped to different destinations by the same shipping unit with each of them attached to the object, only the monitoring terminal having the largest remaining battery level acquires the position information and transmits various types of information, and thus, it is possible to curb the total power consumption of the plurality of monitoring terminals.

Further, according to Appendix 20, the positioning interval of the first monitoring terminal that acquires the first position information becomes shorter as the third arrival date and time of the second monitoring terminal shifted to the power saving state approaches, and thus, even when the date and time at which the second monitoring terminal actually arrives at the second destination is greatly delayed from the third arrival date and time due to a shipping delay, more detailed position information of the second object can be acquired around the third arrival date and time.

Appendix 21

A terminal management method including: acquiring position information indicating a position of an object at predetermined intervals using a monitoring terminal attached to the object; acquiring a current date and time indicating a date and time at present using an information processing device; instructing the monitoring terminal, using the information processing device, to acquire the position information at a first interval when the current date and time is a date and time before a shipping date and time indicating a date and time at which the object is shipped to a destination; and instructing the monitoring terminal, using the information processing device, to acquire the position information at a second interval shorter than the first interval when the current date and time is a date and time after the shipping date and time.

According to the terminal management method of Appendix 21, even when the date and time at which the object actually arrives at the destination is greatly delayed from the arrival date and time due to a shipping delay, detailed position information of the object can be acquired around the arrival date and time.

Appendix 22

A non-transitory computer-readable storage medium storing a program, the program being configured to cause a computer to execute: instructing a monitoring terminal to acquire position information indicating a position of an object at a first interval when a current date and time indicating a date and time at present is a date and time before a shipping date and time indicating a date and time at which the object to which the monitoring terminal is attached is shipped to a destination; and instructing the monitoring terminal to acquire the position information at a second interval shorter than the first interval when the current date and time is a date and time after the shipping date and time.

According to the program of Appendix 22, even when the date and time at which the object actually arrives at the destination is greatly delayed from the arrival date and time due to a shipping delay, detailed position information of the object can be acquired around the arrival date and time.

What is claimed is:

1. A monitoring terminal, comprising:
a processor programmed to:
   acquire a current date and time indicating a date and time at present;
   store, in a memory, (i) a first destination to which a first object is shipped, (ii) a shipping date and time indicating a date and time at which the first object is to be shipped to the first destination, and (iii) a first arrival date and time indicating a date and time at which the first object is expected to arrive at the first destination;
   in response to a determination that the current date and time is before the shipping date and time, acquire first position information indicating a current position of the first object from a GPS satellite at a first interval;
   in response to a determination that the current date and time is after the shipping date and time, acquire the first position information from the GPS satellite at a second interval shorter than the first interval;
   in response to a determination that the current date and time is within a predetermined time from the first arrival date and time,
      acquire the first position information from the GPS satellite at a third interval shorter than the second interval, and
      calculate a distance from the first object to the first destination based on the most recently acquired first position information and update the first arrival date and time to a second arrival date and time at which the first object is expected to arrive at the first destination;
   in response to a determination that the current date and time is not within the predetermined time from the second arrival date and time, acquire the first position information from the GPS satellite at the second interval; and
   in response to a determination that the current date and time is within the predetermined time from the second arrival date and time, acquire the first position information from the GPS satellite at the third interval.

2. The monitoring terminal according to claim 1, wherein the processor is configured to:
   calculate a distance from the first object to the first destination based on the first position information, when the current date and time is the first arrival date and time, and
   acquire the first position information at a fourth interval shorter than the third interval when the distance is longer than a first distance.

3. The monitoring terminal according to claim 1, further comprising a sensor configured to detect movement of the first object, wherein
the processor is further configured to:
   change the shipping date and time to a date and time indicated by a movement date and time, when a time difference between a movement date and time indicating a date and time at which the sensor detected the movement of the first object and the shipping date and time is greater than a predetermined time.

4. The monitoring terminal according to claim 1, further comprising a first communication circuit configured to communicate with an information processing device, wherein
   the memory stores first identification information indicating identification information of the monitoring terminal, and
   the processor transmits the first identification information and the first position information to the information processing device.

5. The monitoring terminal according to claim 4, further comprising a second communication circuit configured to communicate with another monitoring terminal that acquires second position information indicating a position of a second object, wherein
   the processor is configured to:
      acquire a remaining battery level of the other monitoring terminal and second identification information indicating identification information of the other monitoring terminal, from the other monitoring terminal,
      transmit the first identification information, the second identification information, and the first position information to the information processing device, when a remaining battery level of the monitoring terminal is greater than the remaining battery level of the other monitoring terminal, and
      not transmit the first identification information, the second identification information, and the first position information to the information processing device, when the remaining battery level of the monitoring terminal is smaller than the remaining battery level of the other monitoring terminal.

6. The monitoring terminal according to claim 5, wherein the processor is configured to:
   acquire, from the other monitoring terminal, a second destination to which the second object is shipped, and
   transmit, to the information processing device, arrival at the second destination, when the remaining battery level of the monitoring terminal is greater than the remaining battery level of the other monitoring terminal and when the arrival at the second destination is determined.

7. The monitoring terminal according to claim 6, wherein the processor is configured to transmit, to the information processing device and the other monitoring terminal, arrival at the first destination when the remaining battery level of the monitoring terminal is greater than the remaining battery level of the other monitoring terminal and when the arrival at the first destination is determined.

8. The monitoring terminal according to claim 5, wherein the processor is configured to:
   acquire, from the other monitoring terminal, a third arrival date and time indicating a date and time at which the second object arrives at a second destination to which the second object is shipped, and
   acquire the first position information at a fourth interval shorter than the second interval, when the remaining battery level of the monitoring terminal is greater than the remaining battery level of the other monitoring terminal and when the current date and time is a date and time within a predetermined time from the third arrival date and time.

9. The monitoring terminal according to claim 4, further comprising a second communication circuit configured to communicate with another monitoring terminal that acquires second position information indicating a position of a second object, wherein the processor is configured to:
acquire, from the other monitoring terminal, a GPS satellite signal strength of the other monitoring terminal and second identification information indicating identification information of the other monitoring terminal,
transmit the first identification information, the second identification information, and the first position information to the information processing device, when a GPS satellite signal strength of the monitoring terminal is greater than the GPS satellite signal strength of the other monitoring terminal, and
not transmit the first identification information, the second identification information, and the first position information to the information processing device, when the GPS satellite signal strength of the monitoring terminal is smaller than the GPS satellite signal strength of the other monitoring terminal.

10. A terminal management system, comprising:
a first monitoring terminal attached to a first object and configured to acquire first position information indicating a position of the first object at predetermined intervals; and
an information processing device including
a communication circuit configured to communicate with the first monitoring terminal,
a memory configured to store (i) a first destination to which the first object is shipped, (ii) a first shipping date and time indicating a date and time at which the first object is to be shipped to the first destination, and (iii) a first arrival date and time indicating a date and time at which the first object is expected to arrive at the first destination, and
a processor configured to:
acquire a current date and time indicating a date and time at present,
in response to a determination that the current date and time is before the shipping date and time, instruct the first monitoring terminal to acquire the first position information indicating a current position of the first object from a GPS satellite at a first interval;
in response to a determination that the current date and time is after the shipping date and time, instruct the first monitoring terminal to acquire the first position information from the GPS satellite at a second interval shorter than the first interval;
in response to a determination that the current date and time is within a predetermined time from the first arrival date and time,
instruct the first monitoring terminal to acquire the first position information from the GPS satellite at a third interval shorter than the second interval, and
calculate a distance from the first object to the first destination based on the most recently acquired first position information and update the first arrival date and time to a second arrival date and time at which the first object is expected to arrive at the first destination;
in response to a determination that the current date and time is not within the predetermined time from the second arrival date and time, instruct the first monitoring terminal to acquire the first position information from the GPS satellite at the second interval; and
in response to a determination that the current date and time is within the predetermined time from the second arrival date and time, instruct the first monitoring terminal to acquire the first position information from the GPS satellite at the third interval.

11. The terminal management system according to claim 10, wherein
the processor of the information processing device calculates a distance from the first object to the first destination based on the first position information when the current date and time is the first arrival date and time, and instructs the first monitoring terminal to acquire the first position information at a fourth interval shorter than the third interval when the distance is longer than a first distance.

12. The terminal management system according to claim 10, wherein
the processor of the information processing device acquires a movement date and time indicating a date and time at which movement of the first object is detected from the first monitoring terminal, and changes the first shipping date and time to a date and time indicated by the movement date and time when a time difference between the movement date and time and the first shipping date and time is greater than a predetermined time.

13. The terminal management system according to claim 10, further comprising a second monitoring terminal attached to a second object and configured to acquire second position information indicating a position of the second object at predetermined intervals, wherein
the communication circuit of the information processing device communicates with the second monitoring terminal,
the memory of the information processing device stores a second destination to which the second object is shipped, a second shipping date and time indicating a date and time at which the second object is to be shipped to the second destination, a first shipping unit that is a unit configured to ship the first object to the first destination, and a second shipping unit that is a unit configured to ship the second object to the second destination, and
the processor of the information processing device instructs either the first monitoring terminal or the second monitoring terminal to shift to a power saving state in which communication with the information processing device is not performed, when the first shipping unit and the second shipping unit are the same shipping unit.

14. The terminal management system according to claim 13, wherein
the processor of the information processing device
acquires a remaining battery level of the first monitoring terminal and a remaining battery level of the second monitoring terminal,
instructs the first monitoring terminal to shift to the power saving state when the remaining battery level of the first monitoring terminal is smaller than the remaining battery level of the second monitoring terminal, and
instructs the second monitoring terminal to shift to the power saving state when the remaining battery level of the second monitoring terminal is smaller than the remaining battery level of the first monitoring terminal.

15. The terminal management system according to claim 14, wherein
the processor of the information processing device
instructs the first monitoring terminal to shift to the power saving state when the remaining battery level of the second monitoring terminal is smaller than the remaining battery level of the first monitoring terminal and when determining that the first monitoring terminal arrived at the first destination, and
notifies the second monitoring terminal that the first monitoring terminal arrived at the second destination when the remaining battery level of the second monitoring terminal is smaller than the remaining battery level of the first monitoring terminal and when determining that the first monitoring terminal arrived at the second destination.

16. The terminal management system according to claim 13, wherein
the memory of the information processing device stores a third arrival date and time indicating a date and time at which the second object is expected to arrive at the second destination, and
the processor of the information processing device instructs the first monitoring terminal to acquire the first position information at the third interval shorter than the second interval, when the remaining battery level of the second monitoring terminal is smaller than the remaining battery level of the first monitoring terminal and when the current date and time is a date and time within the predetermined time from the third arrival date and time.

17. A terminal management method, comprising:
acquiring position information indicating a position of an object at predetermined intervals using a monitoring terminal attached to the object;
acquiring a current date and time indicating a date and time at present using an information processing device;
instructing the monitoring terminal, using the information processing device, to acquire the position information indicating a current position of the object from a GPS satellite at a first interval, in response to determining that the current date and time is a date and time before a shipping date and time indicating a date and time at which the object is to be shipped to a destination;
instructing the monitoring terminal, using the information processing device, to acquire the position information from the GPS satellite at a second interval shorter than the first interval, in response to determining that the current date and time is a date and time after the shipping date and time;
in response to determining that the current date and time is within a predetermined time from an arrival date and time indicating a date and time at which the object is expected to arrive at the destination,
instructing the monitoring terminal, using the information processing device, to acquire the position information from the GPS satellite at a third interval shorter than the second interval, calculate a distance from the object to the destination based on the most recently acquired position information, and update the arrival date and time to an updated arrival date and time at which the object is expected to arrive at the destination;
in response to determining that the current date and time is not within the predetermined time from the updated arrival date and time, acquiring the position information from the GPS satellite at the second interval; and
in response to determining that the current date and time is within the predetermined time from the updated arrival date and time, acquiring the position information from the GPS satellite at the third interval.

* * * * *